US008333325B2

(12) United States Patent
Moon et al.

(10) Patent No.: US 8,333,325 B2
(45) Date of Patent: Dec. 18, 2012

(54) OPTICAL READER SYSTEM FOR SUBSTRATES HAVING AN OPTICALLY READABLE CODE

(75) Inventors: John A. Moon, Wallingford, CT (US); David R. Fournier, Northborough, MA (US); Martin A. Putnam, Cheshire, CT (US); Alan D Kersey, Glastonbury, CT (US); Tuo Li, East Lynne, CT (US)

(73) Assignee: Illumina, Inc., San Diego, CA (US)

( * ) Notice: Subject to any disclaimer, the term of this patent is extended or adjusted under 35 U.S.C. 154(b) by 169 days.

(21) Appl. No.: 13/014,298

(22) Filed: Jan. 26, 2011

(65) Prior Publication Data

US 2011/0114729 A1 May 19, 2011

Related U.S. Application Data

(63) Continuation of application No. 12/174,490, filed on Jul. 16, 2008, now Pat. No. 7,900,836, and a continuation of application No. 10/956,791, filed on Oct. 1, 2004, now Pat. No. 7,441,703, application No. 13/014,298, which is a continuation-in-part of application No. 10/661,234, filed on Sep. 12, 2003, now Pat. No. 7,106,513, and a continuation-in-part of application No. 10/645,689, filed on Aug. 20, 2003, now abandoned, application No. 13/014,298, which is a continuation-in-part of application No. 10/661,836, filed on Sep. 12, 2003, now Pat. No. 7,399,643.

(60) Provisional application No. 60/512,302, filed on Oct. 17, 2003, provisional application No. 60/513,053, filed on Oct. 21, 2003, provisional application No. 60/546,435, filed on Feb. 19, 2004, provisional application No. 60/610,829, filed on Sep. 17, 2004, provisional application No. 60/405,087, filed on Aug. 20, 2002, provisional application No. 60/410,541, filed on Sep. 12, 2002.

(51) Int. Cl.
*G06K 7/10* (2006.01)
(52) U.S. Cl. .......................................................... 235/454
(58) Field of Classification Search .................. 235/435, 235/436, 454, 455, 491, 494
See application file for complete search history.

(56) References Cited

U.S. PATENT DOCUMENTS 3,074,634 A   1/1963   Gamo
(Continued)

FOREIGN PATENT DOCUMENTS

CH            598661         5/1978
(Continued)

OTHER PUBLICATIONS

US 6,780,301, 08/2004, Nathan (withdrawn).
(Continued)

*Primary Examiner* — Seung Lee
(74) *Attorney, Agent, or Firm* — The Small Patent Law Group; Dean Small; Jason P. Gross

(57) ABSTRACT

An optical reader system including a source light assembly that has a code-reading beam and a fluorescence-excitation beam that are configured to illuminate encoded substrates. The substrates have optically readable codes that provide output signals when the code-reading beam is incident thereon. The output signals are indicative of the codes. The reader system also includes a fluorescence detector that is configured to detect fluorescent signals from the substrates and code pickup optics that are configured to project the output signals from the optically readable codes onto a Fourier plane. The reader system also includes a code detector that is positioned to detect the output signals in the Fourier plane.

20 Claims, 48 Drawing Sheets

U.S. PATENT DOCUMENTS

| | | | |
|---|---|---|---|
| 3,600,223 A | 8/1971 | Glick et al. | |
| 3,614,193 A | 10/1971 | Beiser | |
| 3,791,788 A | 2/1974 | Taylor | |
| 3,858,979 A | 1/1975 | Elbe | |
| 3,880,497 A | 4/1975 | Bryngdahl | |
| 3,891,302 A | 6/1975 | Dabby | |
| 3,903,415 A | 9/1975 | Holzapfel | |
| 3,916,182 A | 10/1975 | Dabby | |
| 3,928,253 A | 12/1975 | Thornton | |
| 3,968,476 A | 7/1976 | McMahon | |
| 4,011,435 A | 3/1977 | Phelps | |
| 4,023,010 A | 5/1977 | Horst | |
| 4,053,228 A | 10/1977 | Schiller | |
| 4,053,433 A | 10/1977 | Lee | |
| 4,112,037 A | 9/1978 | Parker | |
| 4,131,337 A | 12/1978 | Moraw | |
| 4,168,146 A | 9/1979 | Grubb | |
| 4,301,139 A | 11/1981 | Feingers | |
| 4,386,274 A | 5/1983 | Altshuler | |
| 4,400,616 A | 8/1983 | Chevillat | |
| 4,445,229 A | 4/1984 | Tasto | |
| 4,447,546 A | 5/1984 | Hirschfeld | |
| 4,537,504 A | 8/1985 | Baltes | |
| 4,560,881 A | 12/1985 | Briggs | |
| 4,562,157 A | 12/1985 | Lowe | |
| 4,647,544 A | 3/1987 | Nicoli | |
| 4,678,752 A | 7/1987 | Thorne | |
| 4,685,480 A | 8/1987 | Eck | |
| 4,688,240 A | 8/1987 | Hosemann | |
| 4,690,907 A | 9/1987 | Hibino | |
| 4,701,754 A | 10/1987 | Provonchee | |
| 4,716,121 A | 12/1987 | Block | |
| 4,725,110 A | 2/1988 | Glenn | |
| 4,740,468 A | 4/1988 | Weng | |
| 4,740,688 A | 4/1988 | Edwards | |
| 4,748,110 A | 5/1988 | Paul | |
| 4,762,420 A | 8/1988 | Bowley | |
| 4,767,719 A | 8/1988 | Finlan | |
| 4,770,295 A | 9/1988 | Carveth et al. | |
| 4,807,950 A | 2/1989 | Glenn | |
| 4,815,027 A | 3/1989 | Tokumitsu | |
| 4,816,659 A | 3/1989 | Bianco | |
| 4,820,006 A | 4/1989 | Constant | |
| 4,822,746 A | 4/1989 | Walt | |
| 4,841,140 A | 6/1989 | Sullivan | |
| 4,843,631 A | 6/1989 | Steinpichler | |
| 4,877,747 A | 10/1989 | Stewart | |
| 4,880,752 A | 11/1989 | Keck | |
| 4,882,288 A | 11/1989 | North | |
| 4,921,805 A | 5/1990 | Gebeyehu | |
| 4,931,384 A | 6/1990 | Layton | |
| 4,937,048 A | 6/1990 | Sakai | |
| 4,958,376 A | 9/1990 | Leib | |
| 4,992,385 A | 2/1991 | Godfrey | |
| 5,002,867 A | 3/1991 | Macevicz | |
| 5,003,600 A | 3/1991 | Deason | |
| RE33,581 E | 4/1991 | Nicoli | |
| 5,028,545 A | 7/1991 | Soini | |
| 5,030,558 A | 7/1991 | Litman | |
| 5,033,826 A | 7/1991 | Kolner | |
| 5,048,139 A | 9/1991 | Matsumi et al. | |
| 5,065,008 A | 11/1991 | Hakamata | |
| 5,067,155 A | 11/1991 | Bianco | |
| 5,081,012 A | 1/1992 | Flanagan | |
| 5,089,387 A | 2/1992 | Tsay | |
| 5,090,807 A | 2/1992 | Tai | |
| 5,091,636 A | 2/1992 | Takada | |
| 5,095,194 A | 3/1992 | Barbanell | |
| 5,100,238 A | 3/1992 | Nailor | |
| 5,104,209 A | 4/1992 | Hill | |
| 5,105,305 A | 4/1992 | Betzig | |
| 5,114,864 A | 5/1992 | Walt | |
| 5,115,121 A | 5/1992 | Bianco | |
| 5,118,608 A | 6/1992 | Layton | |
| 5,129,974 A | 7/1992 | Aurenius | |
| 5,138,468 A | 8/1992 | Barbanell | |
| 5,141,848 A | 8/1992 | Donovan | |
| 5,143,853 A | 9/1992 | Walt | |
| 5,144,461 A | 9/1992 | Horan | |
| 5,160,701 A | 11/1992 | Brown, III | |
| 5,166,813 A | 11/1992 | Metz | |
| 5,192,980 A | 3/1993 | Dixon | |
| 5,196,350 A | 3/1993 | Backman | |
| 5,200,794 A | 4/1993 | Nishiguma | |
| 5,218,594 A | 6/1993 | Tanno | |
| 5,239,178 A | 8/1993 | Derndinger | |
| 5,244,636 A | 9/1993 | Walt | |
| 5,283,777 A | 2/1994 | Tanno | |
| 5,291,006 A | 3/1994 | Nishiguma | |
| 5,291,027 A | 3/1994 | Kita | |
| 5,300,764 A | 4/1994 | Hoshino | |
| 5,307,332 A | 4/1994 | Tinet | |
| 5,310,686 A | 5/1994 | Sawyers | |
| 5,329,352 A | 7/1994 | Jacobsen | |
| 5,342,790 A | 8/1994 | Levine | |
| 5,349,442 A | 9/1994 | Deason | |
| 5,352,582 A | 10/1994 | Lichtenwalter | |
| 5,364,797 A | 11/1994 | Olson | |
| 5,367,588 A | 11/1994 | Hill | |
| 5,372,783 A | 12/1994 | Lackie | |
| 5,374,816 A | 12/1994 | Bianco | |
| 5,374,818 A | 12/1994 | Bianco | |
| 5,388,173 A | 2/1995 | Glenn | |
| 5,394,234 A | 2/1995 | Bianco | |
| 5,395,558 A | 3/1995 | Tsai | |
| 5,410,147 A | 4/1995 | Riza | |
| 5,426,297 A | 6/1995 | Dunphy | |
| 5,432,329 A | 7/1995 | Colgate | |
| 5,442,433 A | 8/1995 | Hoshino | |
| 5,448,659 A | 9/1995 | Tsutsui | |
| 5,451,528 A | 9/1995 | Raymoure | |
| 5,455,178 A | 10/1995 | Fattinger | |
| 5,461,475 A | 10/1995 | Lerner | |
| 5,465,176 A | 11/1995 | Bianco | |
| 5,468,649 A | 11/1995 | Shah | |
| 5,472,515 A | 12/1995 | Roberts et al. | |
| 5,479,515 A | 12/1995 | Longacre | |
| 5,506,674 A | 4/1996 | Inoue | |
| 5,514,785 A | 5/1996 | Van Ness | |
| 5,528,045 A | 6/1996 | Hoffman | |
| 5,547,849 A | 8/1996 | Baer | |
| 5,559,613 A | 9/1996 | Deveaud-Pledran | |
| 5,585,639 A | 12/1996 | Dorsel | |
| 5,587,832 A | 12/1996 | Krause | |
| 5,607,188 A | 3/1997 | Bahns | |
| 5,610,287 A | 3/1997 | Nikiforov | |
| 5,620,853 A | 4/1997 | Smethers | |
| 5,621,515 A | 4/1997 | Hoshino | |
| 5,624,850 A | 4/1997 | Kumar | |
| 5,625,472 A | 4/1997 | Mizrahi | |
| 5,627,040 A | 5/1997 | Bierre | |
| 5,627,663 A | 5/1997 | Horan | |
| 5,633,724 A | 5/1997 | King | |
| 5,633,975 A | 5/1997 | Gary | |
| 5,663,790 A | 9/1997 | Ekstrom | |
| 5,667,976 A | 9/1997 | Van Ness | |
| 5,671,308 A | 9/1997 | Inoue | |
| 5,682,244 A | 10/1997 | Barlow et al. | |
| 5,700,037 A | 12/1997 | Keller | |
| 5,712,912 A | 1/1998 | Tomko | |
| 5,721,435 A | 2/1998 | Troll | |
| 5,729,365 A | 3/1998 | Sweatt | |
| 5,736,330 A | 4/1998 | Fulton | |
| 5,742,432 A | 4/1998 | Bianco | |
| 5,745,615 A | 4/1998 | Atkins | |
| 5,745,617 A | 4/1998 | Starodubov | |
| 5,759,778 A | 6/1998 | Li | |
| 5,760,961 A | 6/1998 | Tompkin | |
| 5,766,956 A | 6/1998 | Groger | |
| 5,771,251 A | 6/1998 | Kringlebotn | |
| 5,776,694 A | 7/1998 | Sheiness | |
| 5,793,502 A | 8/1998 | Bianco | |
| 5,798,273 A | 8/1998 | Shuler | |
| 5,799,231 A | 8/1998 | Gates | |
| 5,801,857 A | 9/1998 | Heckenkamp | |
| 5,804,384 A | 9/1998 | Muller | |
| 5,812,272 A | 9/1998 | King | |

| | | |
|---|---|---|
| 5,822,472 A | 10/1998 | Danielzik |
| 5,824,478 A | 10/1998 | Muller |
| 5,824,557 A | 10/1998 | Burke |
| 5,830,622 A | 11/1998 | Canning |
| 5,831,698 A | 11/1998 | Depp |
| 5,837,475 A | 11/1998 | Dorsel |
| 5,837,552 A | 11/1998 | Cotton |
| 5,841,555 A | 11/1998 | Bianco |
| 5,846,737 A | 12/1998 | Kang |
| 5,861,113 A | 1/1999 | Choquette et al. |
| 5,874,187 A | 2/1999 | Colvin |
| 5,881,197 A | 3/1999 | Dong |
| 5,895,750 A | 4/1999 | Mushahwar |
| 5,922,550 A | 7/1999 | Everhart |
| 5,922,617 A | 7/1999 | Wang |
| 5,925,562 A | 7/1999 | Nova |
| 5,925,878 A | 7/1999 | Challener |
| 5,945,679 A | 8/1999 | Dorsel |
| 5,972,542 A | 10/1999 | Starodubov |
| 5,976,896 A | 11/1999 | Kumar |
| 5,981,166 A | 11/1999 | Mandecki |
| 5,986,838 A | 11/1999 | Thomas, III |
| 5,989,923 A | 11/1999 | Lowe |
| 5,992,742 A | 11/1999 | Sullivan |
| 5,998,796 A | 12/1999 | Liu |
| 6,001,510 A | 12/1999 | Meng |
| 6,005,691 A | 12/1999 | Grot |
| 6,017,754 A | 1/2000 | Chesnut |
| 6,025,129 A | 2/2000 | Nova |
| 6,025,283 A | 2/2000 | Robers |
| 6,027,694 A | 2/2000 | Boulton |
| 6,030,581 A | 2/2000 | Virtanen |
| 6,035,082 A | 3/2000 | Murphy |
| 6,035,083 A | 3/2000 | Brennan |
| 6,036,807 A | 3/2000 | Brongers |
| 6,043,880 A | 3/2000 | Andrews |
| 6,046,925 A | 4/2000 | Tsien |
| 6,049,727 A | 4/2000 | Crothall |
| 6,057,107 A | 5/2000 | Fulton |
| 6,060,256 A | 5/2000 | Everhart |
| 6,067,167 A | 5/2000 | Atkinson |
| 6,067,392 A | 5/2000 | Wakami |
| 6,078,048 A | 6/2000 | Stevens |
| 6,084,995 A | 7/2000 | Clements |
| 6,087,186 A | 7/2000 | Cargill |
| 6,088,503 A | 7/2000 | Chandler |
| 6,096,496 A | 8/2000 | Frankel |
| 6,096,596 A | 8/2000 | Gonzalez |
| 6,097,485 A | 8/2000 | Lievan |
| 6,103,535 A | 8/2000 | Pilevar |
| 6,118,127 A | 9/2000 | Liu |
| 6,128,077 A | 10/2000 | Jovin |
| 6,137,931 A | 10/2000 | Ishikawa |
| 6,143,247 A | 11/2000 | Sheppard, Jr. |
| 6,156,501 A | 12/2000 | McGall |
| 6,159,748 A | 12/2000 | Hechinger |
| 6,160,240 A | 12/2000 | Momma |
| 6,160,656 A | 12/2000 | Mossberg |
| 6,164,548 A | 12/2000 | Curiel |
| 6,165,592 A | 12/2000 | Berger |
| 6,165,648 A | 12/2000 | Colvin |
| 6,174,648 B1 | 1/2001 | Terao |
| 6,194,563 B1 | 2/2001 | Cruickshank |
| 6,204,068 B1 | 3/2001 | Soini et al. |
| 6,204,969 B1 | 3/2001 | Jang |
| 6,214,560 B1 | 4/2001 | Yguerabide |
| 6,218,194 B1 | 4/2001 | Lyndin |
| 6,221,579 B1 | 4/2001 | Everhart |
| 6,229,635 B1 | 5/2001 | Wulf |
| 6,229,827 B1 | 5/2001 | Fernald |
| 6,229,941 B1 | 5/2001 | Yoon |
| 6,242,056 B1 | 6/2001 | Spencer |
| 6,259,450 B1 | 7/2001 | Chiabrera |
| 6,262,846 B1 | 7/2001 | Nakai |
| 6,268,128 B1 | 7/2001 | Collins |
| 6,277,628 B1 | 8/2001 | Johann |
| 6,284,437 B1 | 9/2001 | Kashyap |
| 6,284,459 B1 | 9/2001 | Nova |
| 6,285,806 B1 | 9/2001 | Kersey |
| 6,288,220 B1 | 9/2001 | Kambara |
| 6,292,282 B1 | 9/2001 | Mossberg |
| 6,292,319 B1 | 9/2001 | Thomas, III |
| 6,301,047 B1 | 10/2001 | Hoshino |
| 6,304,263 B1 | 10/2001 | Chiabrera |
| 6,306,587 B1 | 10/2001 | Royer |
| 6,309,601 B1 | 10/2001 | Juncosa |
| 6,312,961 B1 | 11/2001 | Voirin |
| 6,313,771 B1 | 11/2001 | Munroe |
| 6,314,220 B1 | 11/2001 | Mossberg |
| 6,319,668 B1 | 11/2001 | Nova |
| 6,321,007 B1 | 11/2001 | Sanders |
| 6,322,932 B1 | 11/2001 | Colvin |
| RE37,473 E | 12/2001 | Challener |
| 6,328,209 B1 | 12/2001 | O'Boyle |
| 6,329,963 B1 | 12/2001 | Chiabrera |
| 6,331,273 B1 | 12/2001 | Nova |
| 6,335,824 B1 | 1/2002 | Overbeck |
| 6,340,588 B1 | 1/2002 | Nova |
| 6,344,298 B1 | 2/2002 | Starodubov |
| 6,352,854 B1 | 3/2002 | Nova |
| 6,355,198 B1 | 3/2002 | Kim |
| 6,355,432 B1 | 3/2002 | Fodor |
| 6,356,681 B1 | 3/2002 | Chen |
| 6,359,734 B1 | 3/2002 | Staub |
| 6,361,958 B1 | 3/2002 | Shieh |
| 6,363,097 B1 | 3/2002 | Linke |
| 6,371,370 B2 | 4/2002 | Sadler |
| 6,372,428 B1 | 4/2002 | Nova |
| 6,383,754 B1 | 5/2002 | Kaufman |
| 6,391,562 B2 | 5/2002 | Kambara |
| 6,395,558 B1 | 5/2002 | Duveneck |
| 6,399,295 B1 | 6/2002 | Kaylor |
| 6,399,935 B1 | 6/2002 | Jovin |
| 6,403,320 B1 | 6/2002 | Read |
| 6,406,841 B1 | 6/2002 | Lee |
| 6,406,848 B1 | 6/2002 | Bridgham |
| 6,416,714 B1 | 7/2002 | Nova |
| 6,416,952 B1 | 7/2002 | Pirrung |
| 6,417,010 B1 | 7/2002 | Cargill |
| 6,424,056 B1 | 7/2002 | Irvin |
| 6,428,707 B1 | 8/2002 | Berg |
| 6,428,957 B1 | 8/2002 | Delenstarr |
| 6,429,022 B1 | 8/2002 | Kunz |
| 6,433,849 B1 | 8/2002 | Lowe |
| 6,436,651 B1 | 8/2002 | Everhart |
| 6,440,667 B1 | 8/2002 | Fodor |
| 6,456,762 B1 | 9/2002 | Nishiki |
| RE37,891 E | 10/2002 | Collins |
| 6,462,770 B1 | 10/2002 | Cline |
| 6,489,606 B1 | 12/2002 | Kersey |
| 6,496,287 B1 | 12/2002 | Seiberle |
| 6,506,342 B1 | 1/2003 | Frankel |
| 6,514,767 B1 | 2/2003 | Natan |
| 6,515,753 B2 | 2/2003 | Maher |
| 6,522,406 B1 | 2/2003 | Rovira |
| 6,524,793 B1 | 2/2003 | Chandler |
| 6,533,183 B2 | 3/2003 | Aasmul |
| 6,542,673 B1 | 4/2003 | Holter |
| 6,544,739 B1 | 4/2003 | Fodor |
| 6,545,758 B1 | 4/2003 | Sandstrom |
| 6,552,809 B1 | 4/2003 | Bergeron |
| 6,560,017 B1 | 5/2003 | Bianco |
| 6,565,770 B1 | 5/2003 | Mayer |
| 6,573,523 B1 | 6/2003 | Long |
| 6,576,424 B2 | 6/2003 | Fodor |
| 6,578,712 B1 | 6/2003 | Lawandy |
| 6,592,036 B2 | 7/2003 | Sadler |
| 6,594,421 B1 | 7/2003 | Johnson |
| 6,609,728 B1 | 8/2003 | Voerman |
| 6,613,581 B1 | 9/2003 | Wada |
| 6,618,342 B1 | 9/2003 | Johnson |
| 6,622,916 B1 | 9/2003 | Bianco |
| 6,628,439 B2 | 9/2003 | Shiozawa |
| 6,632,655 B1 | 10/2003 | Mehta |
| 6,635,470 B1 | 10/2003 | Vann |
| 6,635,863 B1 | 10/2003 | Nihommori |
| 6,646,243 B2 | 11/2003 | Pirrung |
| 6,657,758 B1 | 12/2003 | Garner |

| | | |
|---|---|---|
| 6,660,147 B1 | 12/2003 | Woudenberg |
| 6,678,429 B2 | 1/2004 | Mossberg |
| RE38,430 E | 2/2004 | Rosenstein |
| 6,689,316 B1 | 2/2004 | Blyth |
| 6,692,031 B2 | 2/2004 | McGrew |
| 6,692,912 B1 | 2/2004 | Boles |
| 6,708,618 B1 | 3/2004 | Tsai |
| 6,750,941 B2 | 6/2004 | Satoh et al. |
| 6,762,061 B1 | 7/2004 | Borrelli |
| 6,794,658 B2 | 9/2004 | MacAulay |
| 6,806,954 B2 | 10/2004 | Sandstrom |
| 6,858,184 B2 | 2/2005 | Pelrine |
| 6,874,639 B2 | 4/2005 | Lawandy |
| 6,881,789 B2 | 4/2005 | Bosse |
| 6,892,001 B2 | 5/2005 | Ohta |
| 6,905,885 B2 | 6/2005 | Colston |
| 6,908,737 B2 | 6/2005 | Ravkin |
| 6,919,009 B2 | 7/2005 | Stonas |
| 6,972,883 B2 | 12/2005 | Fujii |
| 6,982,996 B1 | 1/2006 | Putnam |
| 7,014,815 B1 | 3/2006 | Worthington |
| 7,045,049 B1 | 5/2006 | Natan |
| 7,065,032 B2 | 6/2006 | Horimai |
| 7,080,857 B2 | 7/2006 | Patton |
| 7,092,160 B2 | 8/2006 | Putnam |
| 7,106,513 B2 | 9/2006 | Moon |
| 7,122,384 B2 | 10/2006 | Prober |
| 7,126,755 B2 | 10/2006 | Moon |
| 7,164,533 B2 | 1/2007 | Moon |
| 7,190,522 B2 | 3/2007 | Moon |
| 7,215,628 B2 | 5/2007 | Horimai |
| 7,225,082 B1 | 5/2007 | Natan |
| 7,321,541 B2 | 1/2008 | Horimai |
| 7,339,148 B2 | 3/2008 | Kawano |
| 7,349,158 B2 | 3/2008 | Moon |
| 7,375,890 B2 | 5/2008 | Putnam |
| 7,399,643 B2 | 7/2008 | Moon et al. |
| 7,433,123 B2 | 10/2008 | Putnam et al. |
| 7,441,703 B2 | 10/2008 | Moon |
| 7,508,608 B2 | 3/2009 | Kersey et al. |
| 7,602,952 B2 | 10/2009 | Kersey |
| 7,604,173 B2 | 10/2009 | Kersey et al. |
| 7,619,819 B2 | 11/2009 | Moon et al. |
| 7,623,624 B2 | 11/2009 | Moon |
| 7,659,983 B2 | 2/2010 | Moon et al. |
| 7,791,802 B2 | 9/2010 | Putnam |
| 7,796,333 B2 | 9/2010 | Kersey |
| 2001/0007775 A1 | 7/2001 | Seul |
| 2001/0020375 A1 | 9/2001 | Novack |
| 2001/0029049 A1 | 10/2001 | Walt |
| 2002/0000471 A1 | 1/2002 | Aasmul |
| 2002/0006664 A1 | 1/2002 | Sabatini |
| 2002/0018430 A1 | 2/2002 | Heckenkamp |
| 2002/0021003 A1 | 2/2002 | McGrew |
| 2002/0022273 A1 | 2/2002 | Empedocles |
| 2002/0025534 A1 | 2/2002 | Goh |
| 2002/0031783 A1 | 3/2002 | Empedocles |
| 2002/0034747 A1 | 3/2002 | Bruchez |
| 2002/0039728 A1 | 4/2002 | Kain |
| 2002/0039732 A1 | 4/2002 | Bruchez |
| 2002/0074513 A1 | 6/2002 | Abel |
| 2002/0084329 A1 | 7/2002 | Kaye |
| 2002/0090650 A1 | 7/2002 | Empedocles |
| 2002/0094528 A1 | 7/2002 | Salafsky |
| 2002/0097658 A1 | 7/2002 | Worthington |
| 2002/0155490 A1 | 10/2002 | Skinner |
| 2002/0174918 A1 | 11/2002 | Fujimura et al. |
| 2002/0197456 A1 | 12/2002 | Pope |
| 2003/0008323 A1 | 1/2003 | Ravkin |
| 2003/0021003 A1 | 1/2003 | Ono |
| 2003/0032203 A1 | 2/2003 | Sabatini |
| 2003/0077038 A1 | 4/2003 | Murashima |
| 2003/0082568 A1 | 5/2003 | Phan |
| 2003/0082587 A1 | 5/2003 | Seul |
| 2003/0129654 A1 | 7/2003 | Ravkin |
| 2003/0138208 A1 | 7/2003 | Pawlak |
| 2003/0142704 A1 | 7/2003 | Lawandy |
| 2003/0142713 A1 | 7/2003 | Lawandy |
| 2003/0153006 A1 | 8/2003 | Washizu |

| | | |
|---|---|---|
| 2003/0162296 A1 | 8/2003 | Lawandy |
| 2003/0184730 A1 | 10/2003 | Price |
| 2003/0203390 A1 | 10/2003 | Kaye |
| 2003/0228610 A1 | 12/2003 | Seul |
| 2004/0027968 A1 | 2/2004 | Horimai |
| 2004/0047030 A1 | 3/2004 | MacAulay |
| 2004/0062178 A1 | 4/2004 | Horimai |
| 2004/0075907 A1 | 4/2004 | Moon |
| 2004/0100636 A1 | 5/2004 | Somekh |
| 2004/0100892 A1 | 5/2004 | Horimai |
| 2004/0125370 A1 | 7/2004 | Montagu |
| 2004/0125424 A1 | 7/2004 | Moon |
| 2004/0126875 A1 | 7/2004 | Putnam |
| 2004/0132205 A1 | 7/2004 | Moon |
| 2004/0156471 A1 | 8/2004 | Sakata |
| 2004/0170356 A1 | 9/2004 | Iazikov |
| 2004/0175842 A1 | 9/2004 | Roitman |
| 2004/0179267 A1 | 9/2004 | Moon |
| 2004/0209376 A1 | 10/2004 | Natan |
| 2004/0233485 A1 | 11/2004 | Moon |
| 2004/0263923 A1 | 12/2004 | Moon |
| 2005/0042764 A1 | 2/2005 | Sailor |
| 2005/0054004 A1 | 3/2005 | Alivisatos |
| 2005/0056587 A1 | 3/2005 | Allen et al. |
| 2005/0220408 A1 | 10/2005 | Putnam |
| 2005/0227252 A1 | 10/2005 | Moon |
| 2005/0270603 A1 | 12/2005 | Putnam |
| 2006/0023310 A1 | 2/2006 | Putnam |
| 2006/0028727 A1 | 2/2006 | Moon |
| 2006/0050544 A1 | 3/2006 | Horimai |
| 2006/0057729 A1 | 3/2006 | Moon |
| 2006/0063271 A1 | 3/2006 | Putnam |
| 2006/0067179 A1 | 3/2006 | Matsumoto |
| 2006/0071075 A1 | 4/2006 | Moon |
| 2006/0072177 A1 | 4/2006 | Putnam |
| 2006/0118630 A1 | 6/2006 | Kersey |
| 2006/0119913 A1 | 6/2006 | Moon |
| 2006/0132877 A1 | 6/2006 | Kersey |
| 2006/0134324 A1 | 6/2006 | Putnam |
| 2006/0139635 A1 | 6/2006 | Kersey |
| 2006/0140074 A1 | 6/2006 | Horimai |
| 2006/0160208 A1 | 7/2006 | Putnam |
| 2007/0121181 A1 | 5/2007 | Moon |
| 2007/0236789 A1 | 10/2007 | Moon |
| 2008/0085565 A1 | 4/2008 | Moon |
| 2008/0129990 A1 | 6/2008 | Moon |
| 2008/0165656 A1 | 7/2008 | Moon et al. |
| 2008/0170664 A1 | 7/2008 | Kalman |
| 2008/0192311 A1 | 8/2008 | Horimai |
| 2009/0034078 A1 | 2/2009 | Putnam et al. |
| 2009/0040885 A1 | 2/2009 | Horimai |
| 2009/0073520 A1 | 3/2009 | Kersey et al. |
| 2009/0194589 A1 | 8/2009 | Moon et al. |
| 2010/0025482 A1 | 2/2010 | Moon |
| 2010/0072278 A1 | 3/2010 | Putnam |
| 2010/0099574 A1 | 4/2010 | Moon |
| 2010/0246005 A1 | 9/2010 | Moon |
| 2010/0246007 A1 | 9/2010 | Moon |
| 2010/0255603 A9 | 10/2010 | Putnam |
| 2011/0003394 A1 | 1/2011 | Kersey |
| 2011/0033948 A9 | 2/2011 | Moon |
| 2011/0058172 A1 | 3/2011 | Moon |
| 2011/0114729 A1 | 5/2011 | Moon |

FOREIGN PATENT DOCUMENTS

| | | |
|---|---|---|
| DE | 2416652 | 10/1975 |
| EP | 0 395 300 | 10/1990 |
| EP | 0 723 149 | 7/1996 |
| EP | 0 798 573 A1 | 10/1997 |
| EP | 0 911 667 A1 | 4/1999 |
| EP | 916981 | 5/1999 |
| EP | 0 972 817 A1 | 1/2000 |
| EP | 1182054 | 2/2002 |
| EP | 1219979 | 7/2002 |
| GB | 2 118 189 | 10/1983 |
| GB | 2129551 | 5/1984 |
| GB | 2 138 821 | 10/1984 |
| GB | 2 299 235 | 9/1996 |
| GB | 2 306 484 | 5/1997 |

| | | |
|---|---|---|
| GB | 2 319 838 | 6/1998 |
| GB | 2372100 | 8/2002 |
| JP | 58143254 | 8/1983 |
| JP | 08102544 | 4/1986 |
| JP | 01047950 | 2/1989 |
| JP | 05307119 A2 | 11/1993 |
| JP | 06333102 A2 | 2/1994 |
| JP | 08272923 A2 | 10/1996 |
| JP | 10160705 | 6/1998 |
| JP | 11119029 | 4/1999 |
| JP | 20035521 | 2/2000 |
| JP | 00249706 | 9/2000 |
| JP | 2002-513166 | 5/2002 |
| JP | 22182022 A2 | 6/2002 |
| JP | 2003004671 | 8/2003 |
| WO | WO 91/06496 | 5/1991 |
| WO | WO 93/09668 | 5/1993 |
| WO | WO 94/28119 | 12/1994 |
| WO | WO 96/24061 | 8/1996 |
| WO | 9636436 | 11/1996 |
| WO | WO 96/36436 | 11/1996 |
| WO | WO 97/12680 | 4/1997 |
| WO | WO 97/15390 | 5/1997 |
| WO | WO 97/15690 | 5/1997 |
| WO | WO 97/17258 | 5/1997 |
| WO | WO 97/31282 | 8/1997 |
| WO | WO 97/34171 | 9/1997 |
| WO | WO 98/04740 | 2/1998 |
| WO | WO 98/24549 | 6/1998 |
| WO | WO 99/02266 | 1/1999 |
| WO | WO 99/09042 | 2/1999 |
| WO | WO 99/32654 | 7/1999 |
| WO | WO 99/42209 | 8/1999 |
| WO | WO 00/08443 | 2/2000 |
| WO | 0016893 | 3/2000 |
| WO | WO 00/19262 | 6/2000 |
| WO | WO 00/37914 | 6/2000 |
| WO | WO 00/37969 | 6/2000 |
| WO | WO 00/39617 | 7/2000 |
| WO | 0061198 | 10/2000 |
| WO | WO 00/63419 | 10/2000 |
| WO | WO 2004/011940 | 2/2001 |
| WO | 0158583 | 8/2001 |
| WO | 0171322 | 9/2001 |
| WO | 0178889 | 10/2001 |
| WO | WO 01/78889 | 10/2001 |
| WO | 02059306 | 8/2002 |
| WO | WO 02/059603 | 8/2002 |
| WO | WO 02/064829 | 8/2002 |
| WO | 03061983 | 7/2003 |
| WO | WO 03/091731 | 11/2003 |
| WO | WO 2004/015418 | 2/2004 |
| WO | 2004019276 | 3/2004 |
| WO | 2004024328 | 3/2004 |
| WO | 2004025562 | 3/2004 |
| WO | WO 2004/019276 | 3/2004 |
| WO | WO 2004/025561 | 3/2004 |
| WO | WO 2004/025563 | 3/2004 |
| WO | WO 2004/034012 | 4/2004 |
| WO | WO 2004/046697 | 6/2004 |
| WO | 2004066210 | 8/2004 |
| WO | WO 2005/026729 | 3/2005 |
| WO | WO 2005/027031 | 3/2005 |
| WO | WO 2005/029047 | 3/2005 |
| WO | WO 2005/033681 | 4/2005 |
| WO | WO 2005/050207 | 6/2005 |
| WO | WO 2005/079544 | 9/2005 |
| WO | WO 2005/101487 | 10/2005 |
| WO | WO 2006/020363 | 2/2006 |
| WO | WO 2006/055735 | 5/2006 |
| WO | WO 2006/055736 | 5/2006 |
| WO | WO 2006/076053 | 7/2006 |

OTHER PUBLICATIONS

"Compact Disc Arrayer"; V&P Scientific; Nov. 17, 2003; pp. 1-4.
"Electronically Scanned Confocal Imaging System"; IBM Technical Disclosure Bulletin; vol. 36; No. 06B; Jun. 1993; pp. 261-262.
"Ben Beune Patent Licensing Director of Philips IP&S"; Replication & Duplication—News & Technology; Jan.-Feb. 2002; pp. 1-2.
Andrew Marshall; "DNA Chips: Array of Possibilities"; Nature Biotechnology vol. 16 Jan. 1998; pp. 27-31.
de Beer et al., "Forward-Scattering Degenerate Four-Wave Mixing for Sensitive Absorption Detection in Microseparation Systems Coupling to Micro-Column Liquid Chromatography"; Journal of Chromatography A. 811 (1998); pp. 35-45.
Fonjallaz et al., "Interferometric Side Diffraction Technique for the Characterisation of Fiber Gratings"; 1999 OSA Conference, Sep. 23-25; 3 pgs.
G. Kakarantzas et al.;"Transmission Filters Based on periodically Micro-tapered Fibre"; CLE0/2000/Friday Morning; 8:45 a.m.; pp. 574-575.
Hideki Kambara; Recent Progress in fluorescent DNA Analyzers and Methods; Current Topics in Analytical checmistry; vol. 1, (1998) pp. 21-36.
Ivan Oransky; "Sequencing on Compact Disc? Microgenomics of Breast Cancer; Better Binding Site Prediction"; vol. 17 / Issue 13 / 35 / Jun. 30, 2003; 13 pgs.
Kashyap R.; "Fiber Bragg Gratings"; Academic Press, Ch. 9; pp. 430-433; 1999.
Kogelnik H; "Coupled Wave Theory for Thick Hologram Gratings"; The Bell System Technical Journal, 48(9):2909-2947 (1969).
Krug P., "Measurement of Index Modulation Along an Optical Fiber Bragg Grating"; Optics Letters, 20(17):1767-1769.
Leith et al., "Holographic Data Storage in Three-Dimensional Media"; Applied Optics, vol. 5, No. 8, Aug. 1966; 21 pgs.
Mark O. Worthington; "Curriculum Vitae"; Jan. 5, 2004; 4 pgs.
Masato Mitsuhashi; "Gene Manipulation on Plastic Plates"; Nature, vol. 357, Jun. 11, 1992; pp. 519-520.
Michael C. Needels et al.; "Generation and Screening of an Oligonucleotide-Encoded Synthetic Peptide Library"; Proc Natl. Acad. Sci. USA, vol. 90;pp. 10700-10704, Nov. 1993.
Michael J. Kozal; "Extensive Polymorphisms Observed in HIV-1 Clade B Protease Gene Using High-Density Oligonucleotide Arrays"; Nature Medicine, vol. 2, No. 7, Jul. 1996; pp. 753-759.
Shelia R. Nicenwarner-Peña, "Submicrometer Metallic Barcodes"; Science, vol. 294; Oct. 5, 2001; 5 pgs.
Thomas Laurell; "Enhanced Enzyme Activity in Silicon Integrated Enzyme Reactors Utilizing Porous Silicon as the Coupling Matrix"; Sensor & Actuators B 31 (1996); pp. 161-166.
Vander Lugt; "Design Relationships for Holographic Memories"; Applied Optics, vol. 12, No. 7, Jul. 1973; pp. 1675-1685.
W.R. Rigby; "An Anodizing Process for the Production of Inorganic Microfiltration Membranes"; 2436Transactions of the Institute of Metal Finishing;68Aug. 1990,Part 3 p. 95-98.
Yoshinobu Kohara; "DNA Probes on Beads Arrayed in a Capillary, 'Bead-Array', Exhibited High Hybridization Performance"; Nucleic Acids Research, 2002, vol. 30, No. 16 e87; 7 pgs.
Material Safety Data Sheet Aquaclean 900; Aquabond Technologies (ABT); 1 pg., revised May 2000.
U.S. Patent No. 6,780,301 to Natan et al., published Aug. 2004 (Patent was deleted after issuance so no longer part of PTO database).
Lawton et al. "Biomolecular Self-Assembly of Quantum-Dot Composites" Material Research Society Proceedings 330:283 (6 pages) (1994).
Jain KK, Nanodiagnostics: Application of Nanotechnology in Molecular Diagnostics, Expert Review of Molecular Diagnostics 3(2):153-161 (2003), XP008038849.
Lide (CRC Handbook of Chemistry and Physics, 71st ed.), 1991.
Othonos, X. Lee; Superimposed Multiple Bragg Gratings, Nov. 10, 1994, vol. 30, No. 23.
Patil et al. (AAPS PharmSciTech, Mar. 24, 2006, vol. 7, pp. E1-E7), 2004.
Po Ki Yuen, Microbarcode Sorting Device; Science & Technology, Corning Incorparated, Corning, New York 14831-0007, USA, 2003.
International Search Report and Written Opinion for International Application No. PCT/US2003/26315, 2004.
International Search Report and Written Opinion for International Application No. PCT/US2003/26316, 2004.
International Search Report for International Application No. PCT/US2003/28862, 2004.
International Search Report for International Application No. PCT/US2003/28874, 2004.

International Search Report for International Application No. PCT/US2003/28875, 2004.
International Search Report for International Application No. PCT/US2003/28887, 2004.
International Search Report for International Application No. PCT/US2003/28890, 2003.
International Search Report and Written Opinion for International Application No. PCT/US2003/29164, 2004.
International Search Report for International Application No. PCT/US2003/29244, 2004.
International Search Report and Written Opinion for International Application No. PCT/US2004/01685, 2004.
International Search Report and Written Opinion for International Application No. PCT/US2004/30037, 2005.
International Search Report and Written Opinion for International Application No. PCT/US2004/30038, 2005.
International Search Report and Written Opinion for International Application No. PCT/US2004/30300, 2005.
International Search Report and Written Opinion for International Application No. PCT/US2004/32084, 2005.
International Search Report and Written Opinion for International Application No. PCT/US2004/38416, 2005.
International Search Report and Written Opinion for International Application No. PCT/US2005/05743, 2006.
International Search Report and Written Opinion for International Application No. PCT/US2005/05745, 2006.
International Search Report and Written Opinion for International Application No. PCT/US2005/26289, 2006.
International Search Report and Written Opinion for International Application No. PCT/US2005/33694, 2006.
International Search Report and Written Opinion for International Application No. PCT/US2005/41730, 2006.
International Search Report and Written Opinion for International Application No. PCT/US2005/41731, 2006.
Introduction to Flow Cytometry: A Learning Guide. Manual Part No. 11-11032-01, Apr. 2000, 54 pgs.

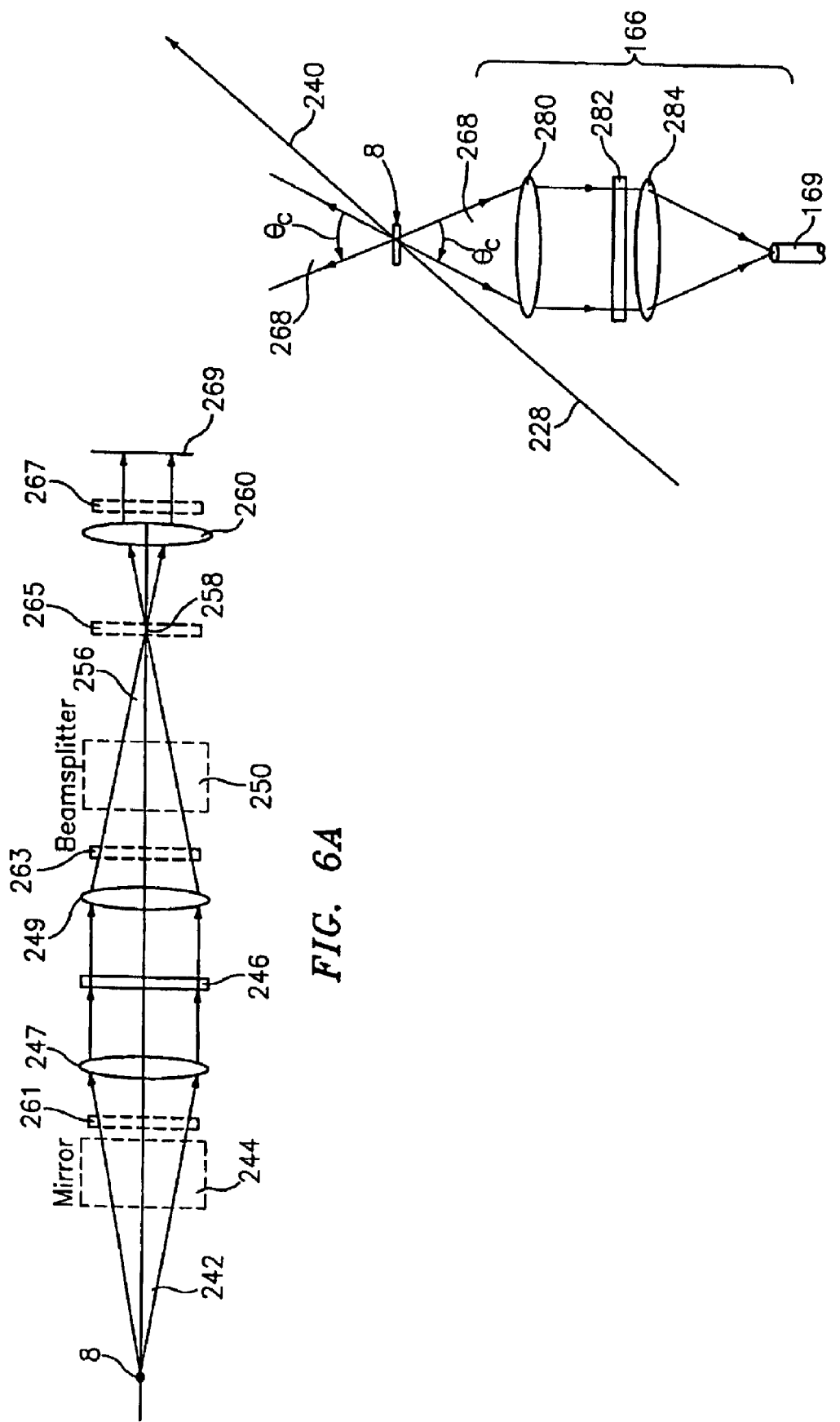

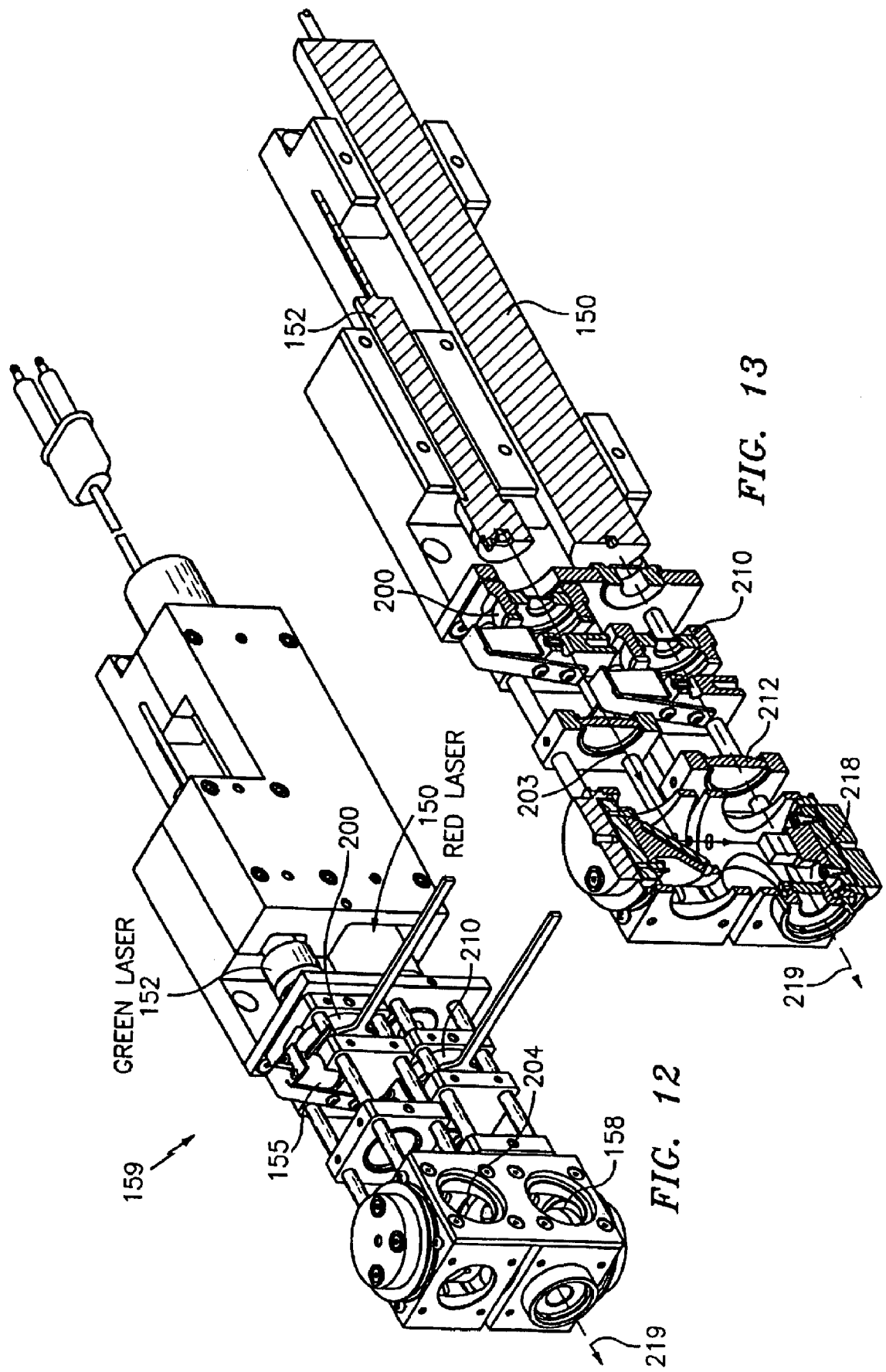

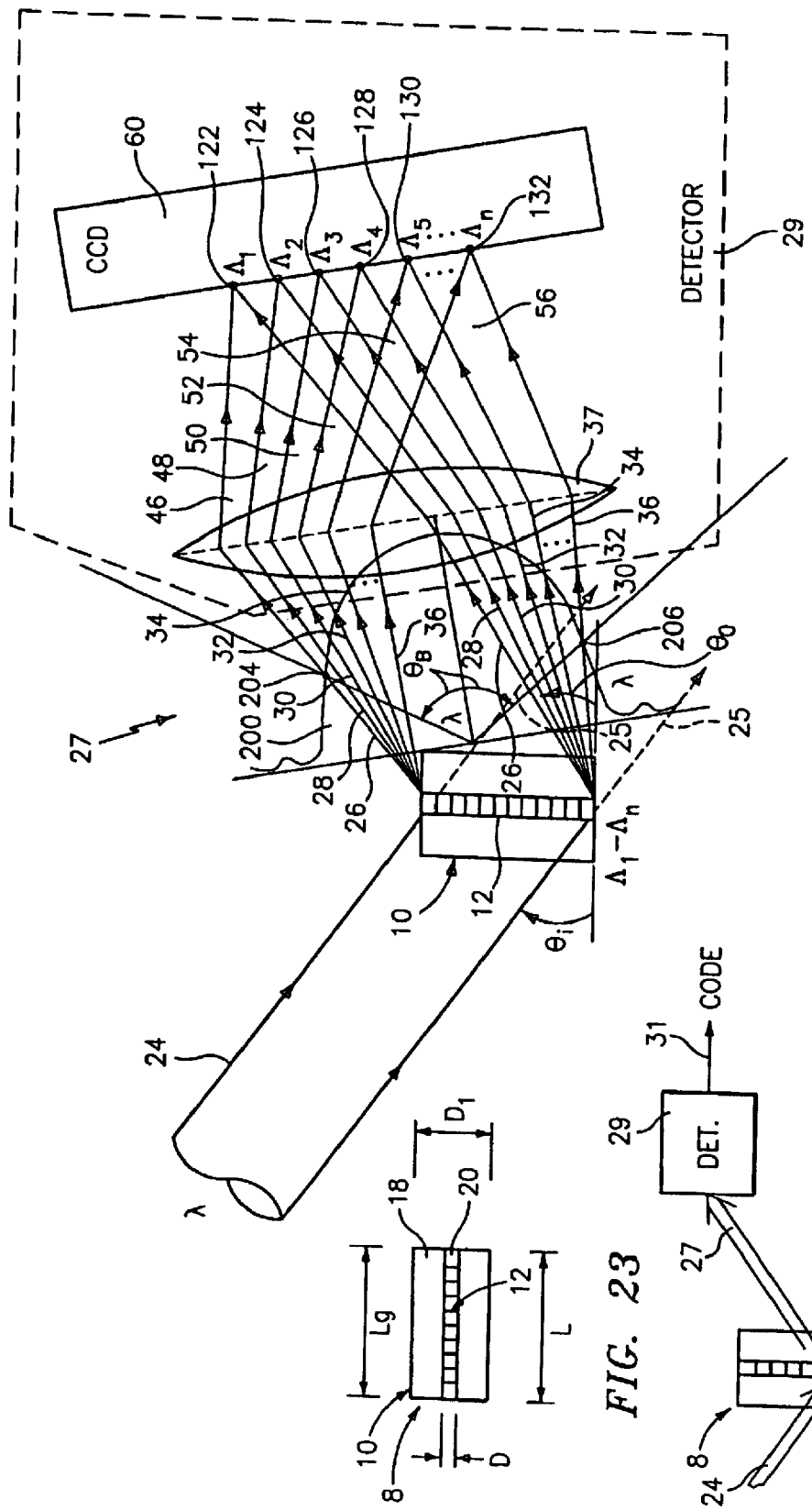

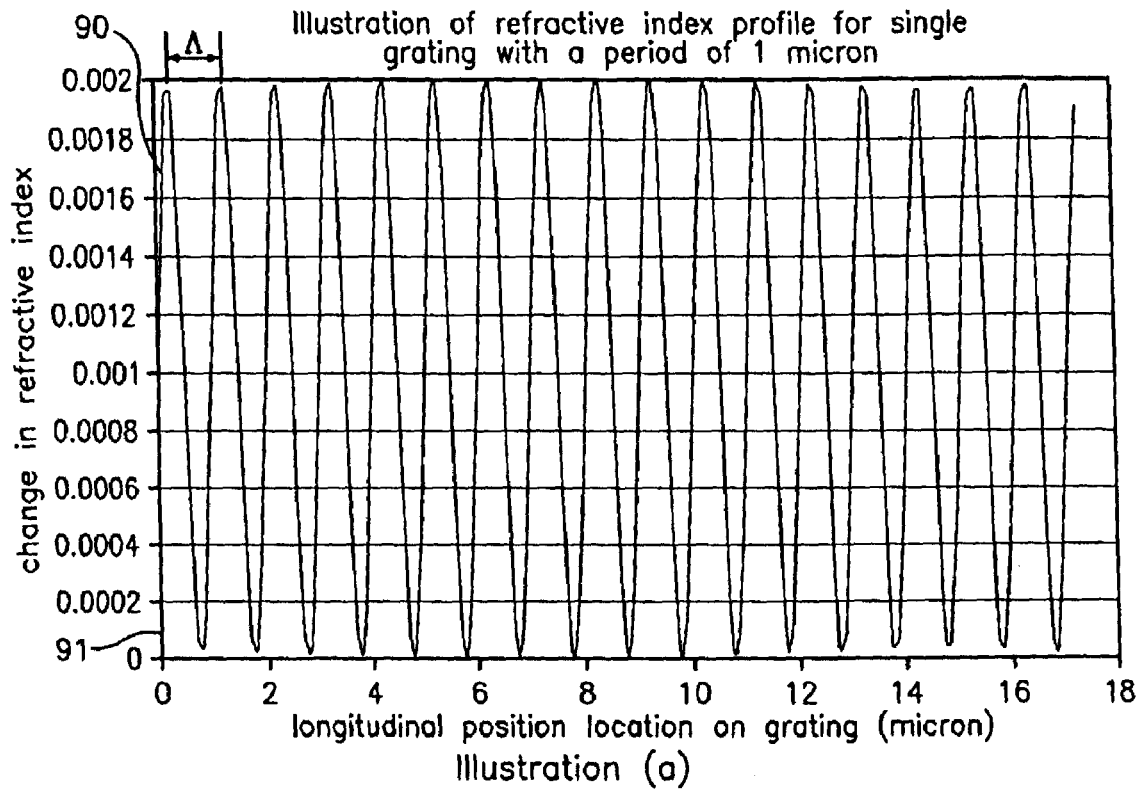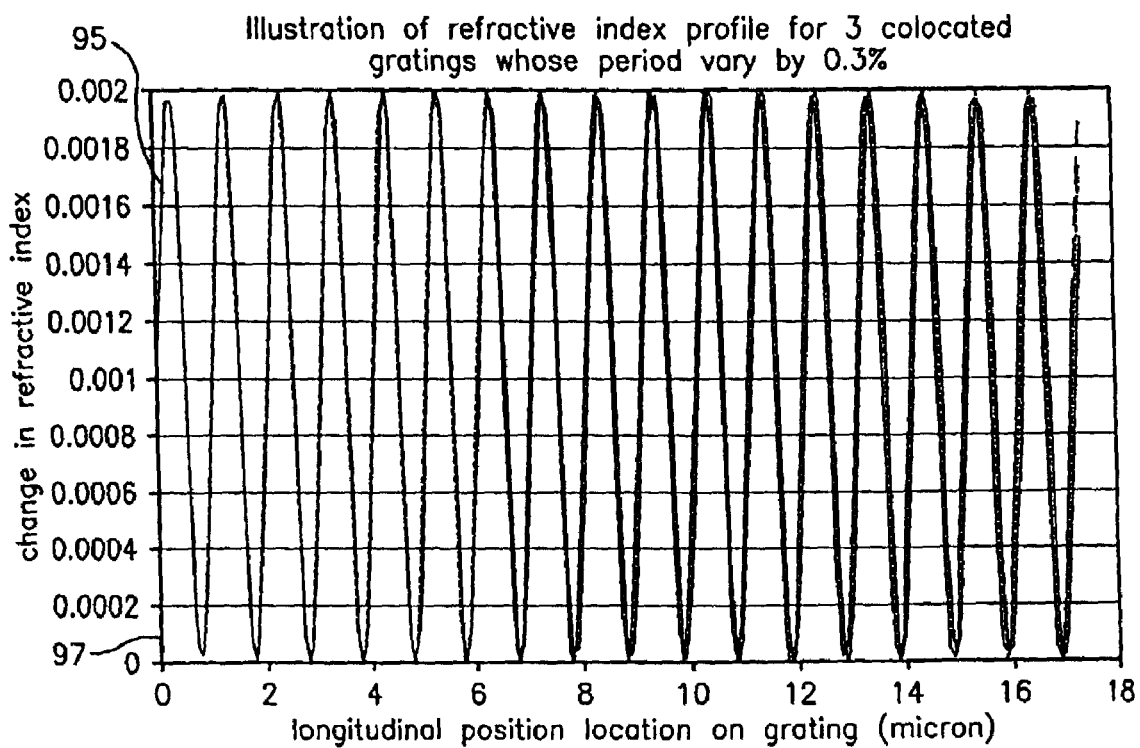
FIG. 29

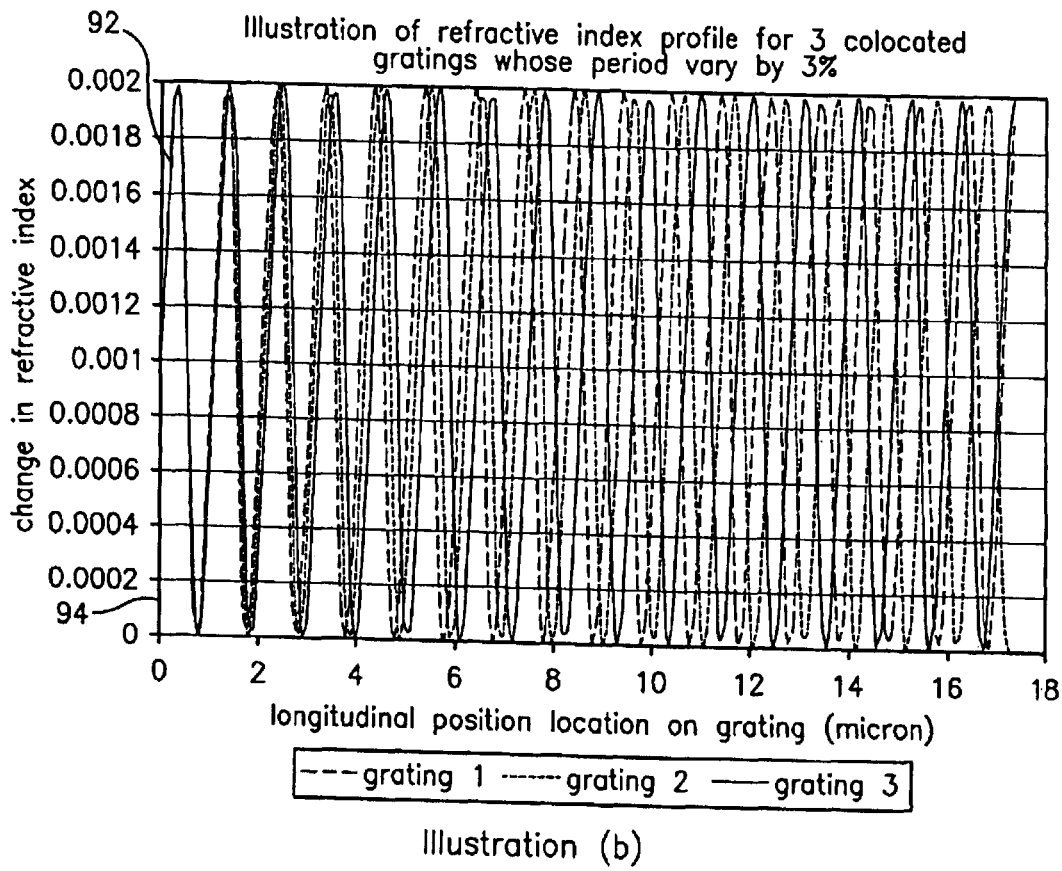
Illustration (b)
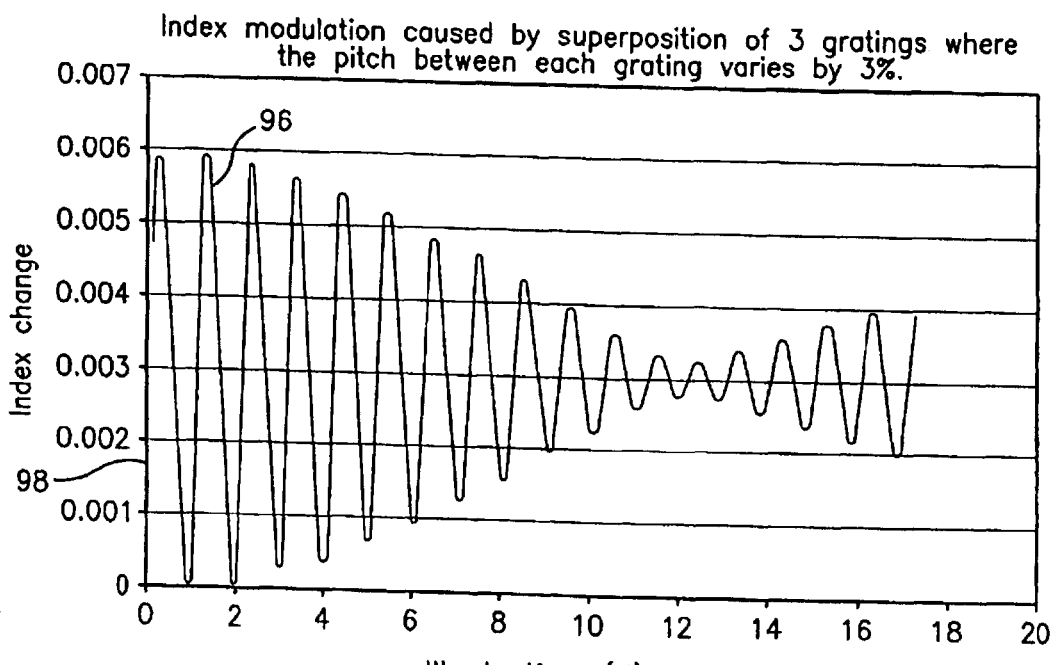
FIG. 29     Illustration (d)

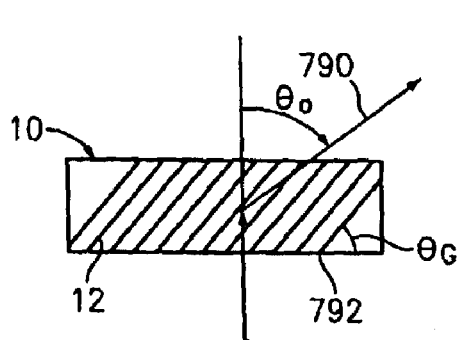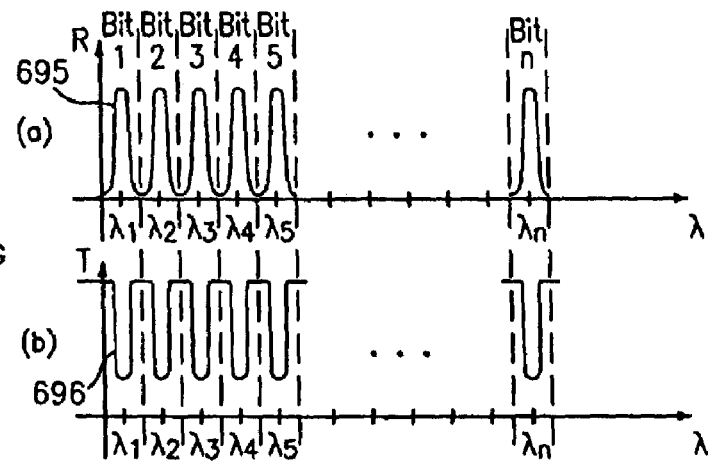
FIG. 31
FIG. 30
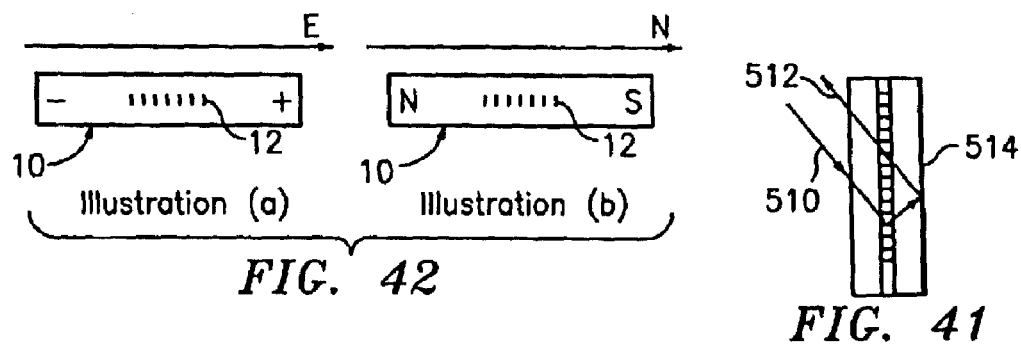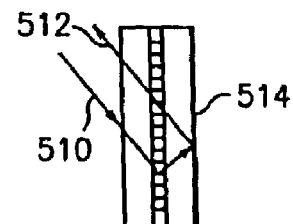
FIG. 42
FIG. 41
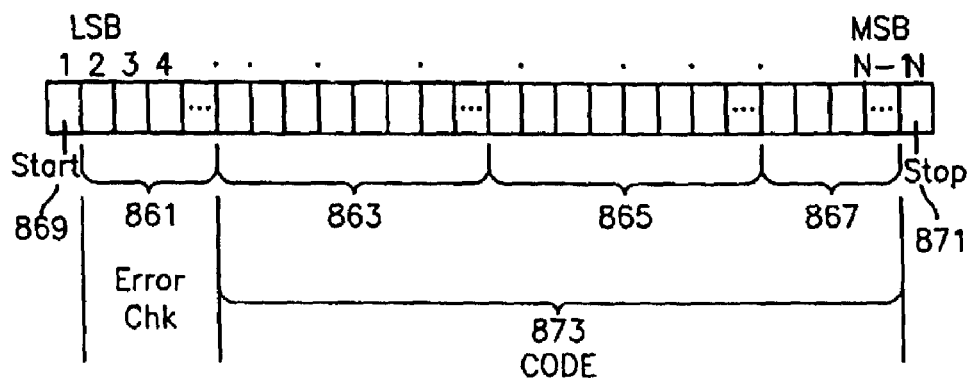
FIG. 43

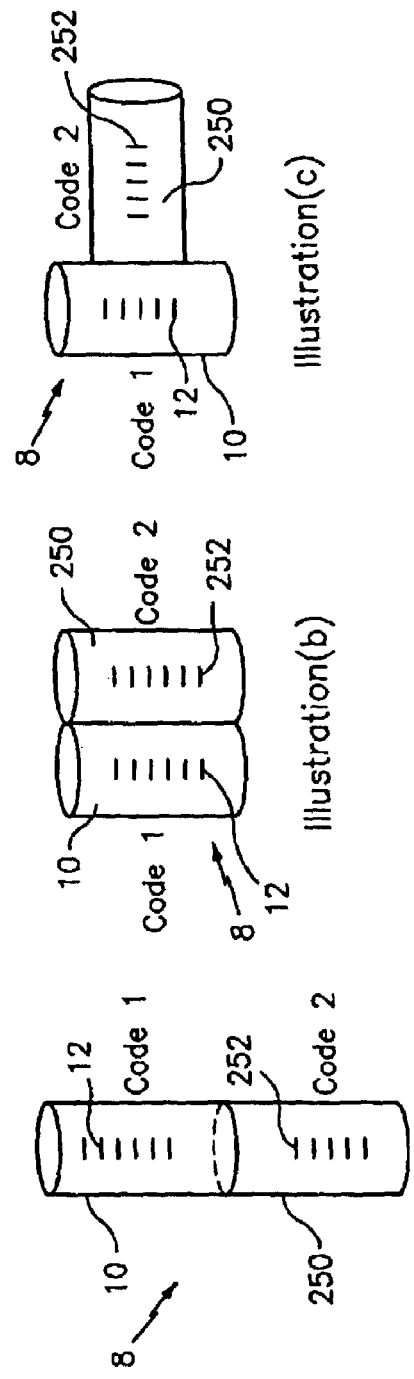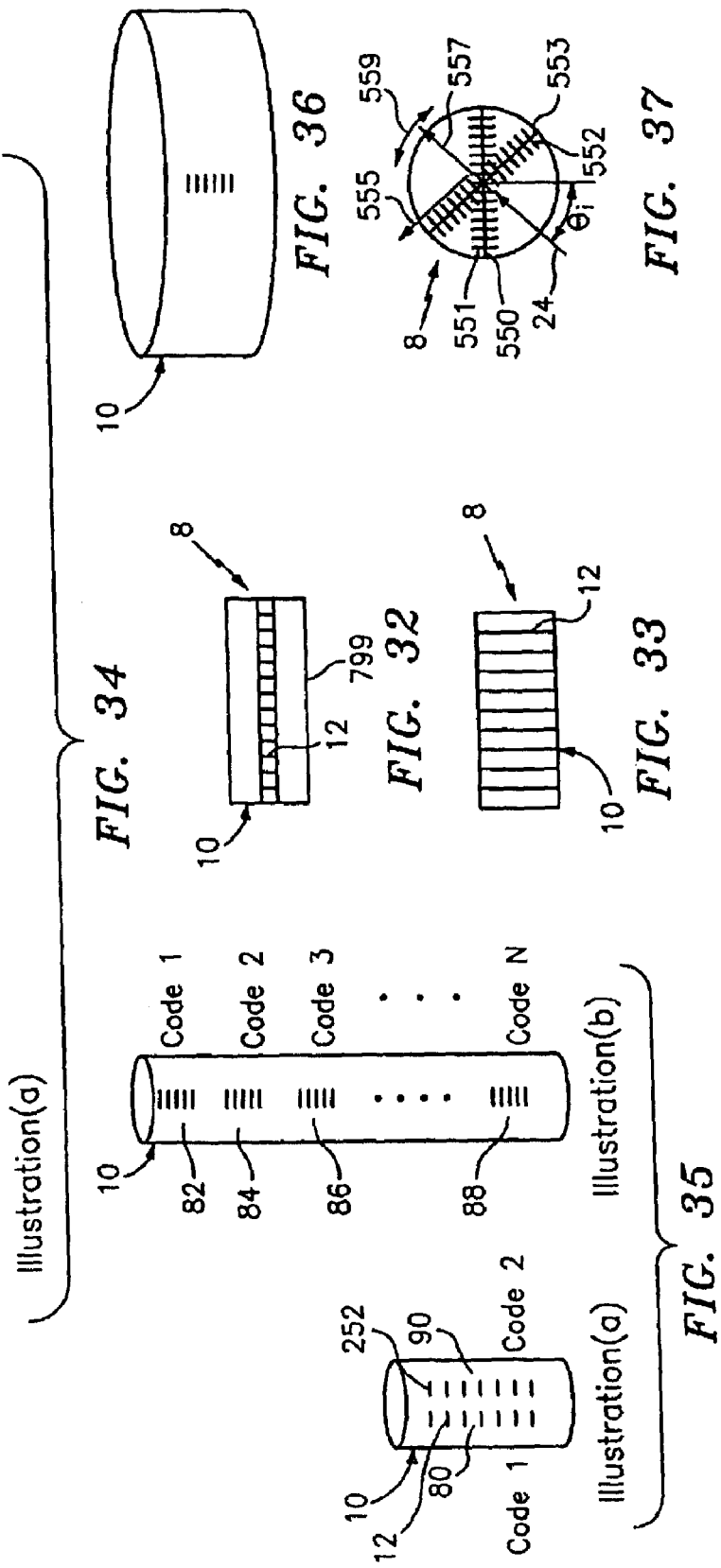

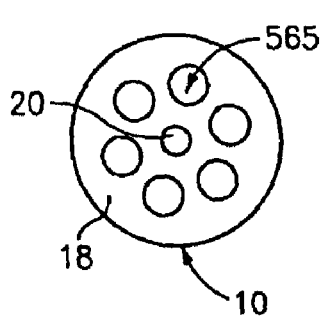
Illustration(a)
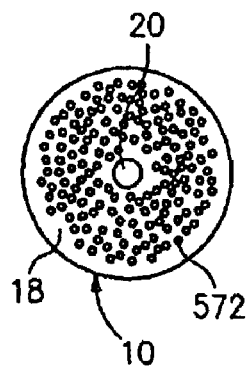
Illustration(b)
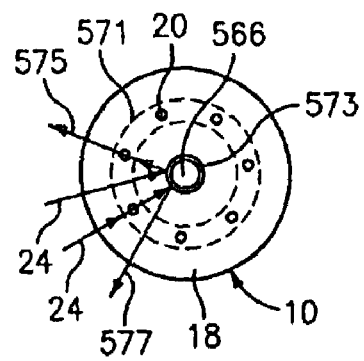
Illustration(c)
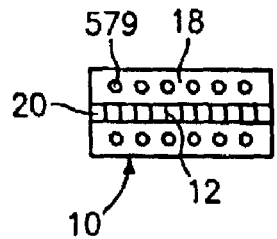
Illustration(d)
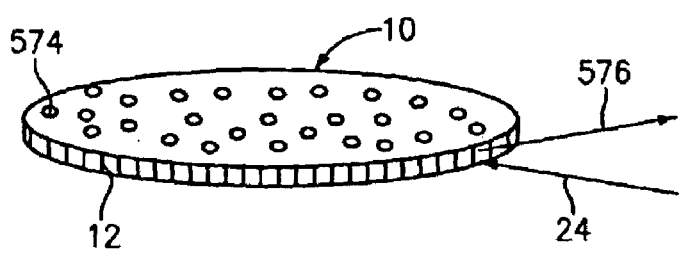
Illustration(e)
*FIG. 38*
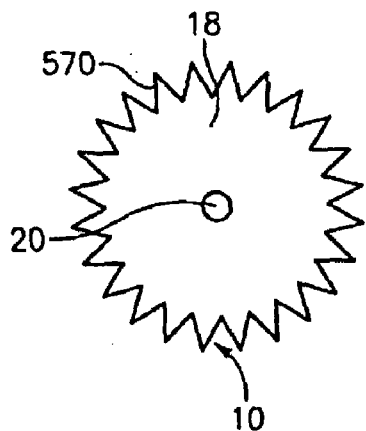
Illustration(a)
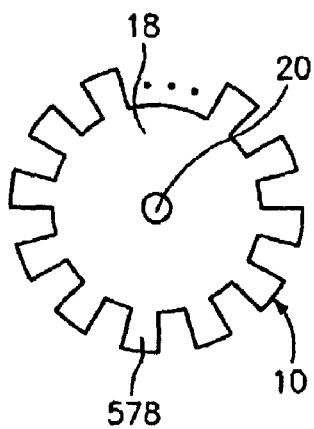
Illustration(b)
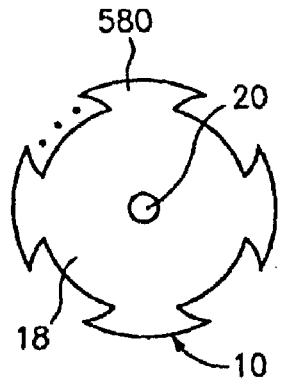
Illustration(c)
*FIG. 39*
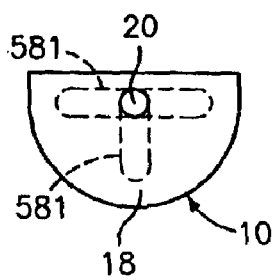
Illustration(a)
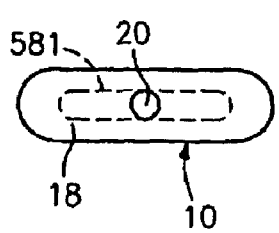
Illustration(b)
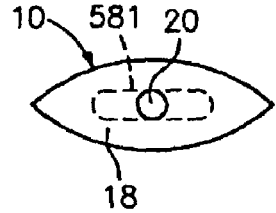
Illustration(c)
*FIG. 40*

Average Intensity Of Code Readout Laser On Camera During Scan Down A Single Groove. Pairs Of Peaks Define A Bead Position. This Information Can Be Used To Locate Beads And Subsequently Read Out The Codes.

Scan sequence of single bead

Sequence of images taken with code camera as bead is scanned in the longitudinal direction along the code beam.

Results of looking at the holographic signals on each of six beads.

Bead to Beam Position Offset

Beam-bead angle, no errors

Beam-Bead Alignment, In-Plane Error

Beam-Bead Alignment, Out-of-Plane Error

OPTICAL READER SYSTEM FOR SUBSTRATES HAVING AN OPTICALLY READABLE CODE

CROSS REFERENCES TO RELATED APPLICATIONS

This application is a continuation of U.S. patent application Ser. No. 12/174,490, filed Jul. 16, 2008, which is a continuation of U.S. patent application Ser. No. 10/956,791, filed Oct. 1, 2004 (hereinafter referred to as "the '791 application"), which claims the benefit of U.S. Provisional Patent Applications Nos. 60/512,302, filed Oct. 17, 2003; 60/513,053, filed Oct. 21, 2003; 60/546,435, filed Feb. 19, 2004; 60/610,829, filed Sep. 17, 2004. The '791 application is also a continuation-in-part of U.S. patent application Ser. No. 10/661,234, filed Sep. 12, 2003, which is a continuation-in-part of U.S. patent application Ser. No. 10/645,689, filed Aug. 20, 2003, which claimed the benefit of U.S. Provisional Patent Application Nos. 60/405,087, filed Aug. 20, 2002, and 60/410,541, filed Sep. 12, 2002. The '791 application is also a continuation-in-part of U.S. patent application Ser. No. 10/661,836, filed Sep. 12, 2003. All of the above applications are incorporated herein by reference in their entirety.

The following cases contain subject matter related to that disclosed herein and are incorporated herein by reference in their entirety: U.S. patent application Ser. No. 10/661,234, filed Sep. 12, 2003, entitled "Diffraction Grating-Based Optical Identification Element"; U.S. patent application Ser. No. 10/661,031 filed Sep. 12, 2003, entitled "Diffraction Grating-Based Encoded Micro-particles for Multiplexed Experiments"; U.S. patent application Ser. No. 10/661,082, filed Sep. 12, 2003, entitled "Method and Apparatus for Labeling Using Diffraction Grating-Based Encoded Optical Identification Elements"; U.S. patent application Ser. No. 10/661,115, filed Sep. 12, 2003, entitled "Assay Stick"; U.S. patent application Ser. No. 10/661,836, filed Sep. 12, 2003, entitled "Method and Apparatus for Aligning Microbeads in order to Interrogate the Same"; U.S. patent application Ser. No. 10/661,254, filed Sep. 12, 2003, entitled "Chemical Synthesis Using Diffraction Grating-based Encoded Optical Elements"; U.S. patent application Ser. No. 10/661,116, filed Sep. 12, 2003, entitled "Method of Manufacturing of a Diffraction grating-based identification Element"; and U.S. patent application Ser. No. 10/763,995, filed Jan. 22, 2004, entitled, "Hybrid Random Bead/Chip Based Microarray"; and U.S. Provisional Patent Application Ser. No. 60/555,449, filed Mar. 22, 2004, entitled, "Diffraction Grating-Based Encoded Micro-particles for Multiplexed Experiments".

TECHNICAL FIELD

This invention relates to optical readers of optical identification elements, and more particularly to an optical readers for diffraction grating-based encoded optical identification elements.

BACKGROUND ART

A common class of experiments, known as a multiplexed assay or multiplexed bio-chemical experiment, comprises mixing (or reacting) a labeled target analyte or sample (which may have known or unknown properties or sequences) with a set of "probe" or reference substances (which also may have known or unknown properties or sequences). Multiplexing allows many properties of the target analyte to be probed or evaluated simultaneously (i.e., in parallel). For example, in a gene expression assay, the "target" analyte, usually an unknown sequence of DNA, is labeled with a fluorescent molecule to form the labeled analyte. One known type of assay is a "bead-based" assay where the probe molecules are attached to beads or particles.

For example, in a known DNA/genomic bead-based assay, each probe consists of known DNA sequences of a predetermined length, which are attached to a labeled (or encoded) bead or particle. When a labeled "target" analyte (in this case, a DNA sequence) is mixed with the probes, segments of the labeled target analyte will selectively bind to complementary segments of the DNA sequence of the known probe. The known probes are then spatially separated and examined for fluorescence. The beads that fluoresce indicate that the DNA sequence strands of the target analyte have attached or hybridized to the complementary DNA on that bead. The DNA sequences in the target analyte can then be determined by knowing the complementary DNA (or cDNA) sequence of each known probe to which the labeled target is attached. In addition, the level of fluorescence is indicative of how many of the target molecules hybridized (or attached) to the probe molecules for a given bead. As is known, a similar bead-based assay may be performed with any set of know and unknown molecules/analyte/ligand.

In such bead-based assays, the probes are allowed to mix without any specific spatial position, which is often called the "random bead assay" approach. In addition, the probes are attached to a bead so they are free to move (usually in a liquid medium). Further, this approach requires that each bead or probe be individually identifiable or encoded. In addition, a bead based assay has the known advantage that the analyte reaction can be performed in a liquid/solution by conventional wet-chemistry techniques, which gives the probes a better opportunity to interact with the analyte than other assay techniques, such as a known planar microarray assay format.

There are many bead/substrate types that can be used for tagging or otherwise uniquely identifying individual beads with attached probes. Known methods include using polystyrene latex spheres that are colored or fluorescent labeled. Other methods include using small plastic particles with a conventional bar code applied, or a small container having a solid support material and a radio-frequency (RF) tag. Such existing beads/substrates used for uniquely identifying the probes, however, may be large in size, have a limited number of identifiable codes, and/or made of a material not suitable to harsh environmental conditions, such as, harsh temperature, pressure, chemical, nuclear and/or electromagnetic environments.

Therefore, it would be desirable to provide encoded beads, particles or substrates for use in bead-based assays that are very small, capable of providing a large number of unique codes (e.g., greater than 1 million codes), and/or have codes which are resistant to harsh environments and to provide a reader for reading the code and/or the fluorescent label attached to the beads.

Also, there are many industries and applications where it is desirable to uniquely label or identify items, such as large or small objects, plants, and/or animals for sorting, tracking, identification, verification, authentication, or for other purposes. Existing technologies, such as bar codes, electronic microchips/transponders, radiofrequency identification (RFID), and fluorescence (or other optical techniques), are often inadequate. For example, existing technologies may be too large for certain applications, may not provide enough different codes, cannot be made flexible or bendable, or cannot withstand harsh environments, such as, harsh temperature, pressure, chemical, nuclear and/or electromagnetic environments.

Therefore, it would be desirable to obtain a labeling technique and/or encoded substrate for labeling items that provides the capability of providing many codes (e.g., greater than 1 million codes), that can be made very small (depending on the application) and/or that can withstand harsh environments and to provide a reader for reading the code and/or the fluorescent label attached to the beads.

SUMMARY OF THE INVENTION

Objects of the present invention include provision of a reader for an optical identification elements where the elements may have a large number of distinct codes, may be made very small (depending on the application) and/or can withstand harsh environments.

According to the present invention, an optical reader for reading microbeads, comprises said reader capable of receiving at least one microbead disposed therein, each microbead having at least one code disposed therein, said microbead having at least one diffraction grating disposed therein, said grating having at least one refractive index pitch superimposed at a common location, said grating providing an output optical signal indicative of said code when illuminated by an input light signal; a source light providing said input light signal incident at a location where said microbeads are located when loaded; and a reader which reads said output optical signal and provides a code signal indicative of said code.

The present invention provides a reader for reading codes and/or fluorescence signals from an encoded optical identification elements capable of having many different optically readable codes.

The reader of the present invention optimizes fluorescent measurements when microbeads having a cylindrical shape are used, while minimizing sensitivity to beam positioning and/or bead misalignment.

In addition, the invention can easily identify a bead and the code therein along a scan having many beads along a row and compensates for uneven, jagged, and/or inconsistent surface geometries for the end effects of the beads, as well as when beads densely packed end-to-end.

Further, because the code is projected and read in the "far field" or Fourier plane, the reader of the present invention does not require expensive imaging and magnifying optics to create a high resolution magnified image of the bead to read the code. This is different from prior readers which actually image the bead itself to determine the code, e.g., for small particles that have bar codes printed on them.

The elements may be very small "microbeads" (or microelements or microparticles or encoded particles) for small applications (about 1-1000 microns), or larger "macroelements" for larger applications (e.g., 1-1000 mm or much larger). The elements may also be referred to as encoded particles or encoded threads. Also, the element may be embedded within or part of a larger substrate or object.

The element has a substrate containing an optically readable composite diffraction grating having a resultant refractive index variation made up of one or more collocated refractive index periods (or spacings or pitches $\Lambda$) that make-up a predetermined number of bits. The microbead allows for a high number of uniquely identifiable codes (e.g., thousands, millions, billions, or more). The codes may be digital binary codes and are readable by the present invention.

The element may be made of a glass material, such as silica or other glasses, or may be made of plastic or polymer, or any other material capable of having a diffraction grating disposed therein. Also, the element may be cylindrical in shape or any other geometry, provided the design parameters are met. For certain applications, a cylindrical shape is optimal. The gratings (or codes) are embedded inside (including on or near the surface) of the substrate and may be permanent non-removable codes that can operate in harsh environments (chemical, temperature, nuclear, electromagnetic, etc.).

The present invention reads the code in the element as well as any fluorescence that may exist on the microbeads. In addition, the invention may use the same laser to both interrogate the code and read a fluorescent signal from the bead, without interference between the two, thereby saving cost and time.

The present invention interrogates the beads on a planar surface, e.g., a groove plate. The invention may act as a "virtual cytometer", which provides a series of code and fluorescence data from a series of beads, similar to a flow cytometer; however, with in the present invention the beads are disposed on a planar substrate. The beads may be aligned by other than grooves if desired. Alternatively, the surface need not be planar, e.g., it may have a cylindrical or other non-planar shape, such as that described in pending U.S. Provisional Patent Application Nos. 60/609,583 and 60/610,910, which are incorporated herein by reference in their entirety. Also, the reader may be used with a classical flow cytometer configuration if desired, where beads are flowed by the reader head in a fluid stream.

In addition to reading the bead code and/or fluorescence, the reader can determine the precise location of each bead read in the bead cell, and can then return to any given bead for further review and/or analysis if desired. This feature also allows the reader to be used as a bead "mapper", i.e., to identify or map the exact location of each bead on a planar surface. Also, the reader could use fluorescent "tracer" beads having a predetermined fluorescent signal, different from the other beads, which would allow the reader to map the locations of all the beads based on the location of the tracer beads. Further, once the location of the beads in a cell are mapped, the bead cell can be used in another reader or scanner for review and/or analysis. Other techniques may also be used to orient the reader to a predetermined calibration or standard cell location from which all the beads may be mapped if desired.

The foregoing and other objects, features and advantages of the present invention will become more apparent in light of the following detailed description of exemplary embodiments thereof.

BRIEF DESCRIPTION OF THE DRAWINGS

FIG. 6A is a more detailed optical schematic of code pickup optics of FIG. 6, in accordance with the present invention.

FIG. 6B is a more detailed schematic of the fluorescence pick-up optics of FIG. 6.

FIG. 12 is a perspective view of a laser block assembly of the optical reader of FIG. 8, in accordance with the present invention.

FIG. 13 is a side cross-sectional perspective view of the laser block assembly of FIG. 12, in accordance with the present invention.

FIG. 23 is a side view of an optical identification element, in accordance with the present invention.

FIG. 24 is a top level optical schematic for reading a code in an optical identification element, in accordance with the present invention.

FIG. 25 is an optical schematic for reading a code in an optical identification element, in accordance with the present invention.

FIG. 29 illustrations (a)-(d) show graphs of different refractive index pitches and a summation graph, in accordance with the present invention.

FIG. 30 illustrations (a)-(b) are graphs of reflection and transmission wavelength spectrum for an optical identification element, in accordance with the present invention.

FIG. 31 is side view of a blazed grating for an optical identification element, in accordance with the present invention.

FIG. 32 is a side view of an optical identification element having a coating, in accordance with the present invention.

FIG. 33 is a side view of an optical identification element having a grating across an entire dimension, in accordance with the present invention.

FIG. 34, illustrations (a)-(c) are perspective views of alternative embodiments for an optical identification element, in accordance with the present invention.

FIG. 35, illustrations (a)-(b) are perspective views of an optical identification element having multiple grating locations, in accordance with the present invention.

FIG. 36, is a perspective view of an alternative embodiment for an optical identification element, in accordance with the present invention.

FIG. 37 is a view an optical identification element having a plurality of gratings located rotationally around the optical identification element, in accordance with the present invention.

FIG. 38 illustrations (a)-(e) show various geometries of an optical identification element that may have holes therein, in accordance with the present invention.

FIG. 39 illustrations (a)-(c) show various geometries of an optical identification element that may have teeth thereon, in accordance with the present invention.

FIG. 40 illustrations (a)-(c) show various geometries of an optical identification element, in accordance with the present invention.

FIG. 41 is a side view an optical identification element having a reflective coating thereon, in accordance with the present invention.

FIG. 42 illustrations (a)-(b) are side views of an optical identification element polarized along an electric or magnetic field, in accordance with the present invention.

FIG. 43 shows a bit format for a code in an optical identification element, in accordance with the present invention.

BEST MODE FOR CARRYING OUT THE INVENTION

Figure 1:
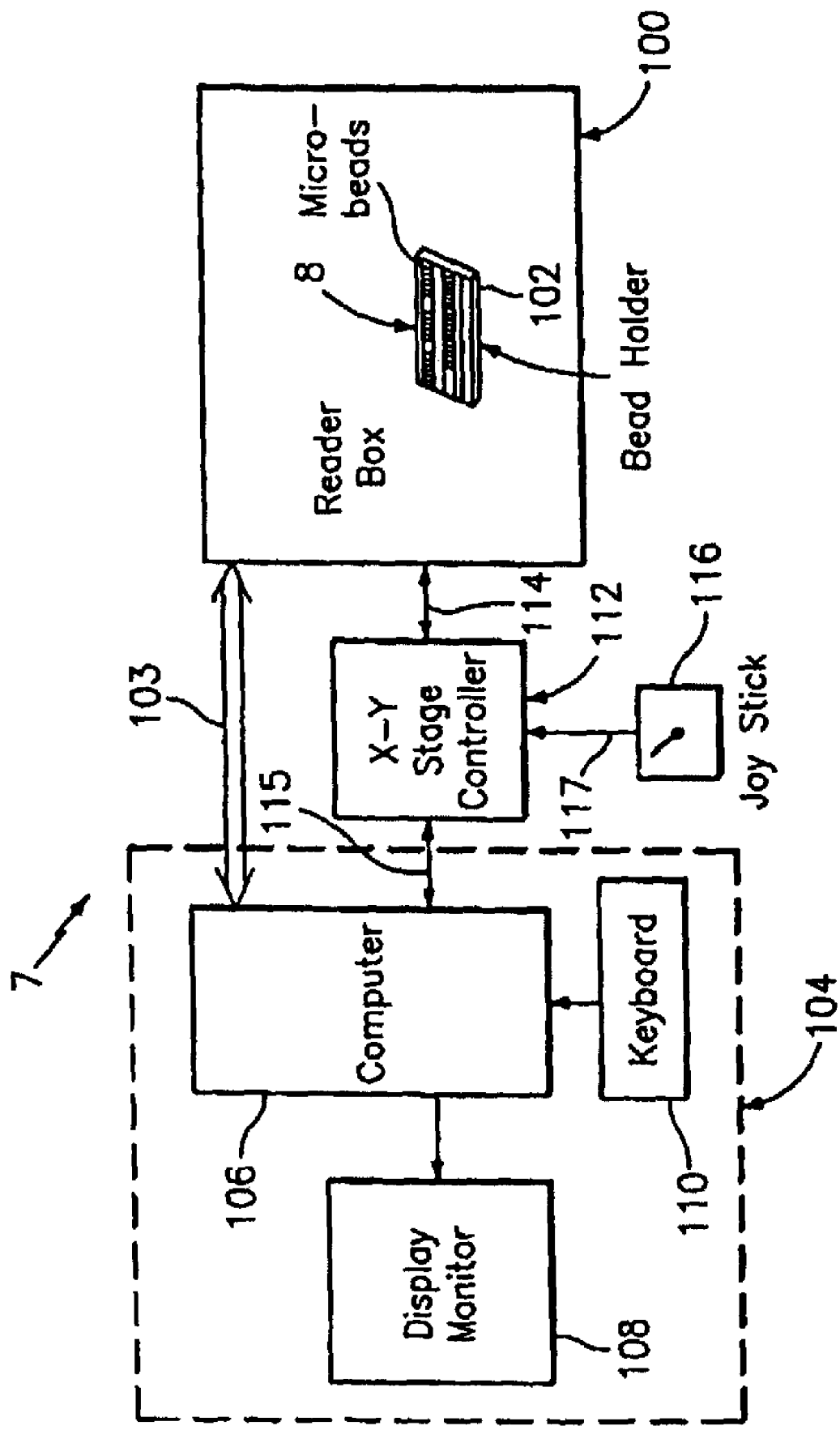
FIG. 1 is a schematic drawing of an optical reader system, in accordance with the present invention.

Referring to FIG. 1, an optical reader system 7 for diffraction grating based encoded optical identification elements (such as microbeads), comprises a reader box 100, which accepts a bead cell (or holder or cuvette or chamber) 102 that holds and aligns the microbeads 8 which have embedded codes therein. The reader box 100 interfaces along lines 103 with a known computer system 104 having a computer 106, a display monitor 108, and a keyboard. In addition, the reader box 100 interfaces along lines 114 with an stage position controller 112 and the controller 112 interfaces along a line 115 with the computer system 104 and a manual control device (or joy stick) 116 along a line 117.

The microbeads 8 are similar to or the same as those described in pending U.S. patent application Ser. No. 10/661,234, entitled Diffraction Grating Based Optical Identification Element, filed Sep. 12, 2003, which is incorporated herein by reference in its entirety, discussed more hereinafter.

The bead cell 102 is similar to or the same as that described in pending U.S. patent application Ser. No. 10/661,836, entitled "Method and Apparatus for Aligning Microbeads in order to Interrogate the same", filed Sep. 12, 2003, as well as U.S. patent application Ser. No. 10/763,995 and Provisional Patent Application Nos. 60/609,583 and 60/610,910, which are all incorporated herein by reference in its entirety, discussed more hereinafter.

Figure 2:
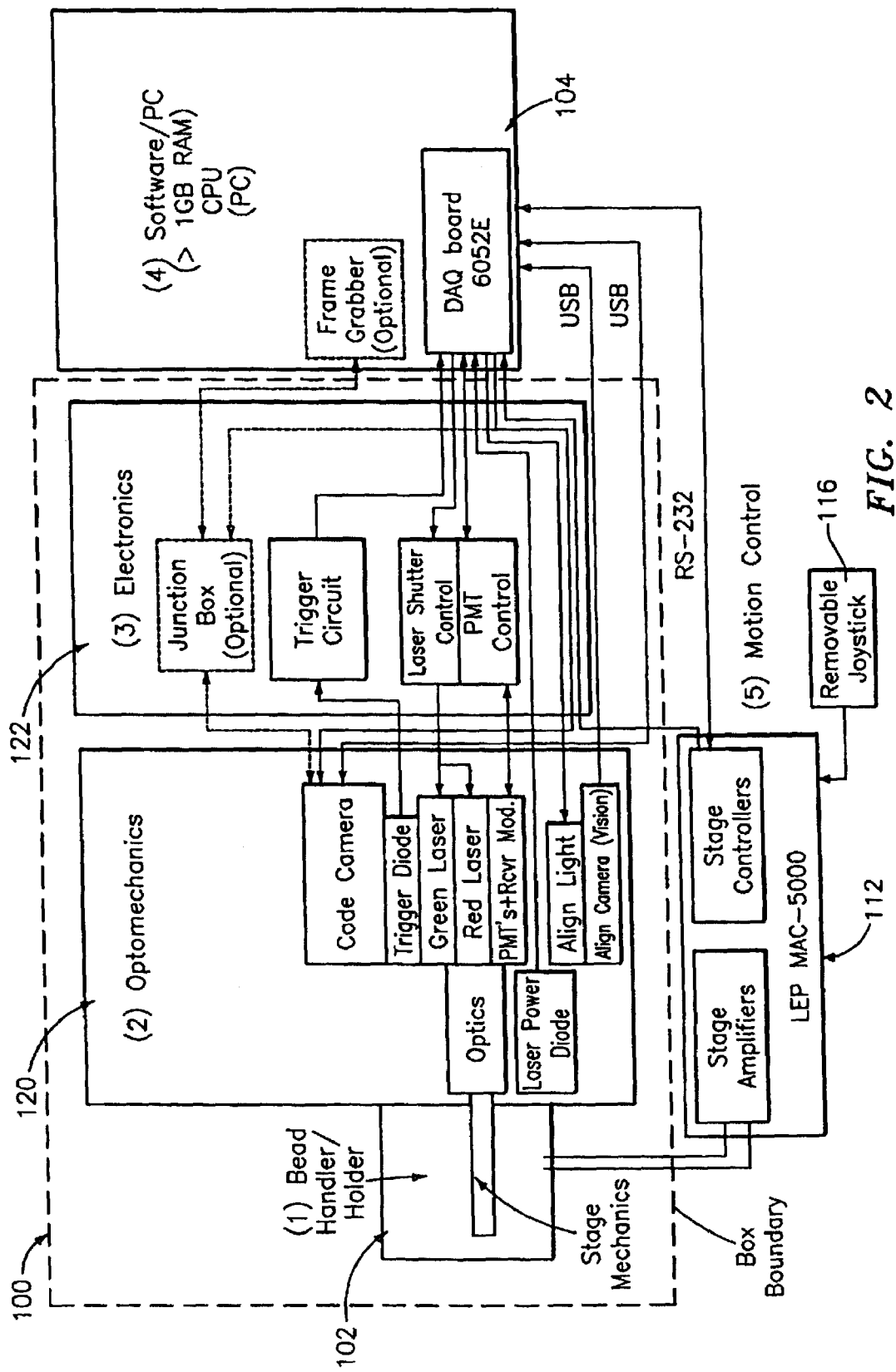
FIG. 2 is a block diagram of the overall architecture of the optical reader, in accordance with the present invention.

Referring to FIG. 2, the reader box 100 comprises the bead cell 102, certain opto-mechanical elements 120 including a code camera, a edge trigger diode which measures a portion of the light reflected off the beads and provides signal indicative thereof to electronics discussed hereinafter, a green laser and red laser (for fluorescence excitation, and code reading), 2 photo-multiplier tubes to detect 2 fluorescent signals from the beads, a laser power diode to detect and/or calibrate laser power, an alignment/imaging light to illuminate the bead holder and/or beads, an alignment/imaging vision camera to view an image of the bead holder and/or beads, laser control on/off shutter, stage mechanics to position the bead holder in the desired position for reading the beads, and various optics to cause the excitation/read and imaging optical signals to illuminate the beads and to allow the fluorescent optical signals, imaging optical signals, and code related optical signals to be read by the appropriate devices, as described herein.

In addition, the microbead reader system 7 includes various electronics 122 to provide any needed interfacing/buffering between the PC and the external devices and to perform the various functions described herein, including a junction box (optional) for interfacing between the computer and the optomechanical parts, an edge trigger circuit which receives the signal from the edge trigger photodiode and provides a signal to the computer 104 indicative of when the incident light is incident on an axial end edge of a bead, laser control electronics to control the on/off solenoid shutters 155 which control light from the green and red lasers, and photo-multiplier (PMT) control electronics to control the PMT's, e.g., to set the amount of gain on the PMTs.

Figure 3:
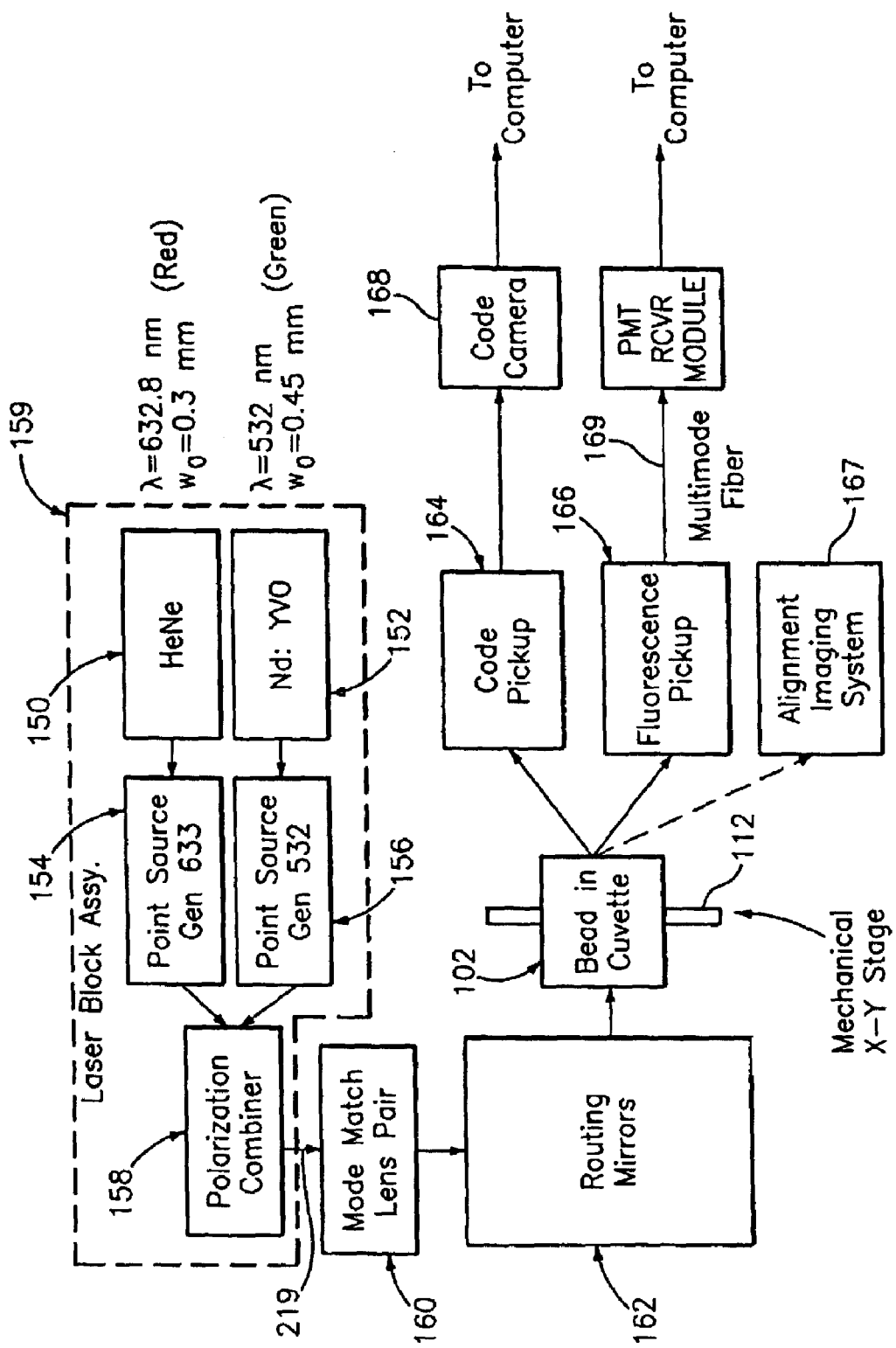
FIG. 3 is a block diagram of the opto-mechanical architecture for the optical reader architecture, in accordance with the present invention.

Referring to FIG. 3, a block diagram of the opto-mechanical hardware 120 (FIG. 2) is shown. In particular, there are two excitation lasers, a green laser 152, e.g., a diode pumped frequency doubled Nd:YAG laser that provides an output wavelength of about 532 nm (green) and has a beam waist of about 0.5 mm; and a red laser 150, e.g., a red Helium Neon (HeNe) laser that provides an output wavelength of about 633 nm (red) and has a beam waist of about 0.3 mm. Other beam sizes may be used if desired, provided it meets the performance/functions described herein for a given application. The output signals are processed through optics 156, 154, respectively, and passed to a polarization combiner 158 that combines both laser beams from the two lasers 150,152 into a single beam. Alternatively, the combiner 158 may be a wavelength combiner; however in that case, the laser power cannot be adjusted by polarization control. The single beam is then provided to mode matching optics 160 which creates a beam of the desired cross-sectional geometry (e.g., elliptical) to illuminate the beads. The beam is also passed through various routing mirrors 162 (discussed hereinafter) which routes the beam to the desired location on the bead holder (or cuvette) 102. The bead holder is positioned in the desired position to read a given bead, by the mechanical X-Y translation stage 112. The beads provide two optical signals, the first is a diffracted code optical signal, similar to that discussed in the aforementioned patent applications, which is passed to code pick-up optics 164 which routes the optical code signal to a code camera (or CCD camera) 168. The second optical signal provided from the beads is a fluorescence signal, which is passed to fluorescence pickup optics and passed along a multimode optical fiber 169, e.g., Thor M2OLOI, to PMT Receiver Module 170 which directs light from two different wavelength fluorescent signals and provides each to a known photodetector, e.g., photomultiplier tubes (PMTs) discussed more hereinafter. Any photodetector having sufficient sensitivity may be used if desired. The PMTs provide a signal to the computer indicative of the fluorescence signal from the beads 8. Also, the system may have an alignment or imaging system 167 having an imaging camera for viewing the beads in the cell 102 or for alignment or other purposes (discussed hereinafter).

Figure 4:
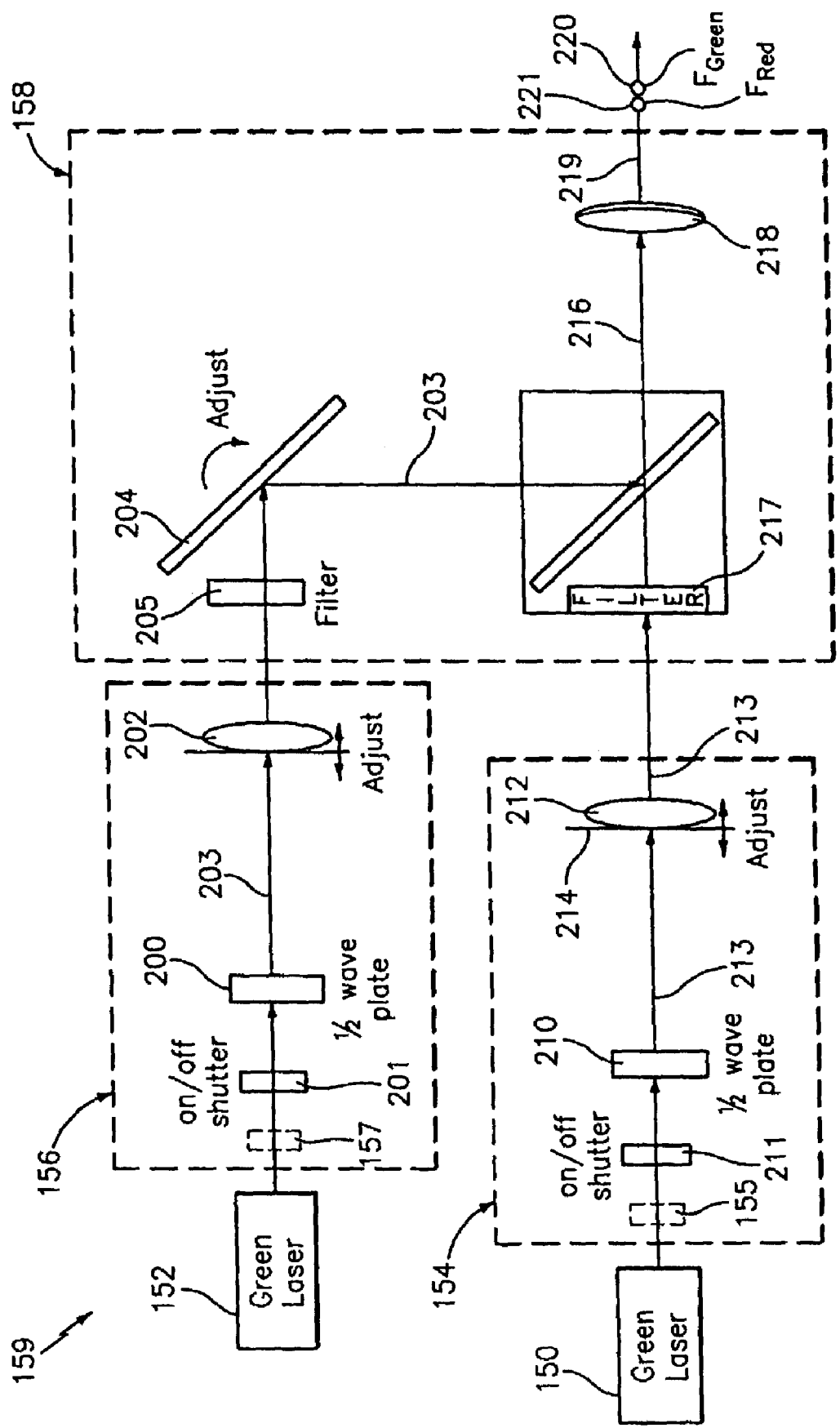
FIG. 4 is an optical schematic of a laser block assembly, in accordance with the present invention.

Referring to FIG. 4, the laser block assembly comprises the lasers 150, 152, optics 154,156 and polarization beam combiner 158, are shown. In particular, the green laser 152, e.g., a 532 nm laser LCM-T-11ccs, by Power Technology, provides a polarized optical laser signal to an on off Shutter 201. When the shutter 201 is allowing light to pass, the light 203 is passed to a ½ wave plate 200, e.g., CVI with a D=10 mm, which may be rotated to adjust the power of the green laser 152. If the laser light provided by one or both of the lasers 150,152 is not polarized, optional polarizers 155,157 may be used to polarize the desired light and then passed to the Y2 wave plate. The wave plate 200 then provides polarization adjusted light to a focusing lens 202, e.g., f=150 mm PCX, D=25 mm Edmond Indust. Optics, which provides a converging or focused beam 203 to a 532 nm optical source filter then to a turning mirror 204. The distance between the green laser 152 and the wave plate 200 is about 25 mm. The distance between the lens 202 to the doublet lens 218 is about 115 mm.

The mirror 204 may be adjustable about one or more pivot points to ensure that the beam 203 is incident on the correct location. The green beam 203 converges at a predetermined focal point $F_{green}$ 220. The distance between the lens 202 and the polarizing cube 158 may be adjusted to place a focal point $F_{green}$ 220 for the green beam 203 at the desired focal location $F_{green}$. The mirror 204 directs the beam 203 onto the polarization combiner 158 (or cube).

The red laser 150, e.g., 633 nm JDSU 1.5 mWatt laser, provides a polarized optical laser light 213 to an on/off shutter 211. When the shutter 211 is allowing light to pass, the light 213 is passed to a Y2 wave plate 210 (same as the waveplate 200) which may be used to adjust the power of the red laser 150. The wave plate 210 then provides polarization adjusted tight to a focusing lens 212, e.g., f=75 mm PCX D=25 mm lens from Edmond Indust. Optics, which provides a converging or focused beam 213 to the polarization combiner 158 (or cube). The red beam 213 converges at a predetermined focal point $F_{red}$ 221 which is also an adjustable focal point location set at or near to the same location as the focal point $F_{green}$ 220 for the green beam 203. The distance between the lens 212 and the polarizing cube 158 may be adjusted to place a red laser focal point $F_{red}$ 221 for the red beam 213 at the desired location. The lens 212 is mounted to a Thor SPTI mount. The distance between the red laser 150 and the wave plate 210 is about 25 mm. The distance between the lens 212 to the doublet lens 218 is about 40 mm.

The shutters 201, 211 are controlled such that when the green laser is illuminating a given bead (for either code or fluorescence reading) the red laser is not also illuminating that bead at the same time. The two lasers 150,152 may illuminate the same bead at the same time if desired, provided the fluorescent dyes used with the beads 8 are spectrally separated by a large enough wavelength space to allow the separate dyes to be detected.

The polarization beam combiner 158 combines the two beams 203, 213 based on their polarization and provides a combined beam 216, which is provided to a doublet focusing lens 218, e.g., a 65 mm focal length doublet lens, which works with the focusing lenses 202, 212 to focus the combined beam 216 at a desired focal point 220 as a focused beam 219. The beam combiner 158 provides the light beam 216 as a circular beam and has a distance of about 610 mm+/−10 mm to the bead 8 (not shown). The polarizing cube beam combiner 158 is mounted to a Thor Mount C4W.

Figure 4A:
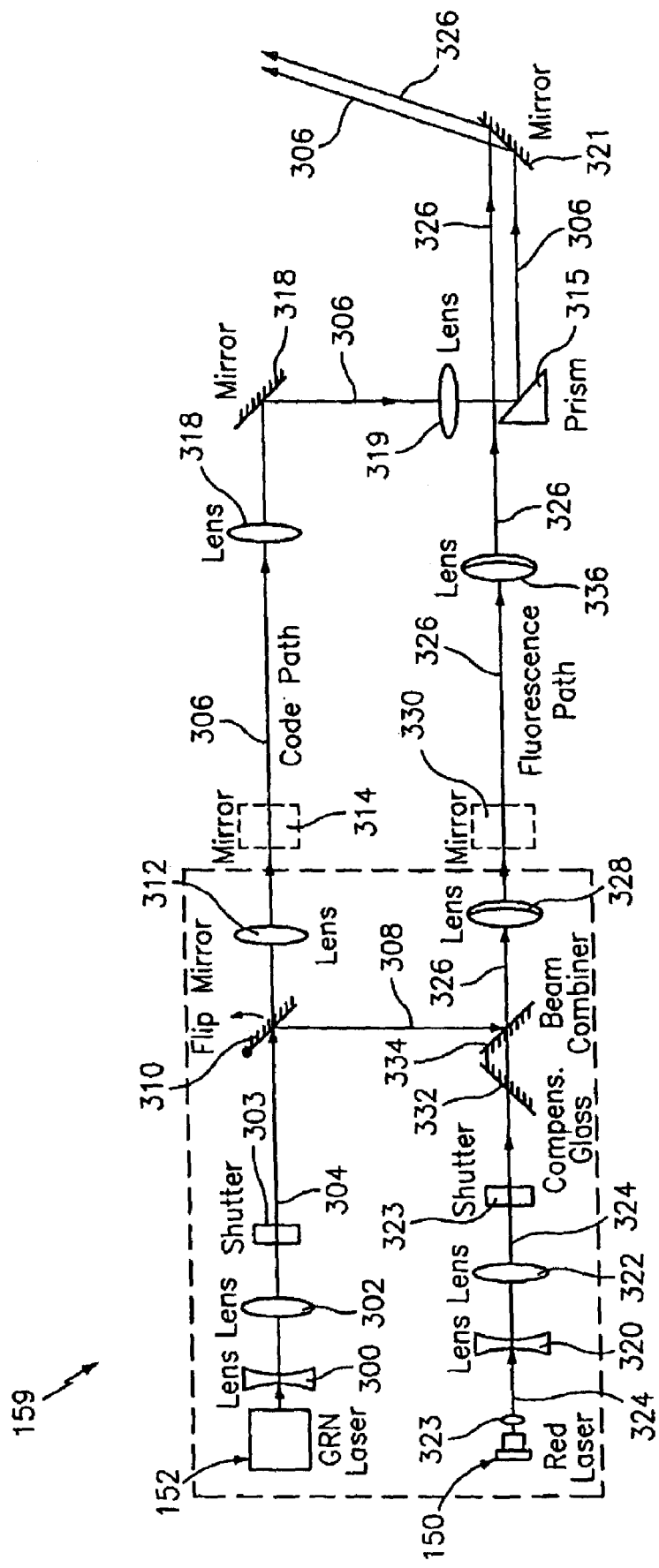
FIG. 4a is an optical schematic of an alternative laser block assembly, in accordance with the present invention.

Referring to FIG. 4a, alternatively, the laser block assembly 159 may comprise an alternative configuration as shown. In particular, the green laser 152 provides the light beams 304 to lens 300, e.g., a 50 mm F.L. lens Thor LD 1357, and then to a lens 302, e.g., a 50 mm FL lens Thor LB 1844, and then to a flip mirror 310. When the flip mirror 310 is in the up position, the light 304 passes to a lens 312 and to a mirror 314 as a beam 306 to a lens 316 and to a turning mirror 318. The light 306 is reflected off the turning mirror 318 and provided to a lens 319 and to a prism 315, e.g., a 10 mm, 45 degree prism Edmond Ind. Optics NT32-325, which redirects the light 306 to a turning mirror 321 as the light beam 306. The lenses 316,319 are cylindrical lenses, e.g., Edmond Ind. Optics, NT46-017. The light beam 306 is used for reading the code in the beads 8 as discussed herein and in the pending US patent applications referenced herein. The lenses 300,302 are used to accommodate or compensate for beam tolerances in the green laser 152. When the flip mirror 310 is in the down position, the light 304 reflects off the mirror 310 downward as a light 308 which is incident on a beam combiner, e.g., Chromatic (or wavelength) Beam Combiner Edmund industries Optics, R47-265.

The red laser 150, e.g., a 635 nm Laser Sanyo DL-4148-21, provides a red laser beam 324 to a lens 323, e.g., a 3.3 mm FL Lens Kodak A414™. The light 324 then passes through lenses 320,322, which may be the same type as the lenses 300,302, and are used to accommodate or compensate for beam tolerances in the red laser 150. The light 324 is incident on a compensating glass optic 332, e.g., Edmond Ind. Optics, R47-265, which removes any astigmatism in the beam 324 that may be introduced by the chromatic beam combiner 334. The green light 308 and the red light 324 are combined by the chromatic beam combiner 334 which provides a combined beam 326 to a lens 328, e.g., a 25 mm FL lens Thor AC 127-025. The light 326 then passes to a turning mirror 330 and to a lens 336, e.g., a 75 mm FL lens Edmond Ind. Optics NT32-325. All the mirrors used in FIG. 4a are Edmond Ind. Optics R43-790. The beam combiner 334 is also used to allow the red and green beams to share the same path, even though they may not both be traveling along that path at the same time.

The shutters 303, 323 are controlled such that when the green laser is illuminating a given bead (for either code or fluorescence reading) the red laser is not also illuminating that bead at the same time. The two lasers 150,152 may illuminate the same bead at the same time if desired, provided the fluorescent dyes used with the beads 8 are spectrally separated by a large enough wavelength space to allow the separate dyes to be detected.

Figure 5:
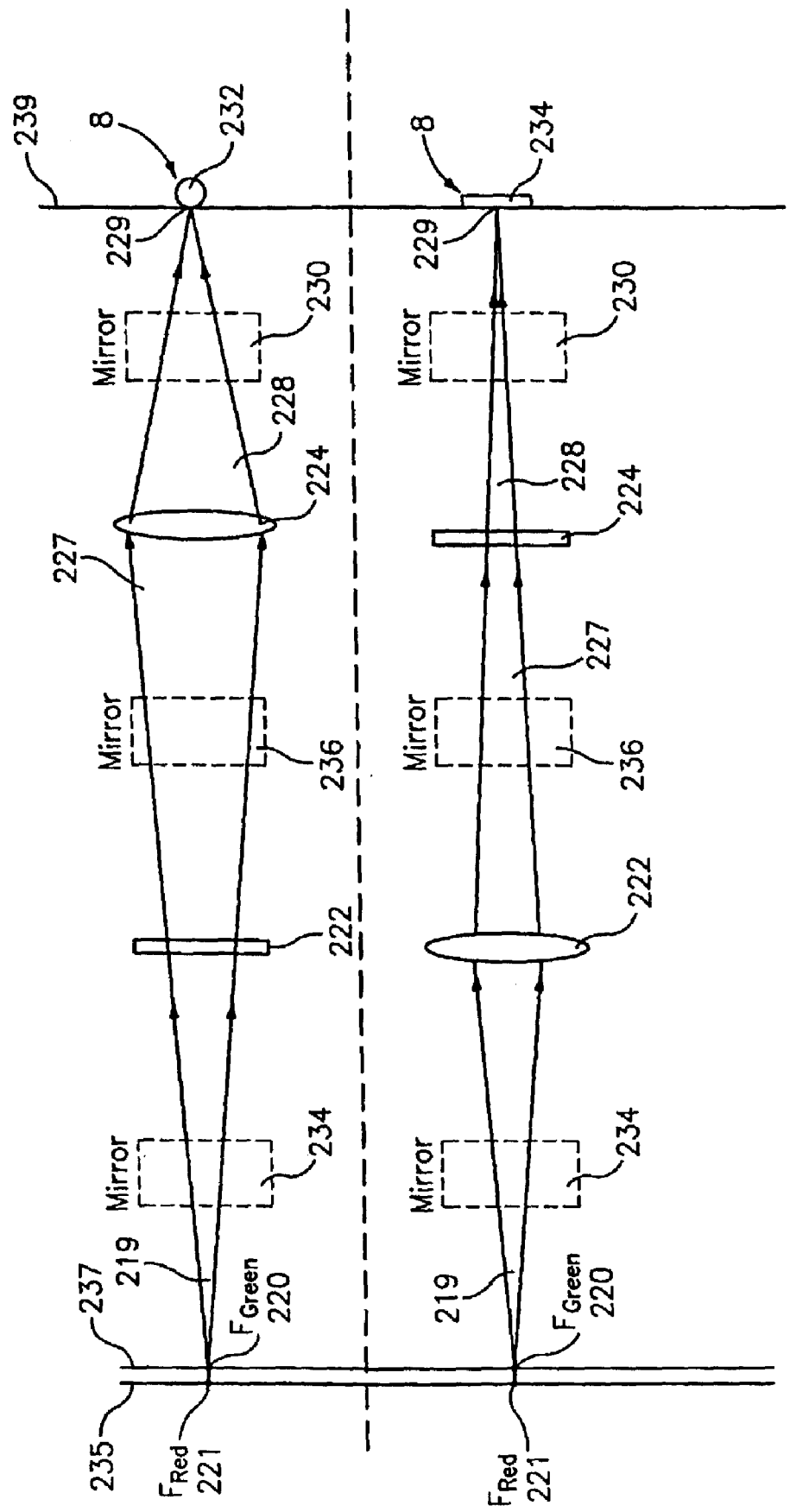
FIG. 5 is an optical schematic of mode matcher optics, in accordance with the present invention.

Referring to FIG. 5, two side views of the combined beam 219 (from FIG. 4) is shown as it would appear for light being incident on the end view (top portion of FIG. 5) and side view (bottom portion of FIG. 5) of a bead 8. The combined beam 219 starting at the focal points $F_{green}$ 220, $F_{red}$ 221, passes through a first cylindrical lens 222 and a second cylindrical lens 224 which creates a focused beam 228 to a redirecting mirror 230 which is provided to the bead 8, having an elliptical bead spot geometry, with an end view 232 and a side view 234, designed to optimize the ability to read the bead code and the fluorescence with the same beam shape and minimal optical scatter. Such beam geometry is also discussed herein as well as in the aforementioned patent application (U.S. patent application Ser. No. 10/661,234). The cylindrical lenses 222, 224 may be a f=150 mm cylindrical lens, 25 mm round; Edmunds E46-019. The focal point 221 lies along a virtual red point source plane 235 and the green focal point 220 lies along a virtual green point source plane 237. Also, the bead 8 is located at the focal point of the beam 219, and lies in the image plane of the lens system. The distance from the virtual point source planes 235, 237 to the first lens 222 is about 235 mm, the distance from the virtual point source planes 235, 237 to the second lens 224 is about 415 mm, and the distance from the virtual point source planes 235, 237 to the bead 8 is about 650 mm. The two lenses 222, 224 allow the beam 228 size/geometry to be controlled independently in two different orthogonal optical axes. In addition, redirecting or routing or turning mirrors 234, 236 may be placed between the cylindrical lenses 222 to provide the desired beam path for the desired mechanical layout for the reader system 7 (also discussed hereinafter).

Figure 5A:
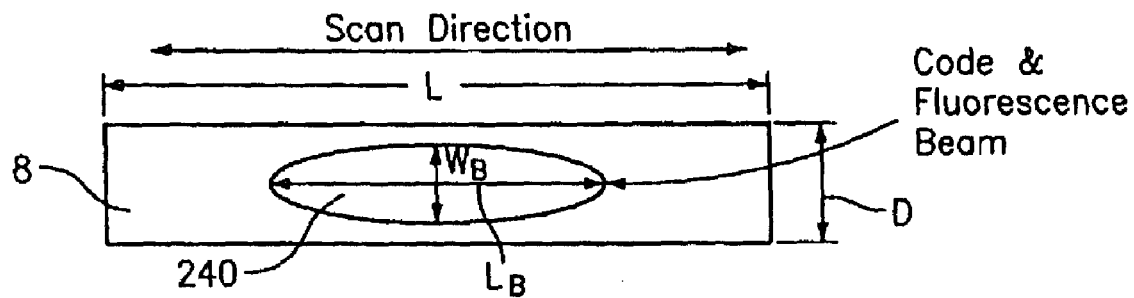
FIGS. 5a and 5b are diagrams of various excitation beam shapes on beads, in accordance with the present invention.
Figure 5B:
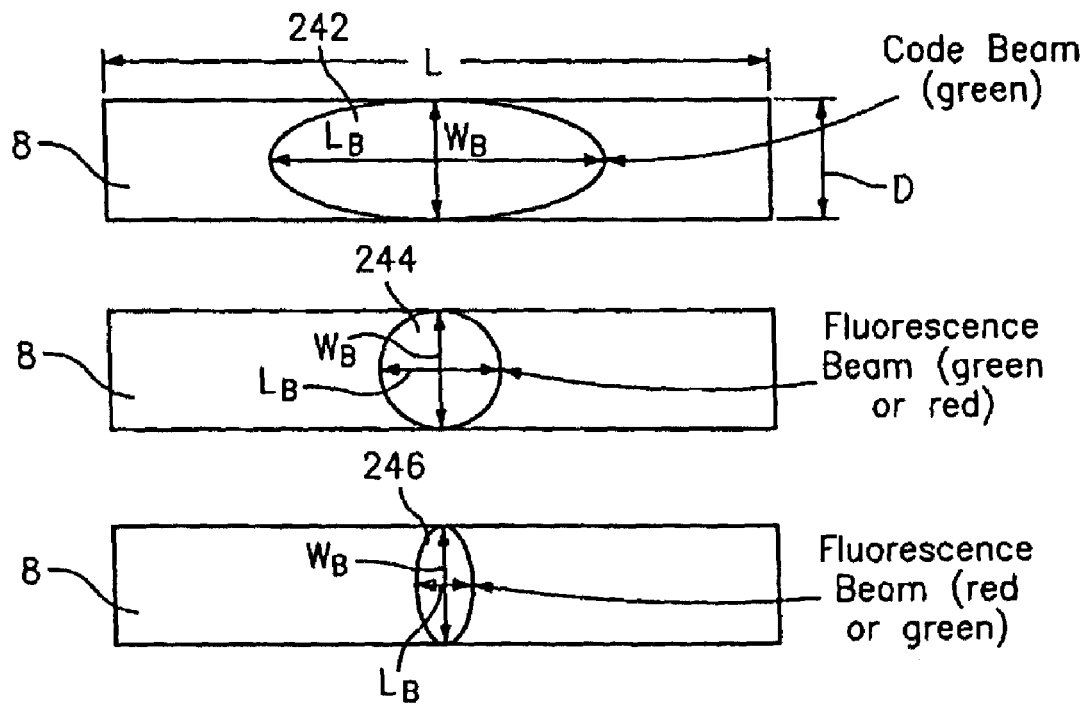

Referring to FIGS. 5A & 5B, a single beam shape or multiple different beam shapes may be used to read the code and fluorescence. In particular, in FIG. 5A, the beam 228 has a spot geometry 240 on a top view of the bead 8 as an elliptical shape, which is used for both reading the code and reading the fluorescence of the bead 8. Wb=15 microns for a 65 micron diameter bead (about 23% of the bead diameter D), and Lb=200 microns for a 450 microns long bead (about 40% of the bead length L). One problem with this approach is that, for fluorescence measurement, fluorescence from an adjacent bead may bleed or cross over to the current bead being read, thereby providing inaccurate bead fluorescence readings for the bead.

Referring to FIG. 5B, we have found that the beam spot size and shape on the bead 8 may be optimized to provide improved fluorescence and code measurements by using a different shape beam for the code beam than that used for the fluorescence beam. In particular, we have found that for reading the code, an elliptical beam shape 242 having a width Wb ($1/e^2$ full width of beam) that is about the same as the diameter D of the bead 8 and a beam length Lb that is about 45% of the bead length L provides good code read signals. The beam length Lb should not be so long as to cause the beam to scatter light off the edge of the bead being read into the code reading optics/camera; and do not want the beam length Lb too short or the beam width Wb too narrow such that the bits cannot be resolved. The factors that affect this are as discussed in the aforementioned U.S. patent application Ser. No. 10/661,234, which is incorporated herein by reference in its entirety.

Regarding fluorescence, we have found having a beam width Wb about equal to the bead diameter D, provides the maximum amount of tolerance to variations and inaccuracies between the beam and bead position for reading the fluorescence (i.e., transverse to the longitudinal axis of the bead), as discussed more hereinafter. Also, we have found that the beam length Lb should be about less than about 14% of the bead length L to minimize bead edge effects and thus optimize reading fluorescence along the length of the bead 8, as discussed more hereinafter. Accordingly, the beams 244, 246 may be circular, or elliptical provided the desired performance is obtained. For the red laser diode source discussed herein the red beam is not circular and thus the beam at the bead is not circular; however this could be corrected optically if desired. The beam shapes for fluorescence reading is described more hereinafter.

Figure 6:
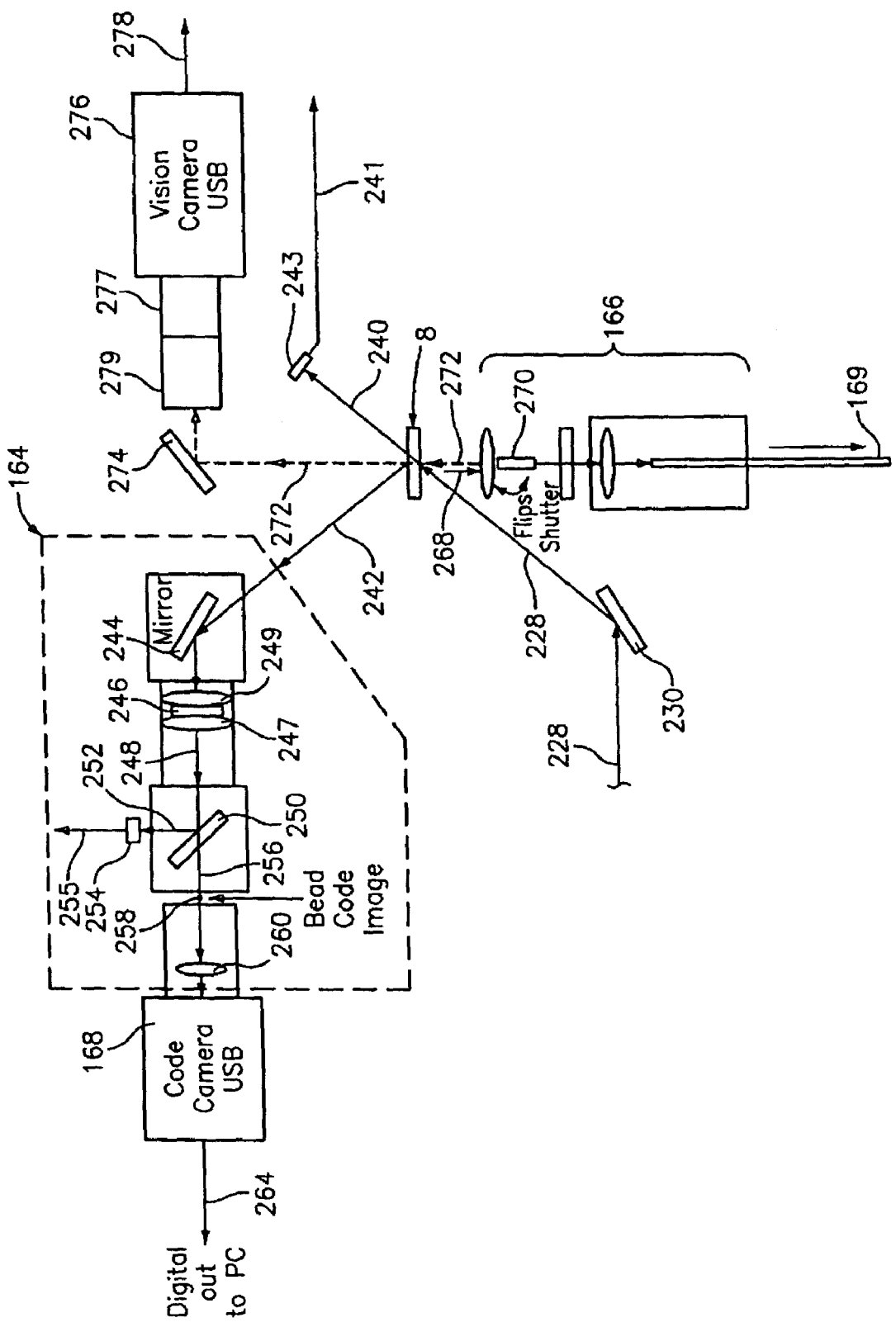
FIG. 6 is an optical schematic of code pickup, fluorescence pick-up and vision pick-up, in accordance with the present invention.

Referring to FIG. 6, the combined excitation beam 228 is provided to the routing mirror 230, e.g., 1"D×3 mmT ES 45-604, and directed to the bead 8 which provides a transmitted beam 240 and a diffracted or reflected beam 242 from the bead code, as discussed in the aforementioned patent applications. The reflected beam 242 is provided to a mirror 244, e.g., 1"D×3 mmT ES 45-604, which provides the light to a bandpass filter 246, e.g., 532 nm BP filter ES NT47-136 (1" Diam), which is adjacent to pair of lenses 247,249, e.g., each a f=100 mm and each 25 mm diam ES 32-428. The bandpass filter 246 is designed to pass only the wavelength of light associated with the excitation/source set for reading the code. This substantially eliminates the amount of optical noises/signal associated with other non-code reading wavelengths; thereby allowing a clean optical signal to pass to the code camera 168. The bandpass filter 246 provides filtered light 248 to a beamsplitter 250, e.g., ES 43-817 25 mm×1 mm R=25%, which reflects about 25% of the light along a path 252 to the edge trigger photodiode 254, e.g., Sharp BS12O Digikey 425-1001-5-ND. The diode 254 provides an electrical signal on a line 255 to the computer indicative of the intensity of the light. The remainder of the input light 248 passes straight through the beamsplitter 250 as a beam 256 which creates a bead code image at a predetermined focal point 258. The lens pair around the bandpass filter 246 transfers the image of the reflected beam at the bead 8 to the bead code image point 258 as well as on the edge pick-up diode 254. The light 256 is provided to a video lens 260, e.g., Computar V1213 f=12.5, which provides a focused optical signal on the code camera 168, e.g., Lumera LU-050M. The video lens 260 is used as a Fourier lens to project the Fourier transform of the bead code from the point 258 onto the code camera 262. The code camera 262 provides a digital signal on a line 264 to the computer indicative of the bead code image at the point 258.

Referring to FIG. 6A, the BP filter 246 can be anywhere in the code path as indicated by the numerals 261,263,265,267, provided it does not significantly deteriorate wavefront performance of the optical system or degrade the lens performance. The two f=100 mm lenses 247, 249 are for transferring the image from the bead 8 to the intermediate point 258. Thus, the distance from the lens 249 to the virtual image point 258 is 100 mm and the distance from the bead 8 to the lens 247 is about 100 mm (equal to the focal length of the lenses 247, 249). Also, the focal lengths of the two lenses 247, 249 need not be the same, provided appropriate distance compensation is performed, and also depending on the application and performance specifications. Also, the distance from the point 258 to the video lens 260 is about 12.5 mm and the distance from the video lens to the image plane on the camera (and the Fourier Plane) 269, is about 12.5 mm (equal to the focal length of the video lens 260). Technically, the lenses 247, 249 should be separated by 2*f in order to yield a Fourier Transform at the image plane 269 of the code camera 168 (a typical 41 system). However, this configuration does not cause the beam waist to change substantially, thereby not significantly altering the performance of the Fourier transform. It should be understood that in FIG. 6A, the light travels from left to right, with connects with the prior optical drawing of FIG. 5. However, in the actual hardware shown in the hardware FIG. 6, the bead 8 would be on the right side and the light would travel from right to left.

Referring to FIG. 6, the excitation beam 228 also excites fluorescent molecules attached to the bead 8, which provide a fluorescent optical signal 268 to a fluorescence pick-up head 166, having a collimator, which directs the fluorescent optical signal into an optical fiber, e.g., a multimode optical fiber, which is provided to PMT optics, discussed hereinafter.

More specifically, referring to FIG. 6B, the fluorescent signal is provided to a collection objective lens 280, e.g., Lightpath (Geltech) 350220, F=11 mm asphere NAO.25, which provides light to a long wavelength pass filter 282, e.g., 0.5" diam. filter glass made by Schott Part No. OG-570, to prevent excitation light at 532 nm from getting into the fiber and causing the cladding to fluoresce. If the fiber is made of all glass, the filter is likely not needed. The collection angle θc for light to enter the fiber is set to about 30 degrees based on a predetermined numerical aperture (NA). Other values for the collection angle θc may be used depending on the amount of stray light and the required detection performance. The light then passes to a fiber focusing assembly 284, e.g., Thor M15L01, which focuses the fluorescent light 268 into the end of the fiber 169. The collimator assembly 166 that may be used is a Thor F220-SMA-A Collimator.

In addition, when it is desired to view a visible image of the beads in the bead holder (e.g., for alignment, bead counting, or other purposes), a white LED 270, e.g., Lumex SSL-LX5093XUWC, is illuminated which provides a white light illumination signal 272 up through the bottom of the bead holder and beads to illuminate the beads 8. The LED 270 is mounted to a PMT shutter (discussed hereinafter) which allows it to flip out of the way when fluorescence is being detected. The illumination image signal 272 is provided to a mirror 274 which reflects the light 272 through a first lens 279, e.g., Infinity 0.75× lens, and a second lens, e.g., Infinity 2× lens, and then onto an imaging/vision camera 276, e.g., Lumera LU-050C. The vision camera 276 provides an electrical signal on a line 278 to the computer indicative of the image seen by the imaging camera 276.

It should be understood that the alignment camera 276 may be on the same side of the bead 8 (or bead holder 102) as the fluorescent pick-up 269. Alternatively, the location of the alignment camera 276 and fluorescent pick-up 269 may be swapped, such that the alignment camera 276 is beneath the bead 8 and the pick-up 269 is above the bead 8. It should be understood that one can swap the incident beam 228 and the reflected beam 242 and the associated optics.

When the bead 8 is not present, the transmitted beam 240 may be incident on a laser power diode 243, e.g., Hamamatsu S2307-16R, which provides an electrical signal on a line 241 proportional to the power of the incident beam 228. This may be used for laser power calibration or other system calibration or test purposes. This light beam 228 may also be used for edge trigger information, as discussed hereafter.

Figure 7:
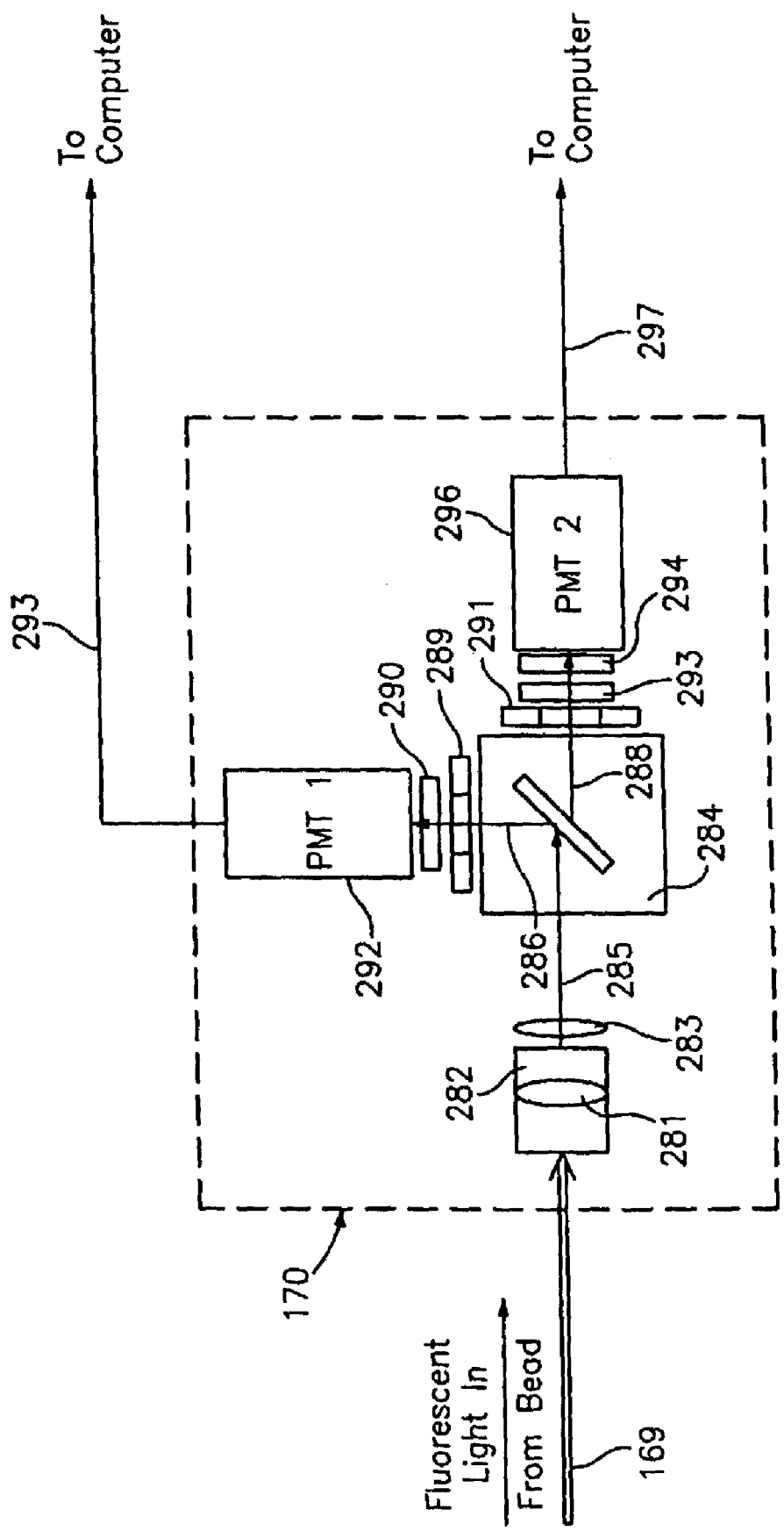
FIG. 7 is an optical schematic of a photo-multiplier tube (PMT) assembly, in accordance with the present invention.

Referring to FIG. 7, the light from the fluorescent pick-up head 166 is provided along the fiber 169 e.g., Thor M2OLQI multimode fiber, to a PMT receiver module 170, which includes a collimator assembly 281, e.g., Thor F23OSMA-A, and a focusing lens 282, e.g., f=100 mm, 25 mm diam. ES 32-482, which provides light 485 to a dichroic beam splitter 284, e.g., Omega 630 DLRP XF2021, 21×29 mm, 1 mm thick. The distance from the collimator assembly 281 to the beam splitter 284 is about 1 to 2 inches. The beam splitter 284 reflects light 286 of a first wavelength (e.g., green pumped Cy3 fluorescent light), and passes light 288 of a second wavelength (e.g., red pumped Cy5 fluorescent light). The light 286 is passed through an optical aperture, e.g., 12.5 mm Aperture Thor SM1A5, and then through an optical filter, e.g., Omega 3RD-570LP-61OSP, 25 mm diam, about 3 mm thick, that passes light of the first wavelength (e.g., green pumped Cy3 fluorescent light), to a photomultiplier tube (PMT) 292, e.g., Hamamatsu H5783-20. The PMT 292 detects the intensity of the incident fluorescent light and provides an output electrical signal on a line 293 to the computer indicative of the intensity of the fluorescence signal incident on the PMT 292.

Similarly, the light 288 passes through an optical aperture, e.g., 12.5 mm Aperture Thor SMIA5, and then through a filter glass RG645, 1" diam, 1 mm thick and then through an optical filter, e.g., Omega 695AF55, XF3076, 25 mm diam, about 3 mm thick, that passes light of the second wavelength (e.g., red pumped Cy5 fluorescent light), to a second photomultiplier tube (PMT) 296, e.g., Hamamatsu H5783-20. The PMT 296 detects the intensity of the incident fluorescent light and provides an output electrical signal on a line 293 to the computer indicative of the intensity of the fluorescence signal incident on the PMT 296.

It should be understood that fluorescent molecules that are excited by the 532 nm (green) laser produce a fluorescent signal having a wavelength of about 570 nm (orange color), and fluorescent molecules that are excited by the 633 nm (red) laser produce a fluorescent signal having a wavelength of about 670 nm (deep red color). Accordingly, the fluorescent signal on the line 286 will have an orange color and the light 288 will be deep red.

Referring to FIGS. 8-22, show various perspective and cutaway views of the present invention. It also shows the path of the light beams from various views.

Figure 8:
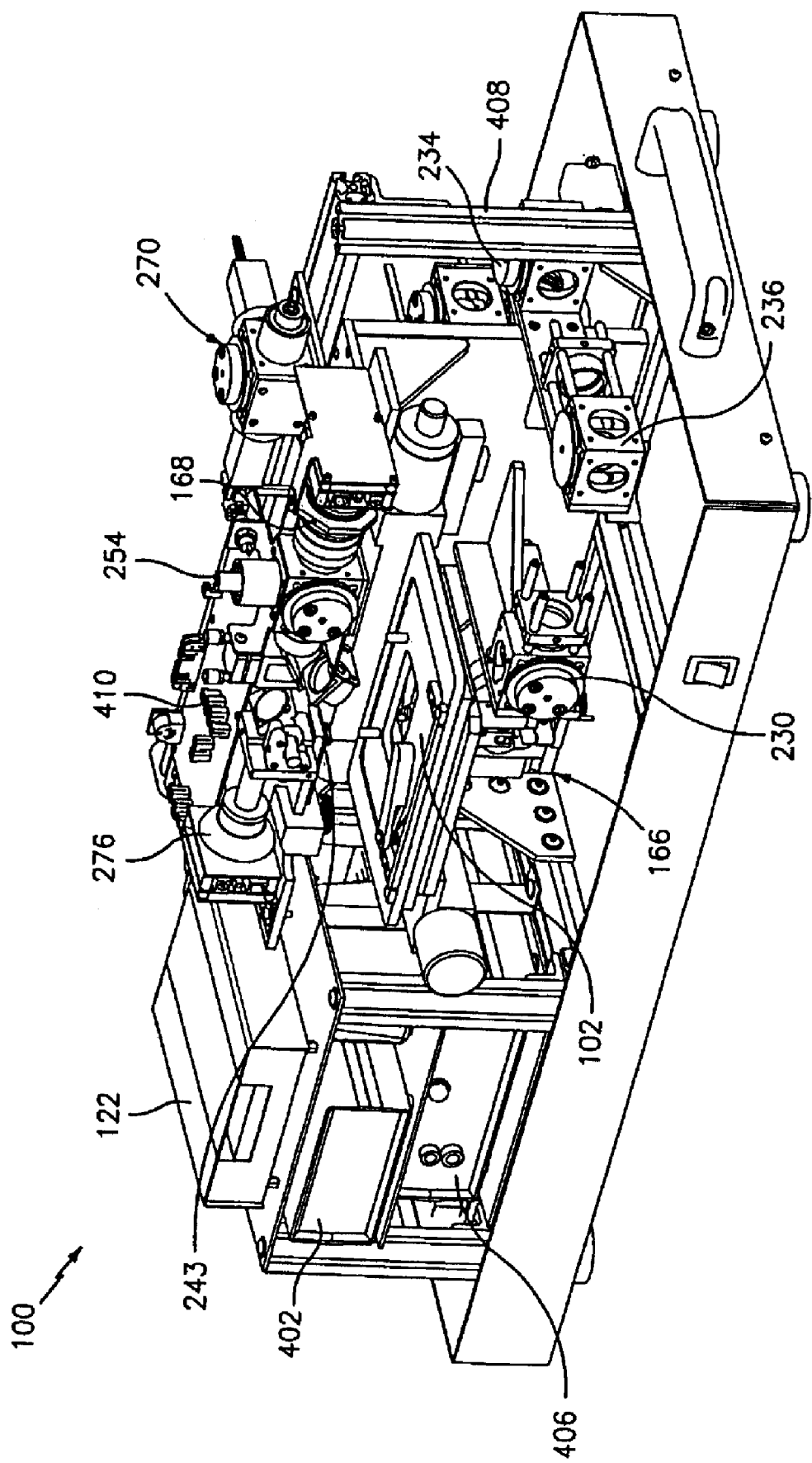
FIG. 8 is a front perspective view of an optical reader, in accordance with the present invention.
Figure 9:
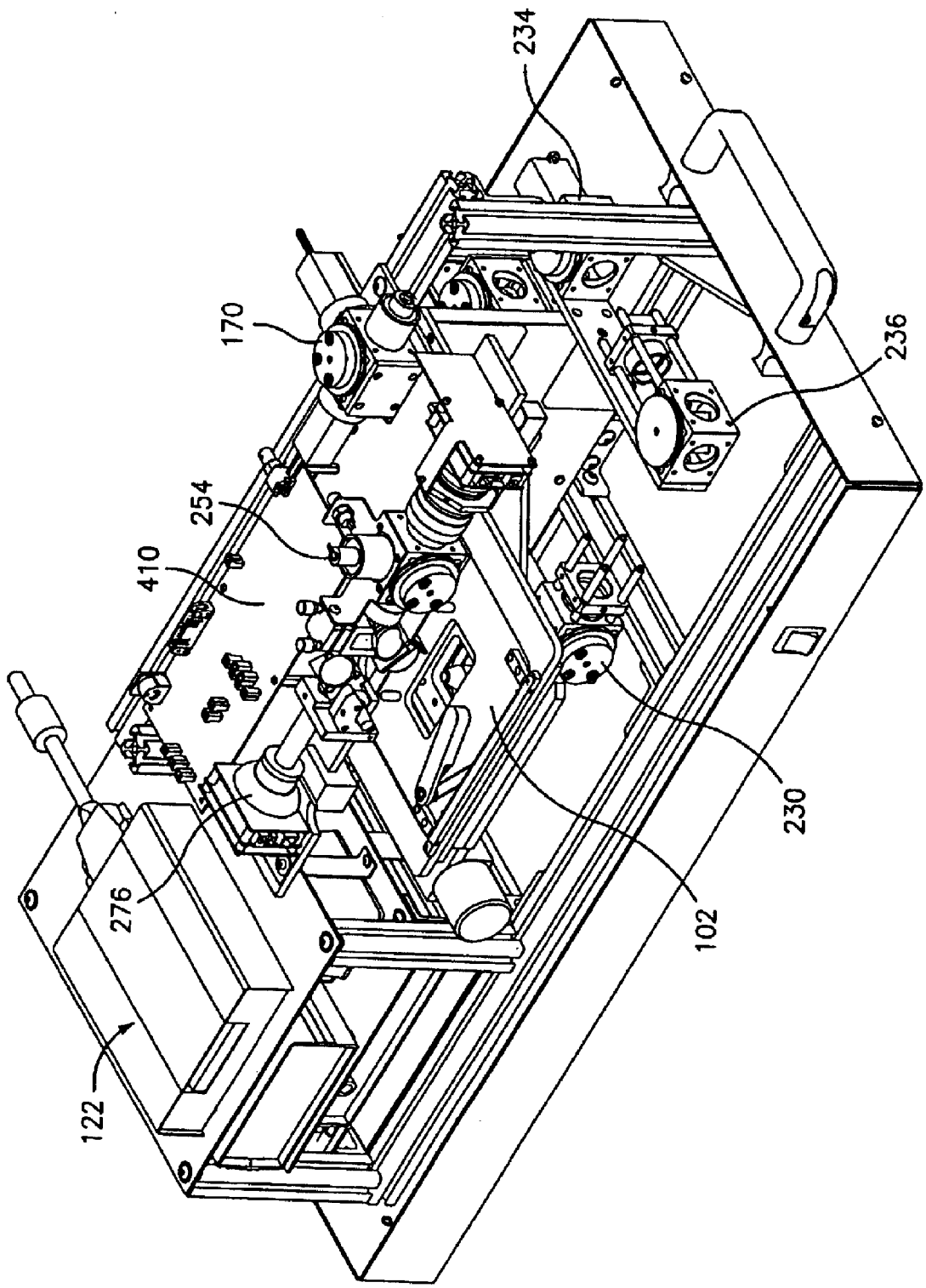
FIG. 9 is a top and front perspective view of the optical reader of FIG. 8, in accordance with the present invention.
Figure 10:
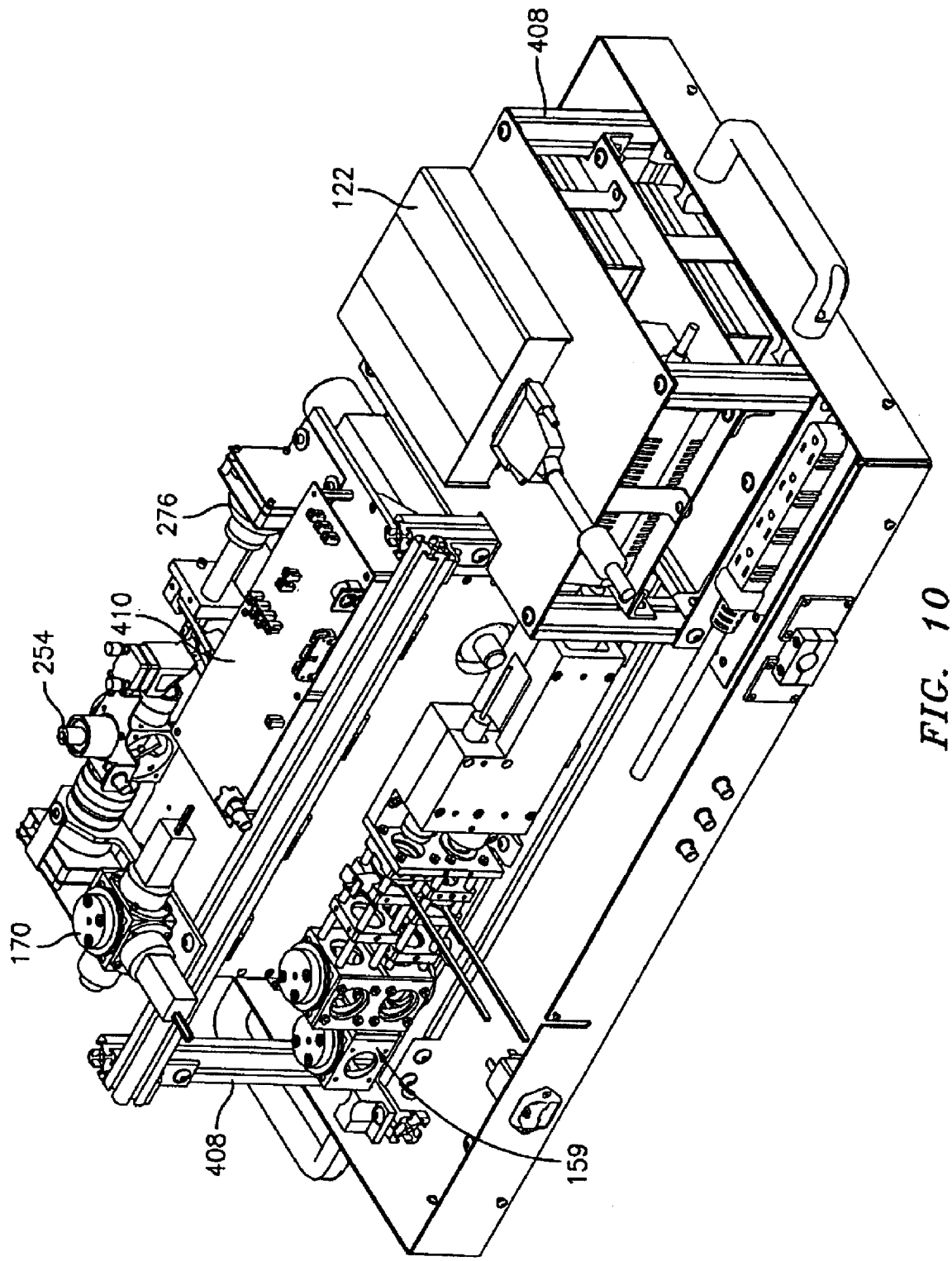
FIG. 10 is a back and top perspective view of the optical reader of FIG. 8, in accordance with the present invention.

Referring to FIGS. 8-10, perspective views of one embodiment of the present invention, which shows numerous parts having the same numerals as in other Figs. herein, and also shows, a green laser power supply and control 402, red laser power supply and control 406, a frame or housing 410, and a main circuit board 410. FIG. 12 is a physical drawing of one embodiment of FIG. 4 laser block assembly.

The parts used for the present invention are known parts and may be substituted for other parts that provide the same function as that described herein, unless stated otherwise.

For example, as discussed herein, the code camera may be a USB 2.0 camera, comprising a Luminera Monochromatic camera; part no. LU-050M, coupled to a Computar 12.5 mm focal length TV lens. The camera provides a USB 2.0 (universal serial bus) serial data stream indicative of the image seen by the camera. Alternatively, the camera may be a standard CCD camera, or a CCD linear array, part No. CCD 111 made by Fairchild Imaging Corp., or other camera capable of providing a digital or analog signal indicative of the image seen, having sufficient resolution to identify the bits in the code in the beads 8. In that case, a "frame grabber" and A/D converter may be needed within the computer to properly condition the code signal for processing. In addition, the camera accepts a trigger signal to command the camera to capture or save or transmit the image seen by the camera. The image or vision camera may be a Luminera LU-050C, USB 2.0 color camera. The X-Y translation stage may be a Ludl X-Y precision stage driver/controller, having motor drives, position feedback and limit signals. Any other x-y stage may be used if desired, provided the stage can be positioned with sufficient accuracy to accurately read the beads 8.

The adjustable focus lenses described herein allow the setting of the spot size and focal point for the green and red laser light. One embodiment of the system described herein has three shutters that are controlled by the computer, one for each laser and one to prevent light from getting to the PMTs. This shutter also holds the white light source discussed herein for the bead Imaging System.

Referring to FIG. 23, a diffraction grating-based optical identification element 8 (or encoded element or coded element) comprises a known optical substrate 10, having an optical diffraction grating 12 disposed (or written, impressed, embedded, imprinted, etched, grown, deposited or otherwise formed) in the volume of or on a surface of a substrate 10. The grating 12 is a periodic or aperiodic variation in the effective refractive index and/or effective optical absorption of at least a portion of the substrate 10.

The optical identification element described herein is the same as that described in U.S. application Ser. No. 10/661, 234, filed contemporaneously herewith, which is incorporated herein by reference in its entirety.

In particular, the substrate 10 has an inner region 20 where the grating 12 is located. The inner region 20 may be photosensitive to allow the writing or impressing of the grating 12. The substrate 10 has an outer region 18 which does not have the grating 12 therein.

The grating 12 is a combination of one or more individual spatial periodic sinusoidal variations (or components) in the refractive index that are collocated at substantially the same location on the substrate 10 along the length of the grating region 20, each having a spatial period (or pitch) Λ. The resultant combination of these individual pitches is the grating 12, comprising spatial periods (Λ1-Λn) each representing a bit in the code. Thus, the grating 12 represents a unique optically readable code, made up of bits, where a bit corresponds to a unique pitch Λ within the grating 12. Accordingly, for a digital binary (0-1) code, the code is determined by which spatial periods (Λ1-Λn) exist (or do not exist) in a given composite grating 12. The code or bits may also be determined by additional parameters (or additional degrees of multiplexing), and other numerical bases for the code may be used, as discussed herein and/or in the aforementioned patent application.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 has an outer diameter D1 and comprises silica glass (SiO$_2$) having the appropriate chemical composition to allow the grating 12 to be disposed therein or thereon. Other materials for the optical substrate 10 may be used if desired. For example, the substrate 10 may be made of any glass, e.g., silica, phosphate glass, borosilicate glass, or other glasses, or made of glass and a polymer, or solely a polymer. For high temperature or harsh chemical applications, the optical substrate 10 made of a glass material is desirable. If a flexible substrate is needed, plastic, rubber or polymer-based substrate may be used. The optical substrate 10 may be any material capable of having the grating 12 disposed in the grating region 20 and that allows light to pass through it to allow the code to be optically read.

The optical substrate 10 with the grating 12 has a length L and an outer diameter D1, and the inner region 20 diameter D. The length L can range from very small "microbeads" (or microelements, micro-particles, or encoded particles), about 1-1000 microns or smaller, to larger "macroelements" for larger applications (about 1.0-1000 mm or greater). In addition, the outer dimension D1 can range from small (less than 1000 microns) to large (1.0-1000 mm and greater). Other dimensions and lengths for the substrate 10 and the grating 12 may be used.

The optical substrate 10 with the grating 12 has a length L and an outer diameter D1, and the inner region 20 diameter D. The length L can range from very small (about 1-1000 microns or smaller) to large (about 1.0-1000 mm or greater). In addition, the outer dimension D1 can range from small (less than 1000 microns) to large (1.0-1000 mm and greater). Other dimensions and lengths for the substrate 10 and the grating 12 may be used. Also, the element may be embedded within or part of a larger substrate or object. The element may also be in the form of a thread or fiber to be weaved into a material.

Some non-limiting examples of microbeads discussed herein are about 28 microns diameter and about 250 microns long, and about 65 microns diameter and about 400 microns long. Other lengths may be used as discussed herein.

The grating 12 may have a length Lg of about the length L of the substrate 10. Alternatively, the length Lg of the grating 12 may be shorter than the total length L of the substrate 10.

The outer region 18 is made of pure silica (SiO$_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1, n2 for the grating region 20 and the outer region 18, respectively, may be used, if desired, provided the grating 12 can be impressed in the desired grating region 20. For example, the grating region 20 may have an index of refraction that is larger than that of the outer region 18 or grating region 20 may have the same index of refraction as the outer region 18 if desired.

Referring to FIG. 24, an incident light 24 of a wavelength λ, e.g., 532 nm from a known frequency doubled Nd:YAG laser or 632 nm from a known Helium-Neon laser, is incident on the grating 12 in the substrate 10. Any other input wavelength λ can be used if desired provided λ is within the optical transmission range of the substrate (discussed more herein and/or in the aforementioned patent application). A portion of the input light 24 passes straight through the grating 12, as indicated by a line 25. The remainder of the input light 24 is reflected by the grating 12, as indicated by a line 27 and provided to a detector 29. The output light 27 may be a plurality of beams, each having the same wavelength λ as the input wavelength λ and each having a different output angle indicative of the pitches (Λ1-Λn) existing in the grating 12. Alternatively, the input light 24 may be a plurality of wavelengths and the output light 27 may have a plurality of wavelengths indicative of the pitches (Λ1-Λn) existing in the grating 12. Alternatively, the output light may be a combination of wavelengths and output angles. The above techniques are discussed in more detail herein and/or in the aforementioned patent application.

The detector 29 has the necessary optics, electronics, software and/or firmware to perform the functions described herein. In particular, the detector reads the optical signal 27 diffracted or reflected from the grating 12 and determines the code based on the pitches present or the optical pattern, as discussed more herein or in the aforementioned patent application. An output signal indicative of the code is provided on a line 31.

Referring to FIG. 25, the reflected light 27 comprises a plurality of beams 26-36 that pass through a lens 37, which provides focused light beams 46-56, respectively, which are imaged onto a CCD camera 60. The lens 37 and the camera 60, and any other necessary electronics or optics for performing the functions described herein, make up the reader 29. Instead of or in addition to the lens 37, other imaging optics may be used to provide the desired characteristics of the optical image/signal onto the camera 60 (e.g., spots, lines, circles, ovals, etc.), depending on the shape of the substrate 10 and input optical signals. Also, instead of a CCD camera other devices may be used to read/capture the output light.

Figure 26:
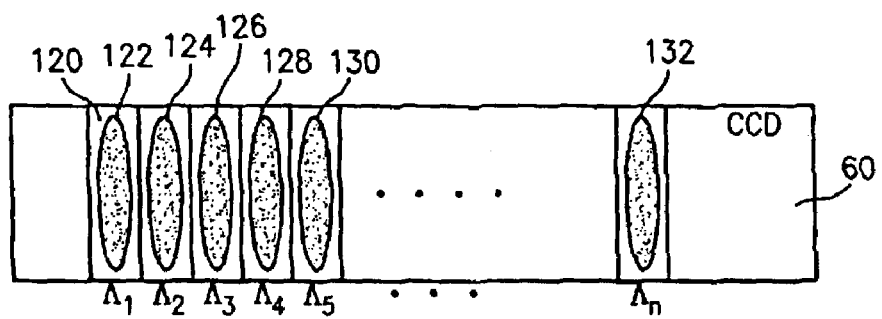
FIG. 26 is an image of a code on a CCD camera from an optical identification element, in accordance with the present invention.
Figure 27:
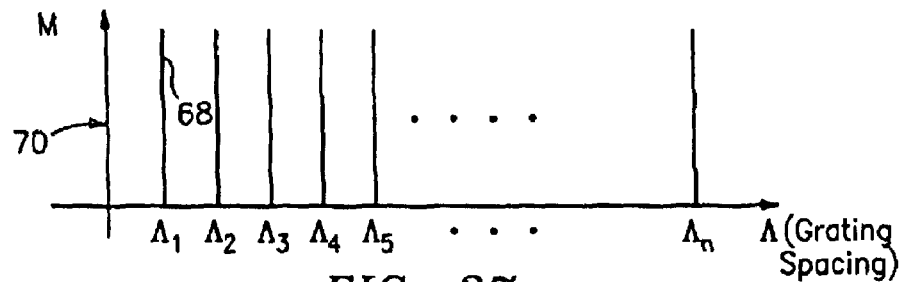
FIG. 27 is a graph showing a digital representation of bits in a code in an optical identification element, in accordance with the present invention.

Referring to FIG. 26, the image on the CCD camera 60 is a series of illuminated stripes indicating ones and zeros of a digital pattern or code of the grating 12 in the element 8. Referring to FIG. 27, lines 68 on a graph 70 are indicative of a digitized version of the image of FIG. 26 as indicated in spatial periods (Λ1-Λn).

Each of the individual spatial periods (Λ1-Λn) in the grating 12 is slightly different, thus producing an array of N unique diffraction conditions (or diffraction angles) discussed more hereinafter. When the element θ is illuminated from the side, in the region of the grating 12, at an appropriate input angle, e.g., about 30 degrees, with a single input wavelength λ (monochromatic) source, the diffracted (or reflected) beams 26-36 are generated. Other input angles θi may be used if desired, depending on various design parameters as discussed herein and/or in the aforementioned patent application, and provided that a known diffraction equation (Eq. 1 below) is satisfied:

$$\sin(\theta_1)+\sin(\theta_0)=m\lambda/n\Lambda \qquad \text{Eq. 1}$$

where Eq. 1 is diffraction (or reflection or scatter) relationship between input wavelength λ, input incident angle θi, output incident angle θo, and the spatial period λ of the grating 12. Further, m is the "order" of the reflection being observed, and n is the refractive index of the substrate 10. The value of m=1 or first order reflection is acceptable for illustrative purposes. Eq. 1 applies to light incident on outer surfaces of the substrate 10 which are parallel to the longitudinal axis of the grating (or the $k_B$ vector). Because the angles θi, θo are defined outside the substrate 10 and because the effective refractive index of the substrate 10 is substantially a common value, the value of n in Eq. 1 cancels out of this equation.

Thus, for a given input wavelength λ, grating spacing λ, and incident angle of the input light θi, the angle θo of the reflected output light may be determined. Solving Eq. 1 for θo and plugging in m=1, gives:

$$\theta_o = \sin^{-1}(\lambda/\Lambda - \sin(\theta_i)) \qquad \text{Eq. 2}$$

For example, for an input wavelength λ=532 nm, a grating spacing Λ=0.532 microns (or 532 nm), and an input angle of incidence θi=30 degrees, the output angle of reflection will be θo=30 degrees. Alternatively, for an input wavelength λ=632 nm, a grating spacing Λ=0.532 microns (or 532 nm), and an input angle θi of 30 degrees, the output angle of reflection θo will be at 43.47 degrees, or for an input angle θi=37 degrees, the output angle of reflection will be θo=37 degrees. Any input angle that satisfies the design requirements discussed herein and/or in the aforementioned patent application may be used.

In addition, to have sufficient optical output power and signal to noise ratio, the output light 27 should fall within an acceptable portion of the Bragg envelope (or normalized reflection efficiency envelope) curve 200, as indicated by points 204, 206, also defined as a Bragg envelope angle θB, as also discussed herein and/or in the aforementioned patent application. The curve 200 may be defined as:

$$I(ki, ko) \approx [KD]^2 \operatorname{sinc}^2\left[\frac{(ki-ko)D}{2}\right] \quad \text{Eq. 3}$$

where K=2πδn/λ, where, δn is the local refractive index modulation amplitude of the grating and λ is the input wavelength, sin c(x)=sin(x)/x, and the vectors $k_i$=2π cos(θ$_i$)/λ, and $k_0$=2π cos(θ$_0$)/λ are the projections of the incident light and the output (or reflected) light, respectively, onto the line 203 normal to the axial direction of the grating 12 (or the grating vector $k_B$), D is the thickness or depth of the grating 12 as measured along the line 203 (normal to the axial direction of the grating 12). Other substrate shapes than a cylinder may be used and will exhibit a similar peaked characteristic of the Bragg envelope. We have found that a value for δn of about $10^4$ in the grating region of the substrate is acceptable; however, other values may be used if desired.

Rewriting Eq. 3 gives the reflection efficiency profile of the Bragg envelope as:

$$I(ki, ko) \approx \left[\frac{2\pi \cdot \delta n \cdot D}{\lambda}\right]^2 \left[\frac{\operatorname{Sin}(x)}{x}\right]^2 \quad \text{Eq. 4}$$

where:

$$x = (ki - ko)D/2 = (\pi D/\lambda)^*(\cos\theta i - \cos\theta o)$$

Thus, when the input angle θi is equal to the output (or reflected) angle θo (i.e., θi=θ$_o$), the reflection efficiency I (Eqs. 3 & 4) is maximized, which is at the center or peak of the Bragg envelope. When θi=θo, the input light angle is referred to as the Bragg angle as is known. The efficiency decreases for other input and output angles (i.e., θi≠θ$_o$), as defined by Eqs. 3 & 4. Thus, for maximum reflection efficiency and thus output light power, for a given grating pitch Λ and input wavelength, the angle θi of the input light 24 should be set so that the angle θo of the reflected output light equals the input angle θi.

Also, as the thickness or diameter D of the grating decreases, the width of the sin(x)/x function (and thus the width of the Bragg envelope) increases and, the coefficient to or amplitude of the sin c$^2$ (or (sin(x)/x)$^2$ function (and thus the efficiency level across the Bragg envelope) also increases, and vice versa. Further, as the wavelength λ increases, the half-width of the Bragg envelope as well as the efficiency level across the Bragg envelope both decrease. Thus, there is a trade-off between the brightness of an individual bit and the number of bits available under the Bragg envelope. Ideally, δn should be made as large as possible to maximize the brightness, which allows D to be made smaller.

From Eq. 3 and 4, the half-angle of the Bragg envelope θ$_B$ is defined as:

$$\theta_B = \frac{\eta\lambda}{\pi D \sin(\theta_i)} \quad \text{Eq. 5}$$

where η is a reflection efficiency factor which is the value for x in the sin c$^2$(x) function where the value of sin c$^2$(x) has decreased to a predetermined value from the maximum amplitude as indicated by points 204, 206 on the curve 200.

We have found that the reflection efficiency is acceptable when η≦1.39. This value for η corresponds to when the amplitude of the reflected beam (i.e., from the sin c$^2$(x) function of Eqs. 3 & 4) has decayed to about 50% of its peak value. In particular, when x=1.39=η, sin c$^2$(x)=0.5. However, other values for efficiency thresholds or factor in the Bragg envelope may be used if desired.

The beams 26-36 are imaged onto the CCD camera 60 to produce the pattern of light and dark regions 120-132 representing a digital (or binary) code, where light=1 and dark=0 (or vice versa). The digital code may be generated by selectively creating individual index variations (or individual gratings) with the desired spatial periods Λ1-Λn. Other illumination, readout techniques, types of gratings, geometries, materials, etc. may be used as discussed in the aforementioned patent application.

Figure 28:
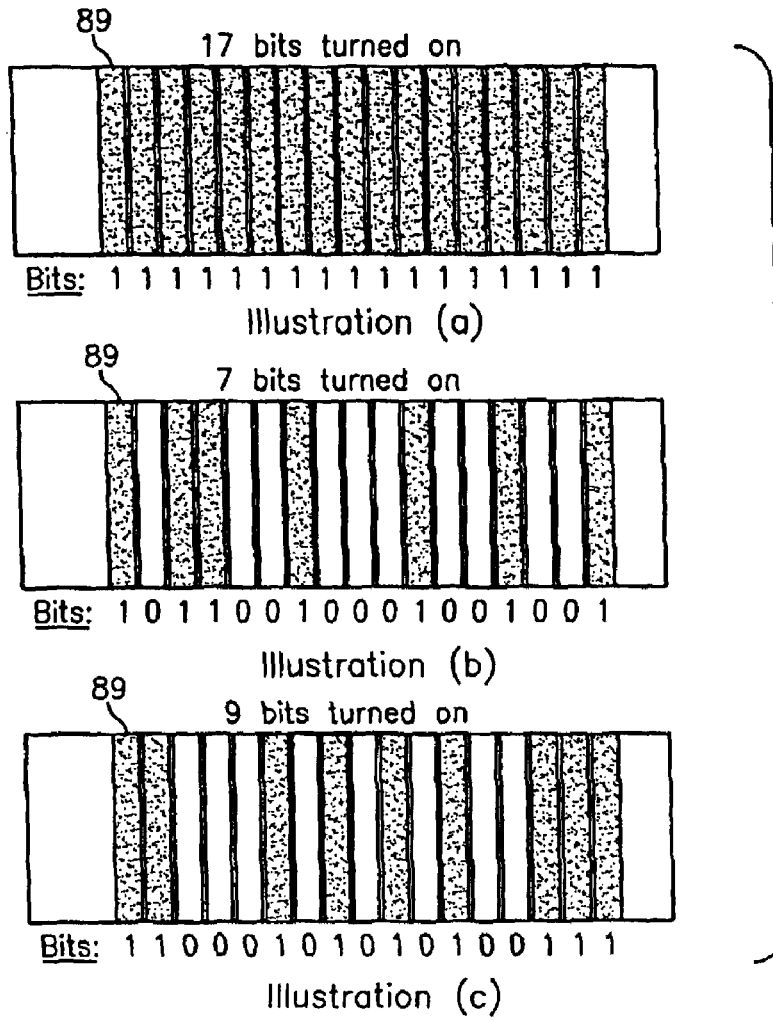
FIG. 28 illustrations (a)-(c) show images of digital codes on a CCD camera, in accordance with the present invention.

Referring to FIG. 28, illustrations (a)-(c), for the grating 12 in a cylindrical substrate 10 having a sample spectral 17 bit code (i.e., 17 different pitches Λ1-Λ17), the corresponding image on the CCD (Charge Coupled Device) camera 60 is shown for a digital pattern of 7 bits turned on (10110010001001001); 9 bits turned on of (11000101010100111); all 17 bits turned on of (11111111111111111).

For the images in FIG. 28, the length of the substrate 10 was 450 microns, the outer diameter D1 was 65 microns, the inner diameter D was 14 microns, δn for the grating 12 was about $10^{-4}$, n1 in portion 20 was about 1.458 (at a wavelength of about 1550 nm), n2 in portion 18 was about 1.453, the average pitch spacing Λ for the grating 12 was about 0.542 microns, and the spacing between pitches ΔΛ was about 0.36% of the adjacent pitches Λ.

Referring to FIG. 29, illustration (a), the pitch Λ of an individual grating is the axial spatial period of the sinusoidal variation in the refractive index n1 in the region 20 of the substrate 10 along the axial length of the grating 12 as indicated by a curve 90 on a graph 91. Referring to FIG. 29, illustration (b), a sample composite grating 12 comprises three individual gratings that are co-located on the substrate 10, each individual grating having slightly different pitches, Λ1, Λ2, Λ3, respectively, and the difference (or spacing) ΔΛ between each pitch Λ being about 3.0% of the period of an adjacent pitch Λ as indicated by a series of curves 92 on a graph 94. Referring to FIG. 29, illustration (c), three individual gratings, each having slightly different pitches, Λ1, Λ2, Λ3, respectively, are shown, the difference ΔΛ between each pitch Λ being about 0.3% of the pitch A of the adjacent pitch as shown by a series of curves 95 on a graph 97. The individual gratings in FIG. 29, illustrations (b) and (c) are shown to all start at 0 for illustration purposes; however, it should be understood that, the separate gratings need not all start in phase with each other. Referring to FIG. 29, illustration (d), the overlapping of the individual sinusoidal refractive index variation pitches Λ1-Λn in the grating region 20 of the substrate 10, produces a combined resultant refractive index variation in the composite grating 12 shown as a curve 96 on a graph 98 representing the combination of the three pitches shown in FIG. 29, illustration (b). Accordingly, the resultant refractive index variation in the grating region 20 of the substrate 10 may not be sinusoidal and is a combination of the individual pitches Λ (or index variation).

The maximum number of resolvable bits N, which is equal to the number of different grating pitches Λ (and hence the number of codes), that can be accurately read (or resolved) using side-illumination and side-reading of the grating 12 in the substrate 10, is determined by numerous factors, including: the beam width w incident on the substrate (and the corresponding substrate length L and grating length Lg), the thickness or diameter D of the grating 12, the wavelength Λ. of incident light, the beam divergence angle $\theta_R$, and the width of the Bragg envelope $\theta_B$ (discussed more in the aforementioned patent application), and may be determined by the equation:

$$N \cong \frac{\eta \beta L}{2D \sin(\theta_i)} \qquad \text{Eq. 6}$$

Referring to 30, illustration (b), the transmission wavelength spectrum of the transmitted output beam 330 (which is transmitted straight through the grating 12) will exhibit a series of notches (or dark spots) 696. Alternatively, instead of detecting the reflected output light 310, the transmitted light 330 may be detected at the detector/reader 308. It should be understood that the optical signal levels for the reflection peaks 695 and transmission notches 696 will depend on the "strength" of the grating 12, i.e., the magnitude of the index variation n in the grating 12.

Referring to FIG. 31, instead of or in addition to the pitches Λ in the grating 12 being oriented normal to the longitudinal axis, the pitches may be created at an angle θg. In that case, when the input light 24 is incident normal to the surface 792, will produce a reflected output beam 790 having an angle θo determined by Eq. 1 as adjusted for the blaze angle θg. This can provide another level of multiplexing bits in the code.

The grating 12 may be impressed in the substrate 10 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat. No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the substrate material, the grating 12 may be partially or totally created by etching or otherwise altering the outer surface geometry of the substrate to create a corrugated or varying surface geometry of the substrate, such as is described in U.S. Pat. No. 3,891,302, entitled "Method of Filtering Modes in Optical Waveguides", to Dabby et al, which is incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

The substrate 10 (and/or the element 8) may have end-view cross-sectional shapes other than circular, such as square, rectangular, elliptical, clam-shell, D-shaped, or other shapes, and may have side-view sectional shapes other than rectangular, such as circular, square, elliptical, clam-shell, D-shaped, or other shapes. Also, 3D geometries other than a cylinder may be used, such as a sphere, a cube, a pyramid or any other 3D shape. Alternatively, the substrate 10 may have a geometry that is a combination of one or more of the foregoing shapes.

The shape of the element 8 and the size of the incident beam may be made to minimize any end scatter off the end face(s) of the element 8, as is discussed herein and/or in the aforementioned patent application. Accordingly, to minimize such scatter, the incident beam 24 may be oval shaped where the narrow portion of the oval is smaller than the diameter D1, and the long portion of the oval is smaller than the length L of the element 8. Alternatively, the shape of the end faces may be rounded or other shapes or may be coated with an antireflective coating.

It should be understood that the size of any given dimension for the region 20 of the grating 12 may be less than any corresponding dimension of the substrate 10. For example, if the grating 12 has dimensions of length Lg, depth Dg, and width Wg, and the substrate 12 has different dimensions of length L, depth D, and width W, the dimensions of the grating 12 may be less than that of the substrate 12. Thus, the grating 12, may be embedded within or part of a much larger substrate 12. Also, the element 8 may be embedded or formed in or on a larger object for identification of the object.

The dimensions, geometries, materials, and material properties of the substrate 10 are selected such that the desired optical and material properties are met for a given application. The resolution and range for the optical codes are scalable by controlling these parameters as discussed herein and/or in the aforementioned patent application.

Referring to FIG. 32, the substrate 10 may have an outer coating 799, such as a polymer or other material that may be dissimilar to the material of the substrate 10, provided that the coating 799 on at least a portion of the substrate, allows sufficient light to pass through the substrate for adequate optical detection of the code. The coating 799 may be on any one or more sides of the substrate 10. Also, the coating 799 may be a material that causes the element 8 to float or sink in certain fluids (liquid and/or gas) solutions.

Also, the substrate 10 may be made of a material that is less dense than certain fluid (liquids and/or gas) solutions, thereby allowing the elements 8 to float or be buoyant or partially buoyant. Also, the substrate may be made of a porous material, such as controlled pore glass (CPG) or other porous material, which may also reduce the density of the element 8 and may make the element 8 buoyant or partially-buoyant in certain fluids.

Also, the grating 12 is axially spatially invariant. As a result, the substrate 10 with the grating 12 may be axially subdivided or cut into many separate smaller substrates and each substrate will contain the same code as the longer substrate had before it was cut. The limit on the size of the smaller substrates is based on design and performance factors discussed herein and/or in the aforementioned patent application.

Referring to FIG. 33, one purpose of the outer region 18 (or region without the grating 12) of the substrate 10 is to provide mechanical or structural support for the inner grating region 20. Accordingly, the entire substrate 10 may comprise the grating 12, if desired. Alternatively, the support portion may be completely or partially beneath, above, or along one or more sides of the grating region 20, such as in a planar geometry, or a D-shaped geometry, or other geometries, as described herein and/or in the aforementioned patent application. The non-grating portion 18 of the substrate 10 may be used for other purposes as well, such as optical lensing effects or other effects (discussed herein or in the aforementioned patent application). Also, the end faces of the substrate 10 need not be perpendicular to the sides or parallel to each other. However, for applications where the elements 8 are stacked end-to-end, the packing density may be optimized if the end faces are perpendicular to the sides.

Referring to FIG. 34, illustrations (a)-(c), two or more substrates 10,250, each having at least one grating therein, may be attached together to form the element 8, e.g., by an adhesive, fusing or other attachment techniques. In that case, the gratings 12,252 may have the same or different codes.

Referring to FIG. 35, illustrations (a) and (b), the substrate 10 may have multiple regions 80, 90 and one or more of these regions may have gratings in them. For example, there may be gratings 12,252 side-by-side (illustration (a)), or there may be gratings 82-88, spaced end-to-end (illustration (b)) in the substrate 10.

Referring to FIG. 36, the length L of the element 8 may be shorter than its diameter D, thus, having a geometry such as a plug, puck, wafer, disc or plate.

Referring to FIG. 37, to facilitate proper alignment of the grating axis with the angle θi of the input beam 24, the substrate 10 may have a plurality of the gratings 12 having the same codes written therein at numerous different angular or rotational (or azimuthal) positions of the substrate 10. In particular, two gratings 550, 552, having axial grating axes 551, 553, respectively may have a common central (or pivot or rotational) point where the two axes 551,553 intersect. The angle θi of the incident light 24 is aligned properly with the grating 550 and is not aligned with the grating 552, such that output light 555 is reflected off the grating 550 and light 557 passes through the grating 550 as discussed herein. If the element 8 is rotated as shown by the arrows 559, the angle θi of incident light 24 will become aligned properly with the grating 552 and not aligned with the grating 550 such that output light 555 is reflected off the grating 552 and light 557 passes through the grating 552. When multiple gratings are located in this rotational orientation, the bead may be rotated as indicated by a line 559 and there may be many angular positions that will provide correct (or optimal) incident input angles θi to the grating. While this example shows a circular cross-section, this technique may be used with any shape cross-section.

Referring to FIG. 38, illustrations (a), (b), (c), (d), and (e) the substrate 10 may have one or more holes located within the substrate 10. In illustration (a), holes 560 may be located at various points along all or a portion of the length of the substrate 10. The holes need not pass all the way through the substrate 10. Any number, size and spacing for the holes 560 may be used if desired. In illustration (b), holes 572 may be located very close together to form a honeycomb-like area of all or a portion of the cross-section. In illustration (c), one (or more) inner hole 566 may be located in the center of the substrate 10 or anywhere inside of where the grating region(s) 20 are located. The inner hole 566 may be coated with a reflective coating 573 to reflect light to facilitate reading of one or more of the gratings 12 and/or to reflect light diffracted off one or more of the gratings 12. The incident light 24 may reflect off the grating 12 in the region 20 and then reflect off the surface 573 to provide output light 577. Alternatively, the incident light 24 may reflect off the surface 573, then reflect off the grating 12 and provide the output light 575. In that case the grating region 20 may run axially or circumferentially 571 around the substrate 10. In illustration (d), the holes 579 may be located circumferentially around the grating region 20 or transversely across the substrate 10. In illustration (e), the grating 12 may be located circumferentially around the outside of the substrate 10, and there may be holes 574 inside the substrate 10.

Referring to FIG. 39, illustrations (a), (b), and (c), the substrate 10 may have one or more protruding portions or teeth 570, 578,580 extending radially and/or circumferentially from the substrate 10. Alternatively, the teeth 570, 578, 580 may have any other desired shape.

Referring to FIG. 40, illustrations (a), (b), (c) a D-shaped substrate, a flat-sided substrate and an eye-shaped (or clamshell or teardrop shaped) substrate 10, respectively, are shown. Also, the grating region 20 may have end cross-sectional shapes other than circular and may have side cross-sectional shapes other than rectangular, such as any of the geometries described herein for the substrate 10. For example, the grating region 20 may have a oval cross-sectional shape as shown by dashed lines 581, which may be oriented in a desired direction, consistent with the teachings herein. Any other geometries for the substrate 10 or the grating region 20 may be used if desired, as described herein.

Referring to FIG. 41, at least a portion of a side of the substrate 10 may be coated with a reflective coating to allow incident light 510 to be reflected back to the same side from which the incident light came, as indicated by reflected light 512.

Referring to FIG. 42, illustrations (a) and (b), alternatively, the substrate 10 can be electrically and/or magnetically polarized, by a dopant or coating, which may be used to ease handling and/or alignment or orientation of the substrate 10 and/or the grating 12, or used for other purposes. Alternatively, the bead may be coated with conductive material, e.g., metal coating on the inside of a holy substrate, or metallic dopant inside the substrate. In these cases, such materials can cause the substrate 10 to align in an electric or magnetic field. Alternatively, the substrate can be doped with an element or compound that fluoresces or glows under appropriate illumination, e.g., a rare earth dopant, such as Erbium, or other rare earth dopant or fluorescent or luminescent molecule. In that case, such fluorescence or luminescence may aid in locating and/or aligning substrates.

Unless otherwise specifically stated herein, the term "microbead" is used herein as a label and does not restrict any embodiment or application of the present invention to certain dimensions, materials and/or geometries.

Referring to FIG. 43, the codes that are on the beads may be indicative of any type of desired information such as that described in U.S. patent application Ser. No. 10/661,082, filed Sep. 12, 2003, entitled "Method and Apparatus for Labeling Using Diffraction Grating-Based Encoded Optical Identification Elements". For example, in FIG. 43, the code may be a simple code or may be a more complex code having many pieces of information located in the code. In addition, the code may have checks within the code to ensure the code is read correctly. It can be viewed as a serial digital message, word, or frame consisting of N bits.

In particular, there may be start and stop bits 869, 871, respectively. The start and stop bits may each take up more than one bit location if desired. In addition, there may be an error check portion of the message, such as a check sum or CRC (cyclic redundancy check) having a predetermined number of bits, and a code section 873 having a predetermined number of bits. The error check portion ensures that the code which is obtained from the bead is accurate. Accordingly, having a large number of bits in the element 8 allows for greater statistical accuracy in the code readout and decreases the likelihood of providing an erroneous code. Accordingly, if a code cannot be read without an error, no code will be provided, avoiding an erroneous result. Any known techniques for digital error checking for single or multi-bit errors may be used.

The code section 873 may be broken up into one or more groups of bits, for example, three bit groups 863,865,867, each bit group containing information about the bead itself or the item attached to the bead or how the bead is to be used, or other information. For example, the first bit group 863 may contain information regarding "identifying numbers", such as: lot number, quality control number, model number, serial number, inventory control number; the second bit group 865 may contain "type" information, such as: chemical or cell type, experiment type, item type, animal type; and the third bit group 867 may contain "date" information, such as: manufactured date, experiment date, creation date, initial tracking date. Any other bit groups, number of bit groups, or size of bit groups may be used if desired. Also, additional error or fault checking can be used if desired.

In particular, for a product manufacturing application, the code may have the serial number, the lot number, date of manufacture, etc. or have other information that identifies the item and/or information about the item. For a chemical or assay application, the code may have information about the chemical attached to the bead, the date and/or time of creation of the chemical or experiment, or other information of interest.

In addition, the digital code may be used as a covert, anti-counterfeit, and/or anti-theft type encoding, authentication, or identification code. For example, the code may contain an encrypted code that only certain people/entities can read and understand with the proper decryption. Also, a plurality of beads having different codes may be placed in or on a single item and all the codes would to be read together or in a certain order for them to obtain the intended tracking, identification or authentication information. Alternatively, one of the codes may be a key to de-encrypt the codes on the other beads in the same item. Also, the codes may constantly be updated, e.g., rolling codes, or any combination of private and/or public key encryption may be used. Any other use of a bead combination and/or encryption/decryption techniques may be used if desired.

Figure 44:
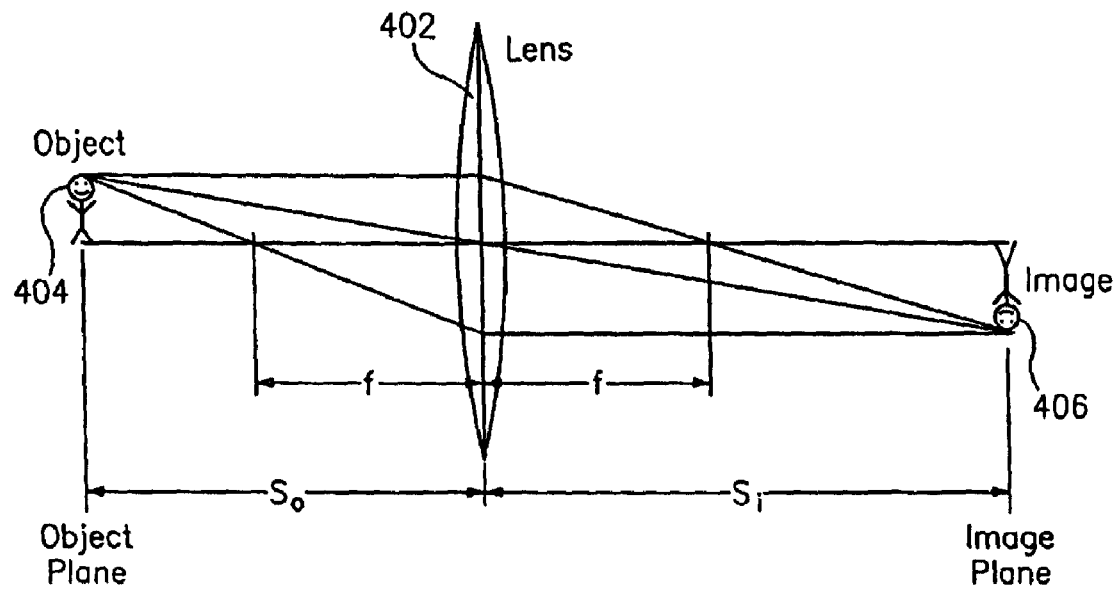
FIGS. 44 & 45 shows the use of a lens as an imaging and Fourier transform device, in accordance with the present invention.

Referring to FIG. 44, the imaging properties of a known positive lens 402 may be described according to the following known principles. If an object 404 is located a distance $s_i$ away from the lens 402, i.e., in an "object plane", the lens 402 will form an image 406 in an "image plane" of the object 404 a distance $s_1$ away from the lens 402. The known relationship between $s_0$ and $s_1$ can be written as follows:

$$\frac{1}{s_o} + \frac{1}{s_i} = \frac{1}{f}$$

where f is the focal length of the lens 402 and $s_o$ is greater than the focal length of the lens 402. The size of the image relative to the object (or magnification M) has the known relationship:

$$M = \frac{s_i}{s_o}$$

where M is the size of the image 406 divided by the size of the object 404. Accordingly, if the lens 402 is placed a distance I away from the object 404, the image 405 is infinitely large at a distance of infinity away from the lens 402, as is known. For the purposes of this discussion, the lens 402 is presumed to be infinitely large, infinitely thin (i.e, a line) as located on a plane parallel to the plane of the lens, and with no aberrations.

Figure 45:
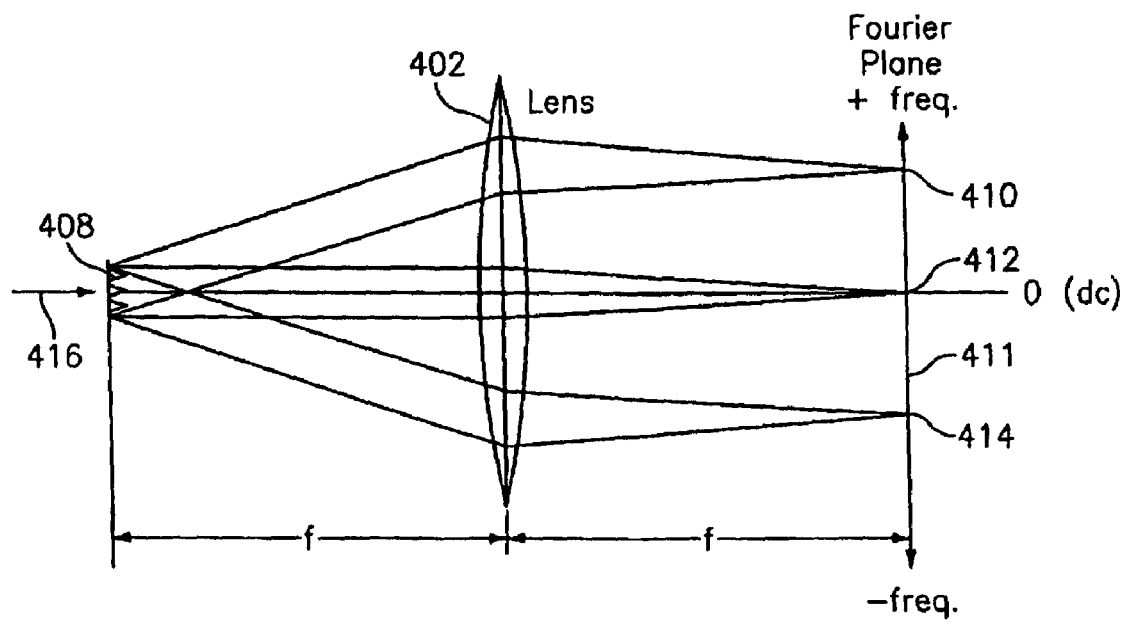

Referring to FIG. 45, the Fourier properties of the lens 402 may be described based on the following known principles, if the lens 402 is placed a distance f in front of an electric field distribution 408, the lens 402 will form an electric field distribution 410 that corresponds to the Fourier transform of the original electric field profile 408 at a distance f away from the lens 402 (i.e., at the "Fourier Plane" 411). The Fourier Plane image is also known as the "far field" image with a different scale, e.g., greater than about 20 Rayleigh ranges away. in particular, for the electric field sine wave 408 having a predetermined intensity or peak value and a DC offset, resulting Fourier transform intensity pattern in the Fourier Plane 411 provided by the lens 402 would be three delta functions (or points of light) 410, 412, 414, corresponding to the DC value at the point 412, the positive frequency value of the sign wave 408 at the point 410 and the negative value of the frequency of the sign wave 408 at the point 414. The intensity of the light at the point 412 corresponds to the DC value of the sine wave 408, and the intensity of the light at the points 410, 414 corresponds to the peak value of the sine wave 408.

Relating the Fourier Plane discussion above to the diffraction grating-based code in the bead 8 that is read by the reader of the present invention, the sine wave 408 would correspond to the resultant refractive index variation within the bead 8 having a single spatial period, an efficiency <100%, and where a light beam 412 is incident on the bead at an angle of 0 degrees to the normal of the grating vector (the longitudinal axis of the bead 8).

It should be further understood from FIGS. 44,45 that if the lens 402 is placed a distance $s_o$ away from the incident electric field 408, the lens would provide an image of the electric field 408 at a distance $s_i$ away with a magnification $s_o/s_1$ (not shown).

Accordingly, the reader of the present invention obtains an image of the Fourier transform of the resultant refractive index variation within the bead 8, which results in lines in the Fourier plane as seen on the CCD camera (or code camera). As a result, the reader does not require expensive imaging optics to obtain an image of the bead. In contrast, if the code on the bead could only be read by obtaining an image of the bead, e.g., if the code was simply as series of stripes printed on the bead, the reader would need to obtain a magnified image of the bead with sufficient magnification to allow a camera to read the stripes and thus obtain the code on the bead 8.

Figure 46:
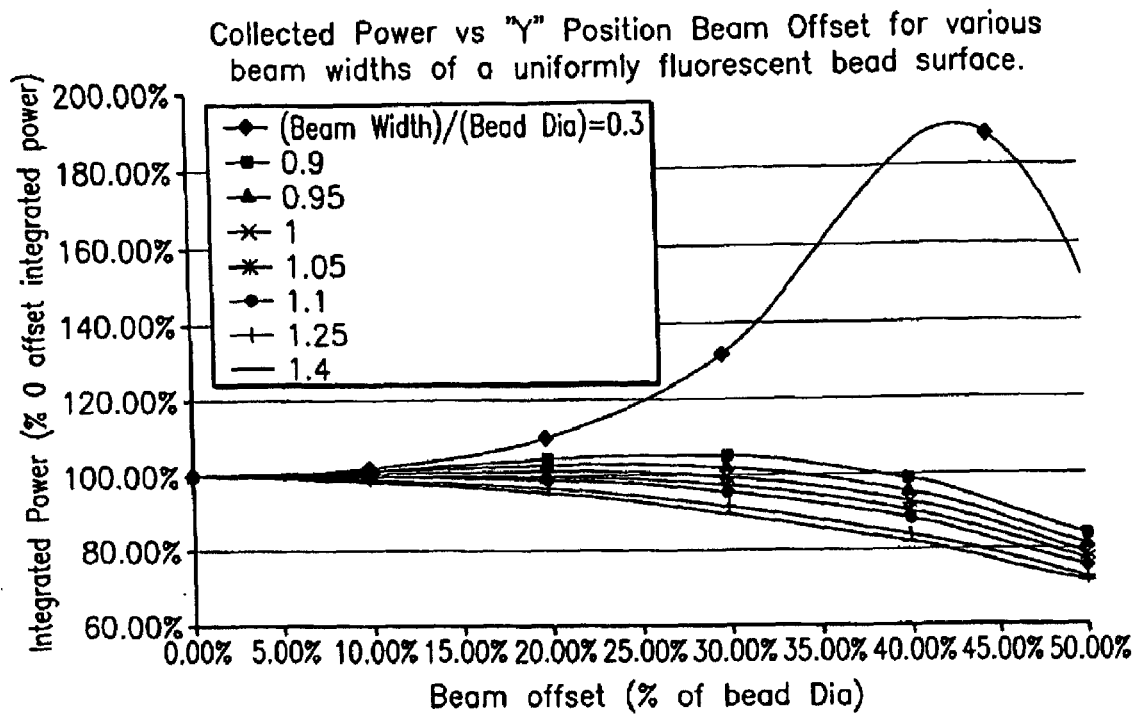
FIGS. 46-51 show various graphs relating to fluorescence level as it related to excitation beam position on the bead, in accordance with the present invention.
Figure 46A:
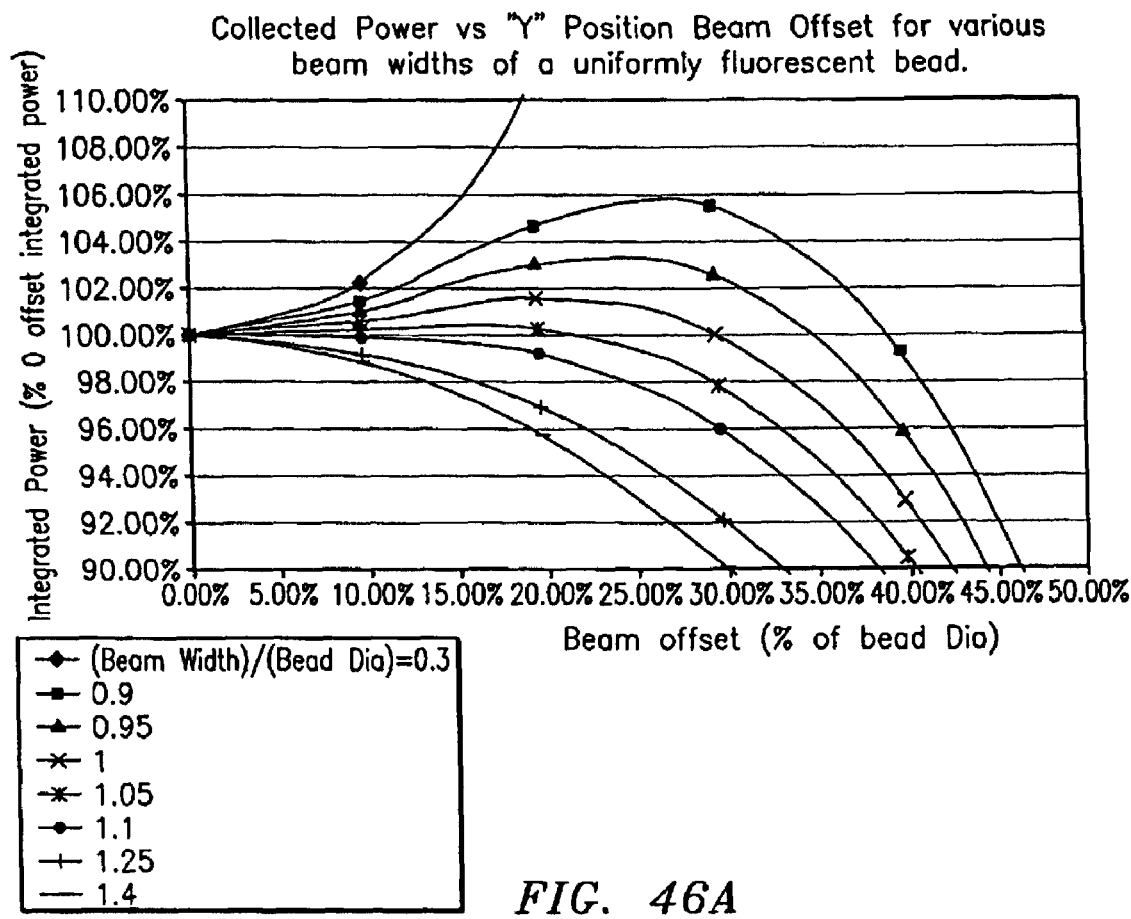
Figure 46C:
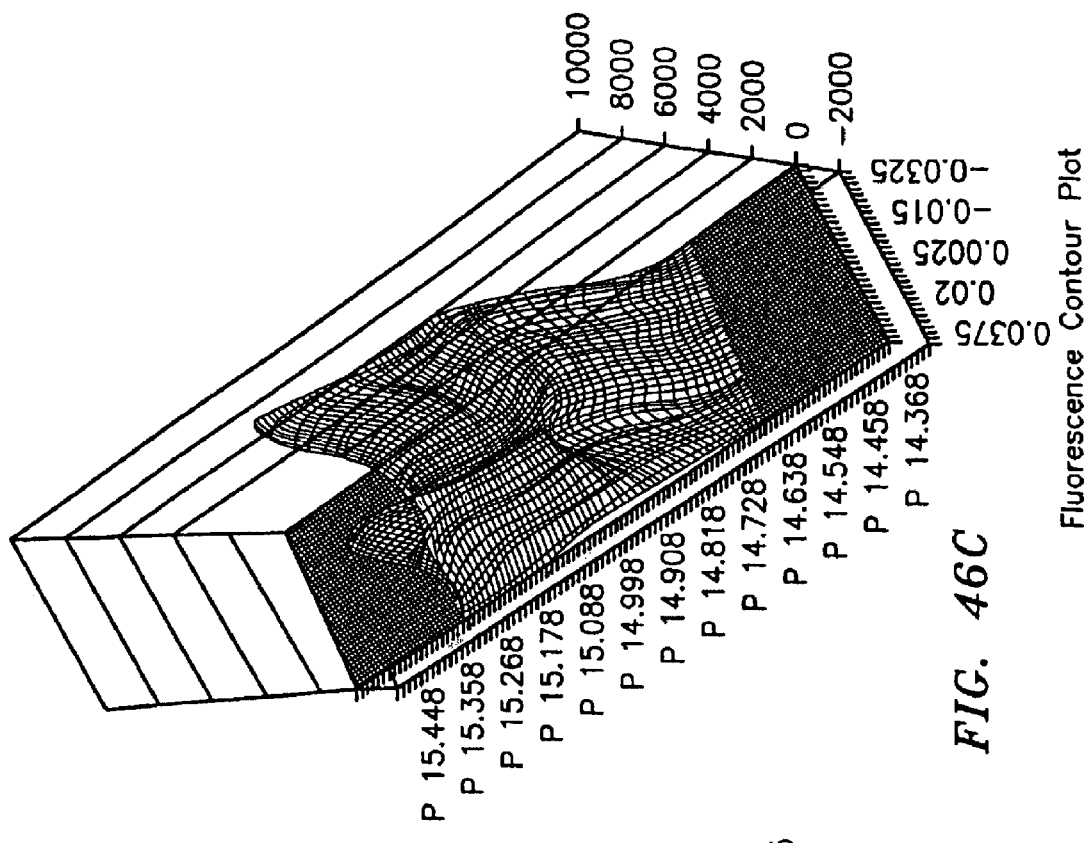
Figure 47:
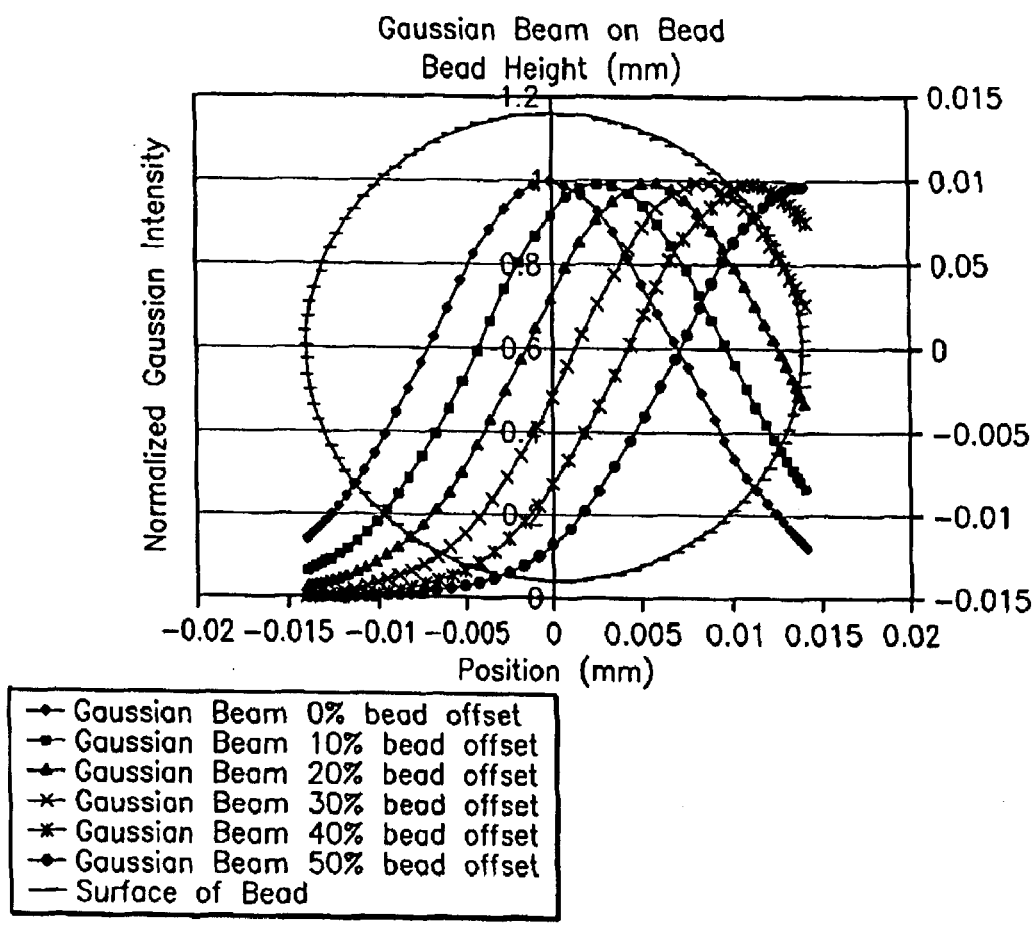
Figure 48:
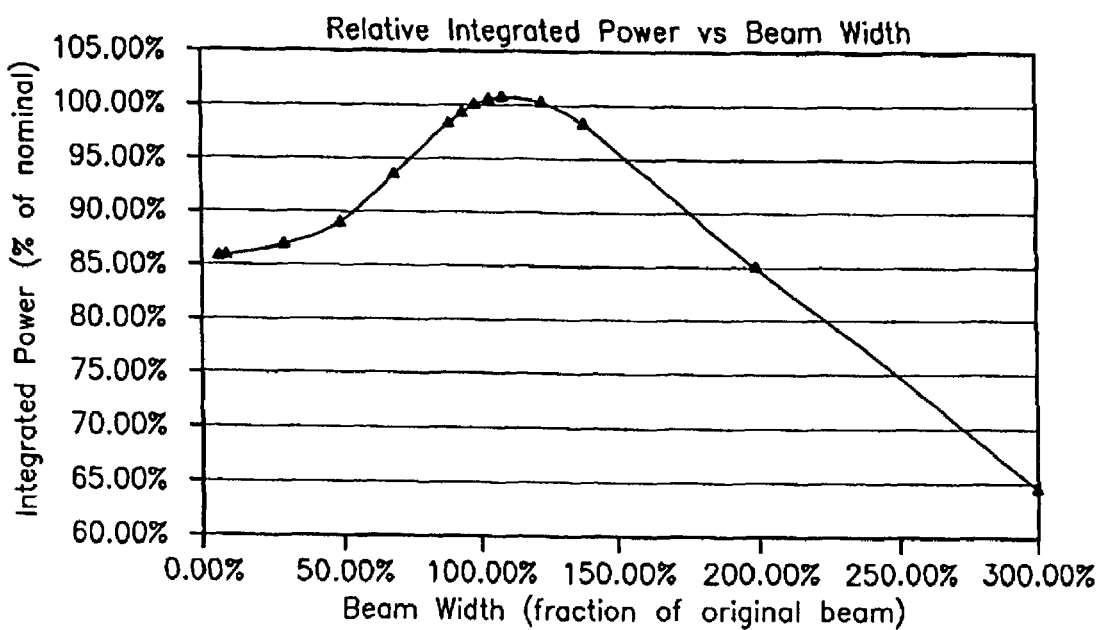

Referring to FIG. 46, the reader system is designed to minimize position sensitivity. In particular, referring to FIG. 46, a family of curves representing the relative intensity received by a detector from a uniformly fluorescent cylindrical surface illuminated by a Gaussian beam, assuming no refraction of the beam occurs due to the bead. All Gaussian beam width data has been normalized to the bead radius and all intensity data has been normalized to the axis of the cylinder. FIG. 46A is an expanded look at FIG. 46A in the region of interest around the normalized signal intensity of 100%. FIG. 46, is actual data taken by making multiple scans on a particular bead using different axial beam position relative to the bead. FIG. 46C is a contour plot of the multiple data sets taken for the data used in FIG. 46B, using the following (approximate) beam dimensions: Beam Width=BeadDia/4 and the BeamLength=BeadLength/2. FIG. 47 is a plot of a Gaussian beam of width=bead radius, superimposed onto the bead at various offset positions. FIG. 48 is a plot of the relative intensity received by a detector from a uniformly fluorescent cylindrical surface illuminated by various width Gaussian beams passing through the axis of the cylinder.

Referring to FIG. 46, the family of curves shows the relative intensity seen by a detector system as a function of beam position relative to the bead. The reason for the shape of the curves is quite simple. For very small beams; as the position of the beam moves from the center of the cylinder (bead) to the edges of the bead, more surface area is illuminated, resulting in an increase in signal seen by a detector. For very large beams, the entire surface is essentially uniformly illuminated and the power essentially goes as the intensity along the Gaussian beam. For the case of the beam half width=the radius of the cylinder (bead), the center of the beam illuminates the center of the bead while the tails of the beam illuminate the edges of the bead (large surface area). As the position of the beam moves from the center toward the edges, the higher intensity light illuminates more of the surface area of the bead, compensating for the fact that some portion of the beam is no longer incident on the bead and the light emitted from the bead is balanced for a relative large beam to bead position offset. These curves show that in order to maximize the offset position of the beam to the bead, without significantly changing the amount of light received by a detector, the $1/e^2$ beam half width wants to be approximately equal to the radius of the cylinder. Beams smaller than this will yield an increase in signal received at a detector as the beam moves from the axis of the cylinder. Beams larger than this will yield a signal that decreases as the beam moves from the axis of the cylinder. It is obvious to one skilled in the art that increasing the beam width much larger than the cylinder diameter will also yield a signal that is substantially insensitive to position of the beam from the axis of the cylinder. However this position insensitivity is at the expense of relative intensity of the signal, as well as an inability to put the beads close together without incurring cross talk by illuminating adjacent beads.

FIG. 46A is an expanded view of FIG. 46 in the region of interest around the point where the normalized fluorescence power received by a detector is equal to 1.

Figure 46B:
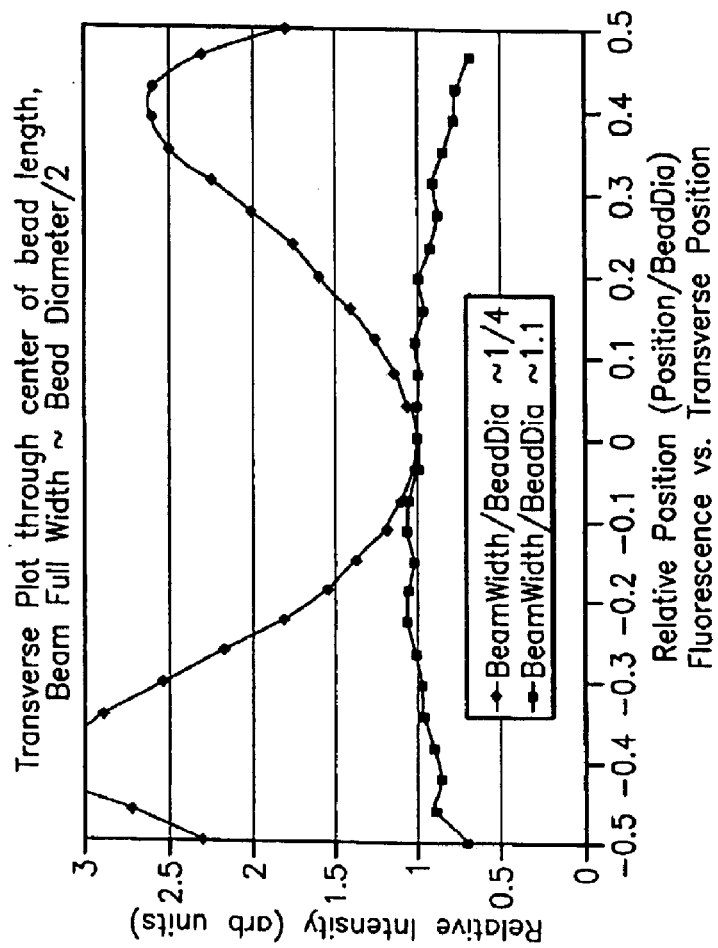

Referring to FIG. 46B, the data sets were taken by scanning a bead multiple times along the axial length of the bead and varying the transverse position by 2.5 microns for each successive scan. Note that this bead is not completely uniform in that the left side shows more signal than the right side. FIG. 46C is a contour plot incorporating all of the data taken on the bead data shown in FIG. 46B.

Referring to FIG. 47, this family of curves represents the cylindrical shape of the fluorescent surface (circle) and a Gaussian beam of half width=the cylinder radius located at different positions relative to the axis of the cylinder. To produce the data for FIGS. 46 and 48, each Gaussian beam is plotted onto the points of the cylinder and the intensity of the points is summed.

Figure 49:
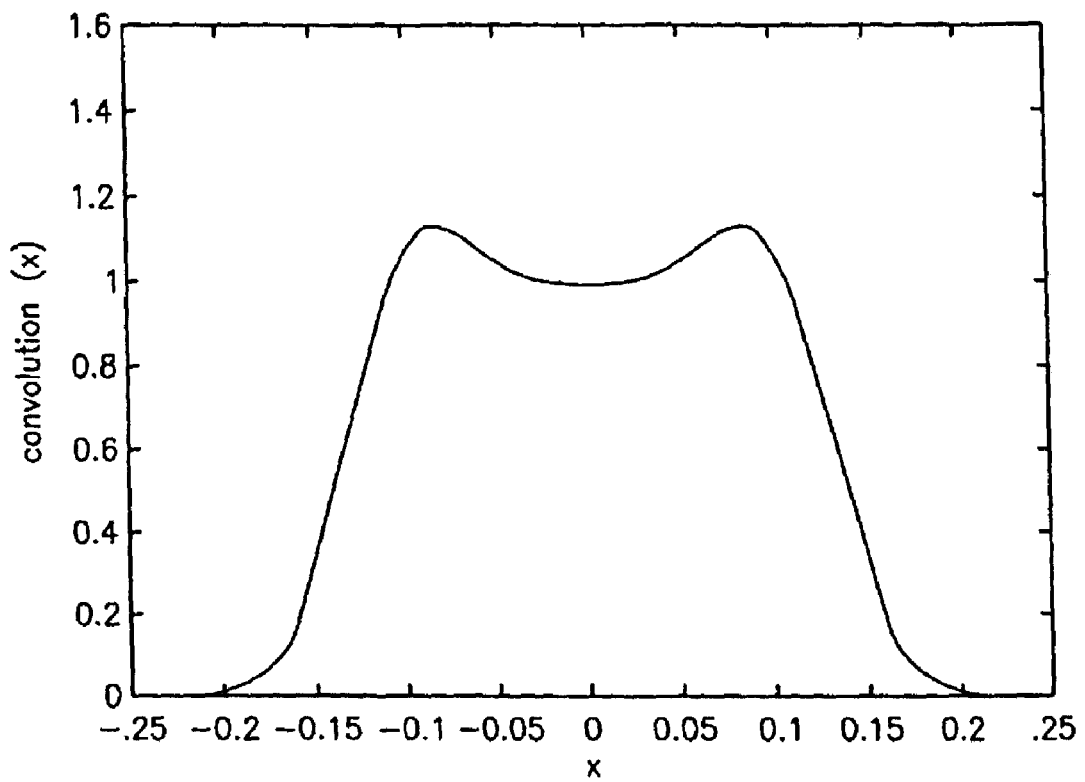

One main difference between alternative embodiments discussed herein is the separation of the "code" and "fluorescence" beams. This was done mainly to obtain better resolution for fluorescence while scanning the beam parallel to the axis of symmetry of the bead, without increasing the length of the bead. Using a beam that is larger than half of the axial bead length causes a potential issue with reading the fluorescence of the bead. There are two issues with this situation, adjacent beads with widely differing surface fluorescence values and bead end conditions. Adjacent beads with widely differing fluorescence signals can cause the fluorescence of a highly fluorescent bead to get into the measurement of an adjacent bead with less signal. Bead end condition scatter exists when the beads are saw cut, resulting in a surface finish that is somewhat unknown. This can occasionally result in a bead whose end faces have considerably more area than would be calculated by $\pi r^2$. Since the processes downstream put a uniform coating of materials on the surface(s) of the beads, the ends can have more brightness than desired, or calculated. FIG. 49 represents a normalized plot of the fluorescence of a bead scanned along the axis of the bead, with a beam approximately ½ of a bead length and an end surface roughness factor of 5.

Figure 50:
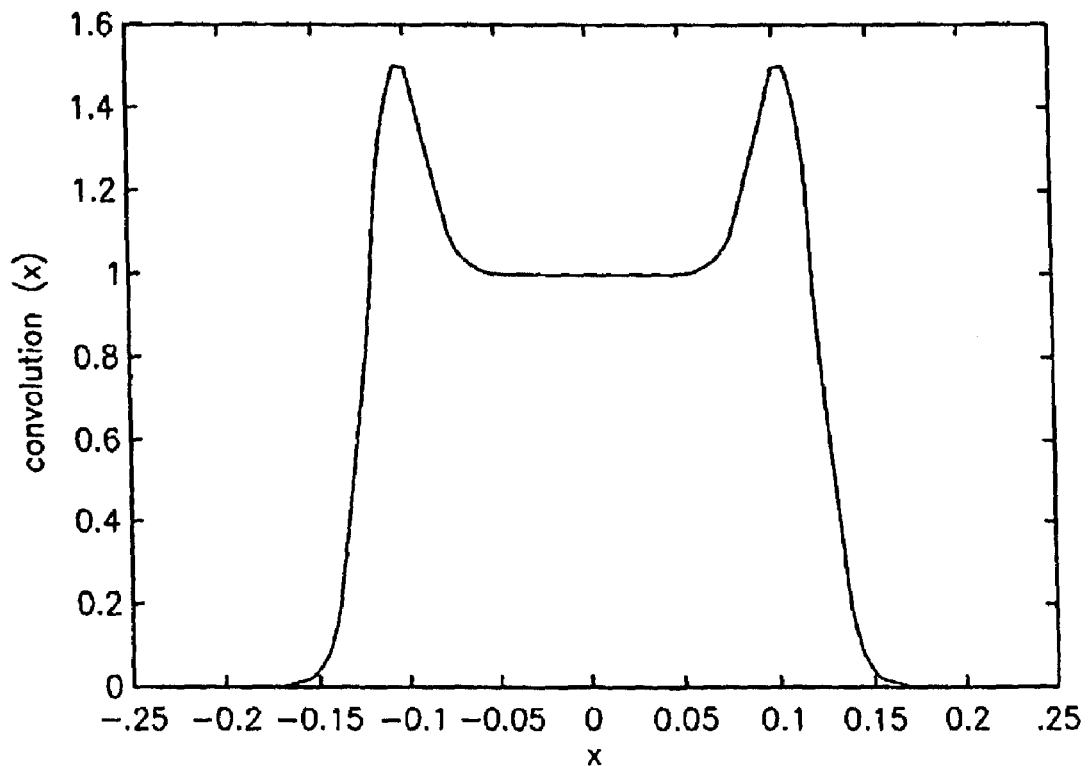

Referring to FIG. 50, the bead 8 is modeled at 225 microns long and the beam is 128 microns long. The graph is normalized for a beam hitting only the cylindrical portion of the bead. From the graph, it is clear to see that there is very little of fluorescence signal from the bead that does not have influence of the ends of the bead. Furthermore, it is simple to see that if two beads were touching end to end and one bead has much more signal than the other, the ends of the bead with a lot of signal would influence the signal measured on the bead with very little signal. To reduce this effect, the bead could grow longer, the beam could shrink, or a combination of the two.

Figure 51:
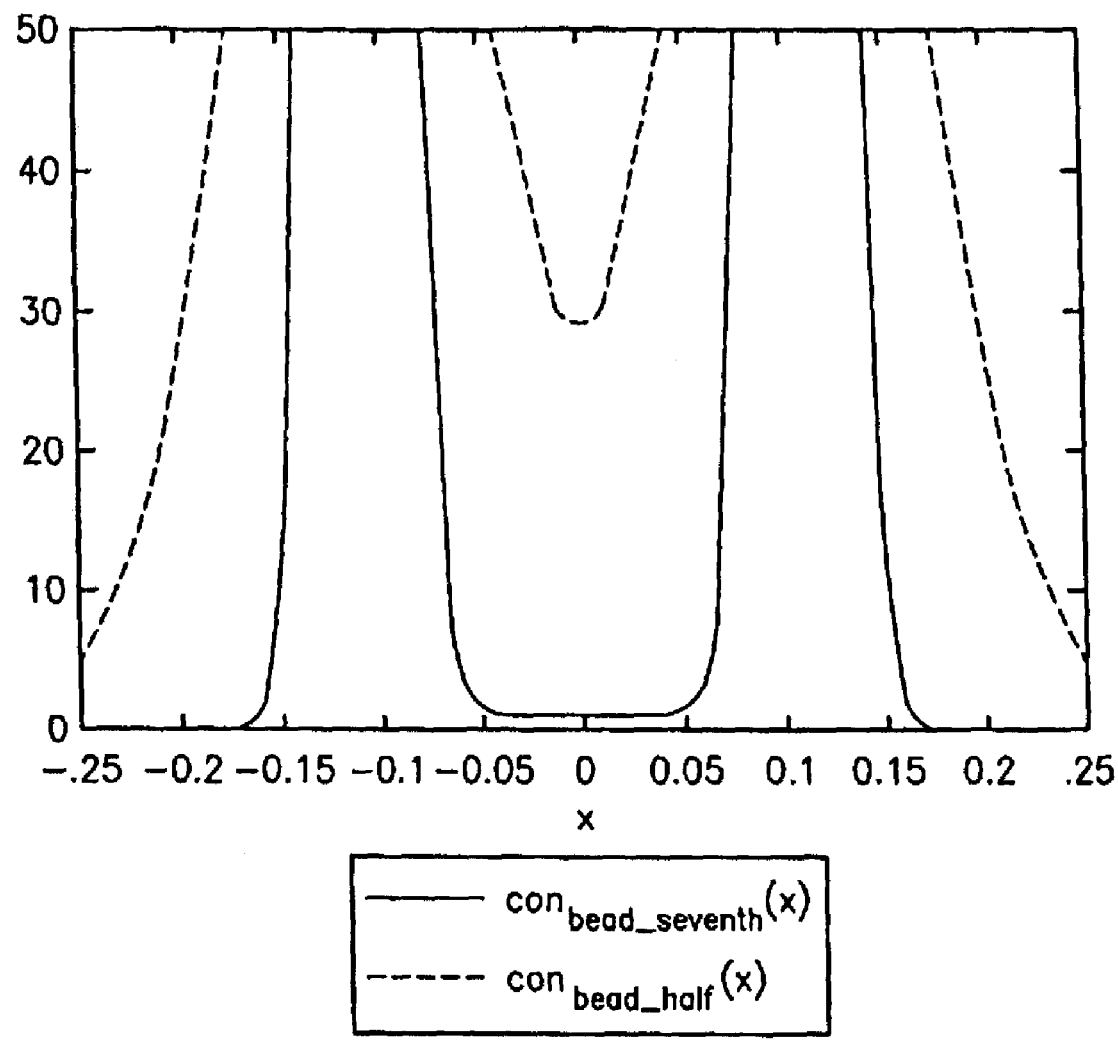

FIG. 50 shows a calculation using the same bead and end surface roughness factor, but a beam approximately 3.5 times smaller than the previous convolution, the situation is greatly improved. Now a significant portion of the bead is free of the influence of the ends of the bead, therefore free from the influence of adjacent beads as well. To illustrate the effect of bead crosstalk, consider a bead between two adjacent beads (touching end to end) with three orders of magnitude less signal than the beads on either side of it. This (worst case) crosstalk can be modeled simply by multiplying the end surface factors of the previous example by 1000. This is the FIG. 51 plot, where the case of the beam length equal to half the bead length (dotted line) and the case where beam length is one seventh the bead length (solid line) are plotted on top of one another. The differences between these two graphs illustrate the desire to use a fluorescence interrogation beam (exciter) that is ⅐th or less the axial bead length in order to have valid fluorescence signal over greater than $\frac{1}{3}^{rd}$ of the bead.

Since the beam for reading code is fixed by the spacing and desired resolution of the codes and we did not wish to change the length of the beads, we decided it was best to use different beam diameters for code and fluorescence in our new system.

The fluorescence pickup works in conjunction with the excitation beam to produce signals proportional to the fluorescence of the surface of the beads. The excitation beam comes in at an angle outside the NA of the collection optics and excites a portion of the bead generally at the focus of the collection optics. In doing this, it does not substantially illuminate unwanted material outside of our collection NA, thus keep our optical signal to noise ratio (OSNR) low (see page 15/16 of power point presentation). Furthermore, we focus the light from the collection optic into a multimode optical fiber, which provides spatial filtering and NA filtering for the collected signal. The optical fiber core diameter and NA are picked such that the system will collect light in the most efficient way and make system tolerances reasonable. For the present reader, the fiber core diameter is 100 micron and the fluorescence beam has a diameter of about 28 micron. The fiber NA matches the collection NA and the lens focusing light into the fiber is the same lens as the collection optic. It is reasonable to conceive a system where the lens focusing light into the fiber does not match the collection optics and the fiber core diameter and NA are different from the collection optics, however as long as the product of the core diameter and fiber NA is conserved, the same collection efficiency will be achieved.

Figure 52:
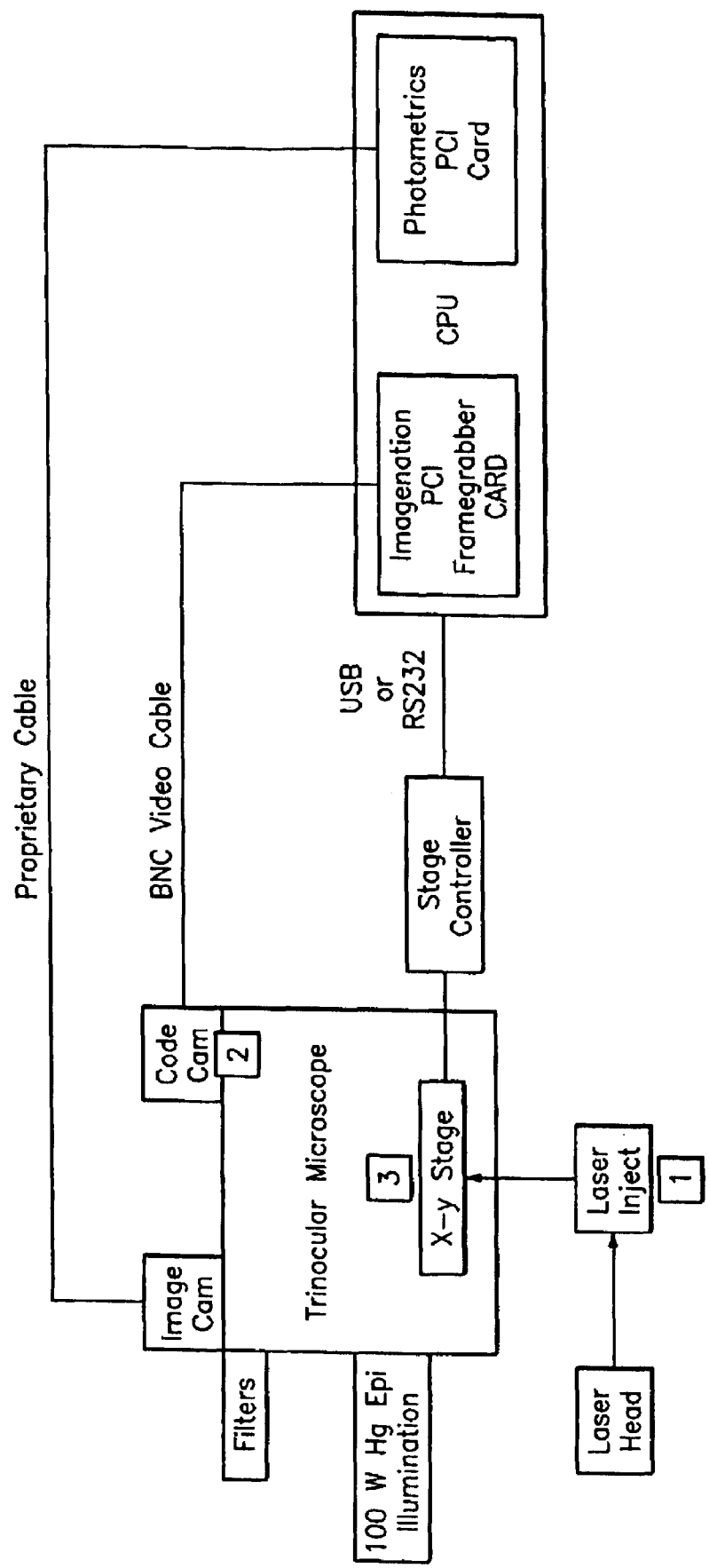
FIG. 52 is a block diagram of an alternative architecture embodiments of a bead reader or mapper, in accordance with the present invention.
Figure 53:
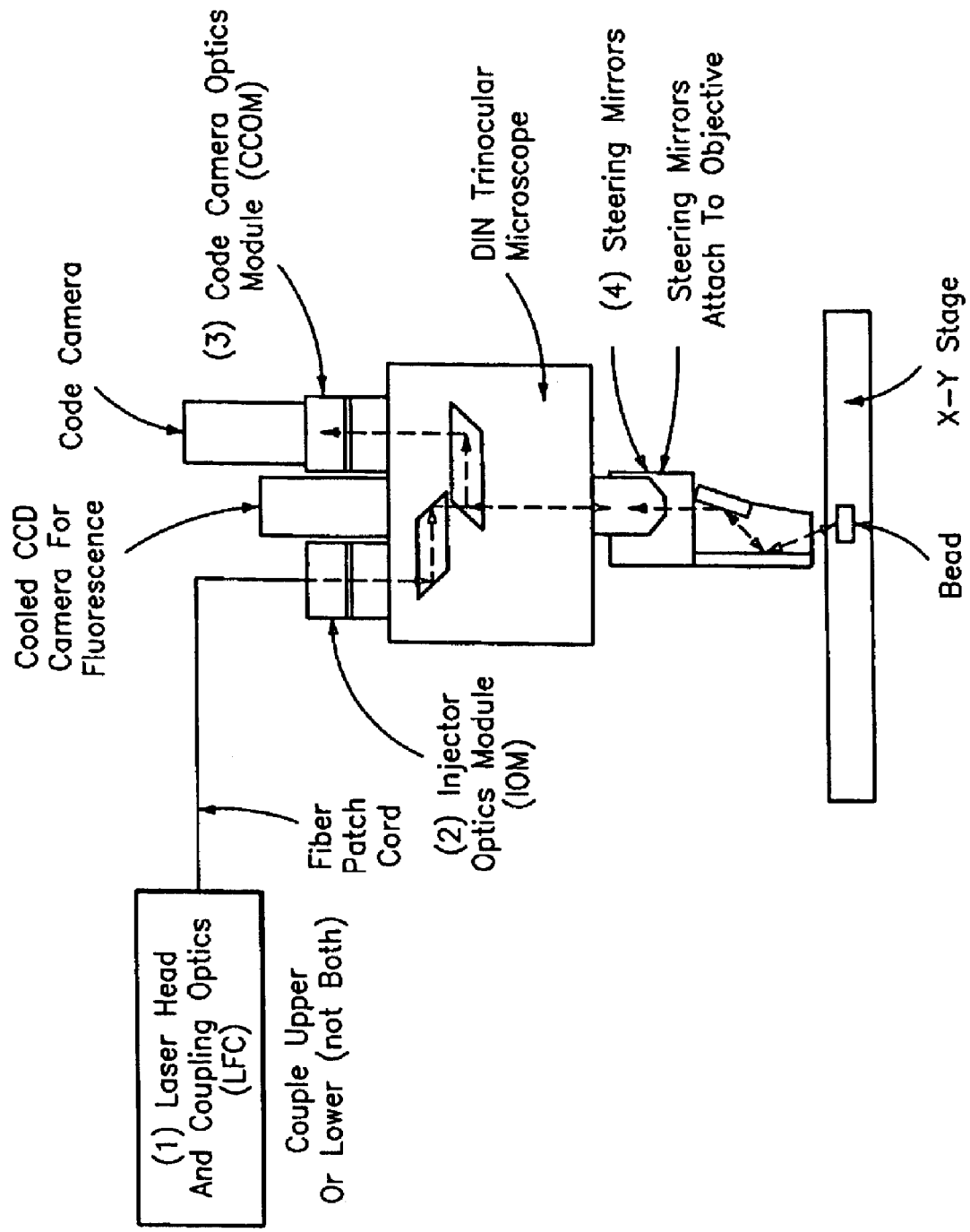
FIGS. 53-56 are optical diagrams of an alternative embodiments of a bead reader or mapper, in accordance with the present invention.
Figure 54:
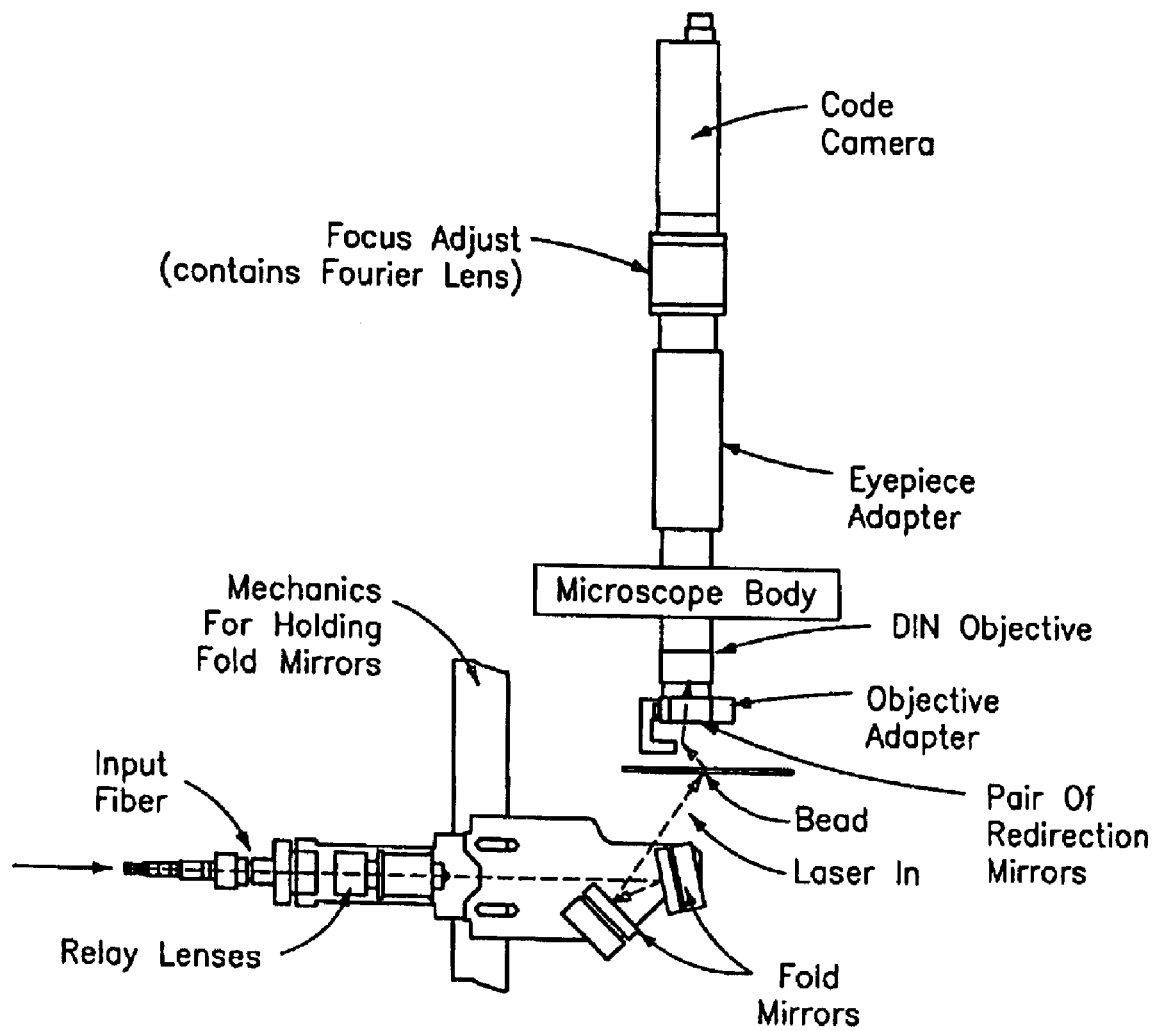
Figure 55:
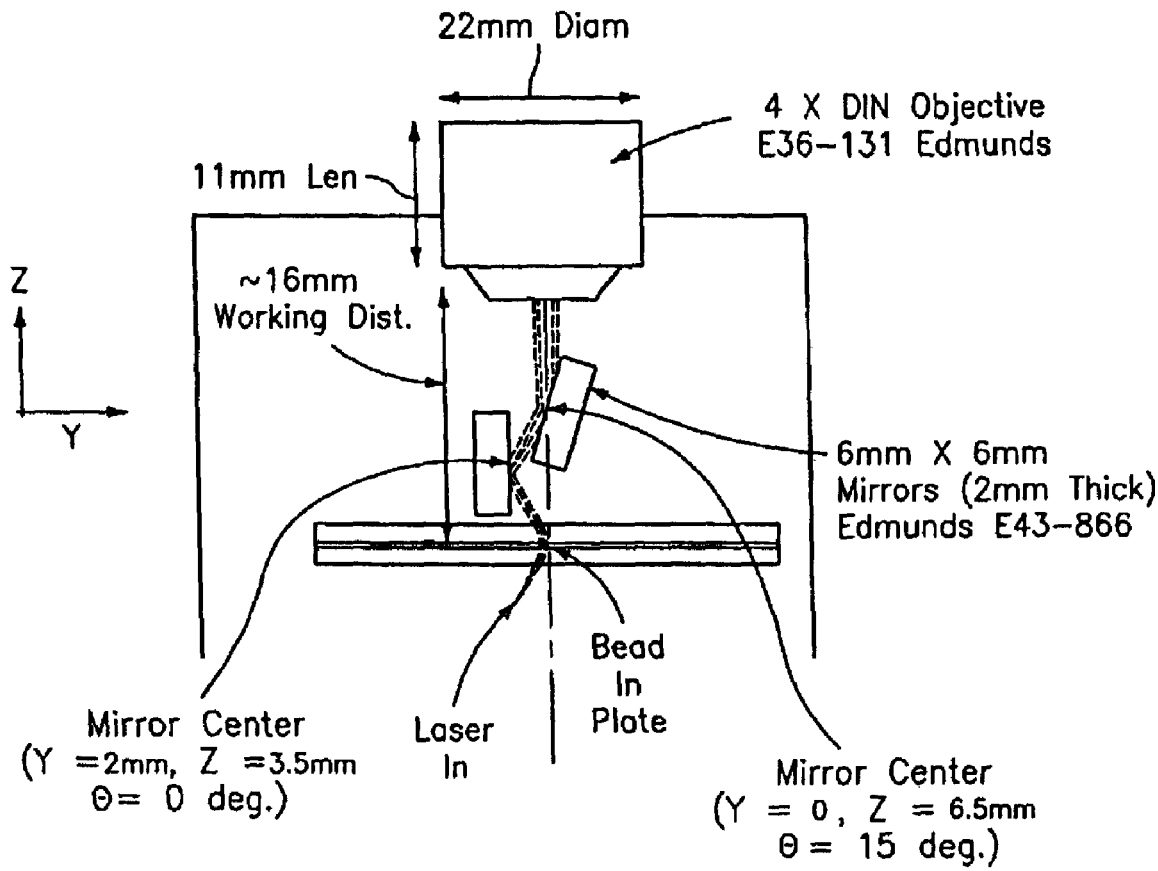
Figure 56:
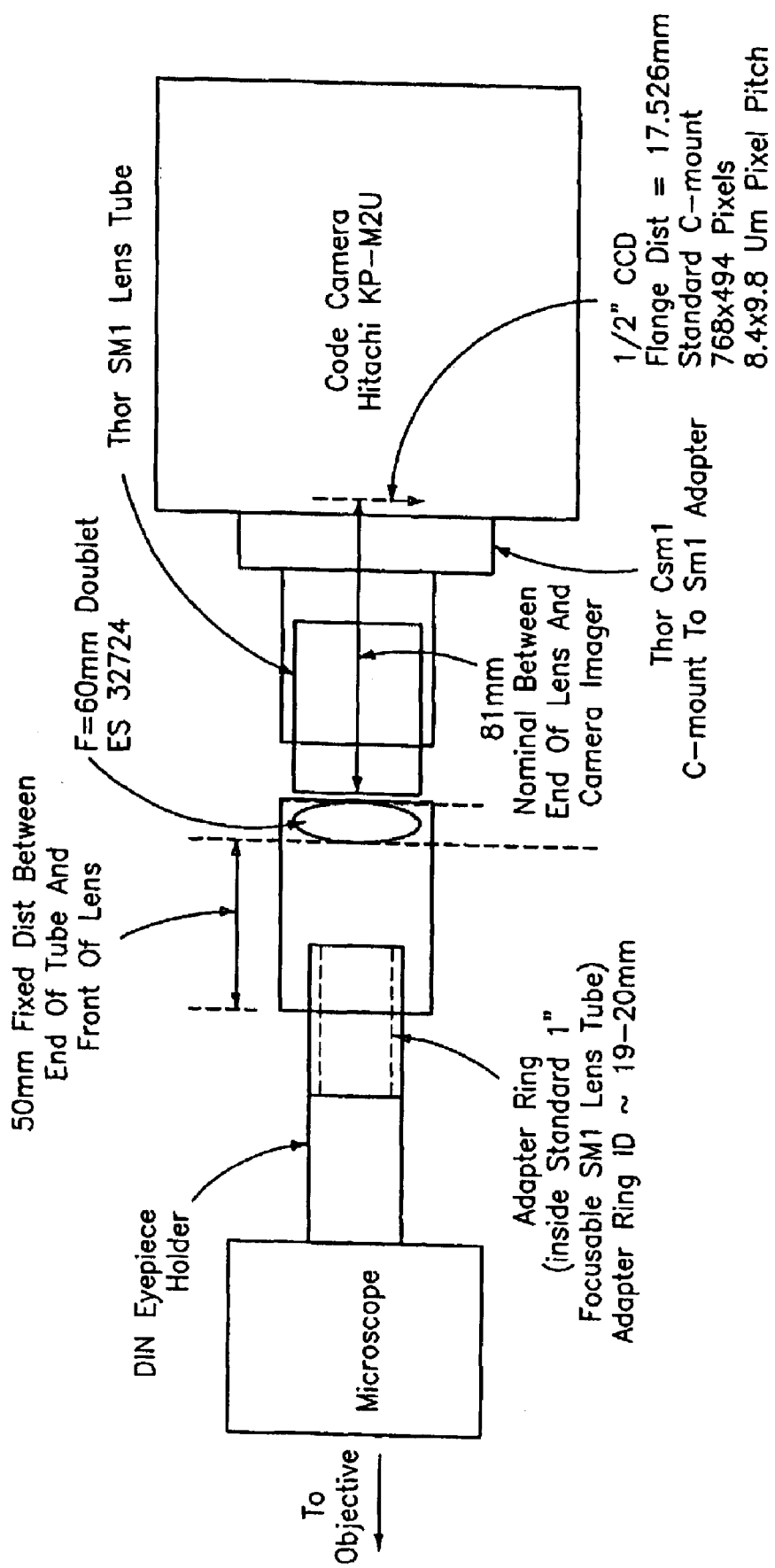

Referring to FIG. 52, alternatively, the basic architecture of a alternative reader device that can locate and read out the bead codes is shown. FIG. 53 shows a schematic of a bead mapper that is a retrofit to a conventional microscope. In this case the groove plate is made reflective so that the code beam after hitting the bead is reflected back up into the balance of the readout optics. This allows all the optics to be located on one side of the groove plate. FIG. 54 shows a solid model of a reader that has the laser beam incident from the bottom of the groove plate. FIG. 55 shows details of the optical path for the case where the code laser is injected from the bottom of the plate. Two mirrors attached to a conventional microscope objective redirect the light scattered from the bead back into the optical path. Using a pair of mirrors is advantageous in that the assembly holding both mirrors can tilt independently of the objective and will not cause a change in the beam's angular orientation. In the figure, the readout laser is incident from the bottom of the groove plate at a predetermined angle of incidence. The angle of incidence is about 29.7 degrees for a 532 nm readout beam and a physical grating pitch of about 520 nm. The laser scatters from the bead and is directed via two mirrors up through a 4× objective. The objective forms an image which is subsequently Fourier transformed onto a CCD camera, as discussed herein. FIG. 56 shows details of the optics used to Fourier transform the image of the bead onto a readout camera. A single spherical lens is used for this purpose. For a 4× objective, a 60 mm focal length lens can be used. The focal length of the lens determines the extent of the code "stripes" on the camera imager.

Figure 11:
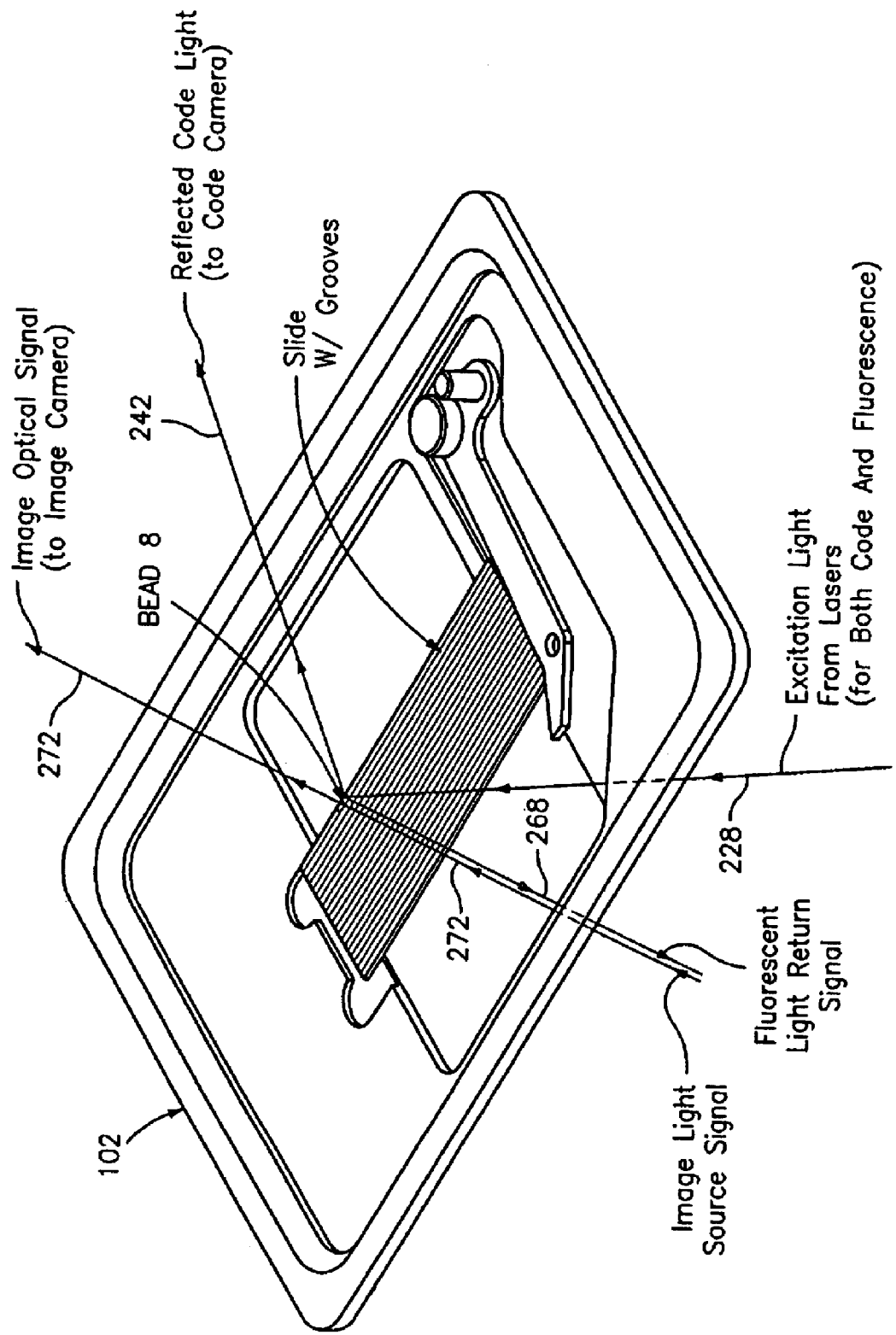
FIG. 11 is a perspective view of a slide holder and slide with grooves, in accordance with the present invention.
Figure 14:
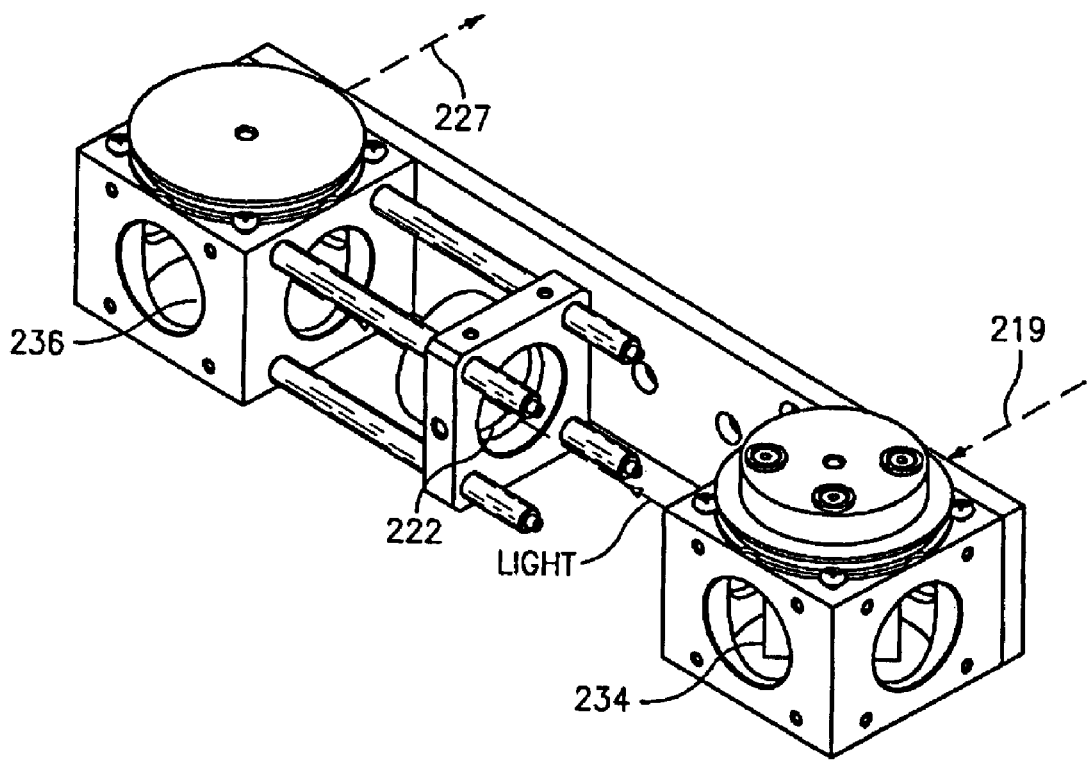
FIG. 14 is a perspective view of a turning mirror assembly of the optical reader of FIG. 8, in accordance with the present invention.
Figure 15:
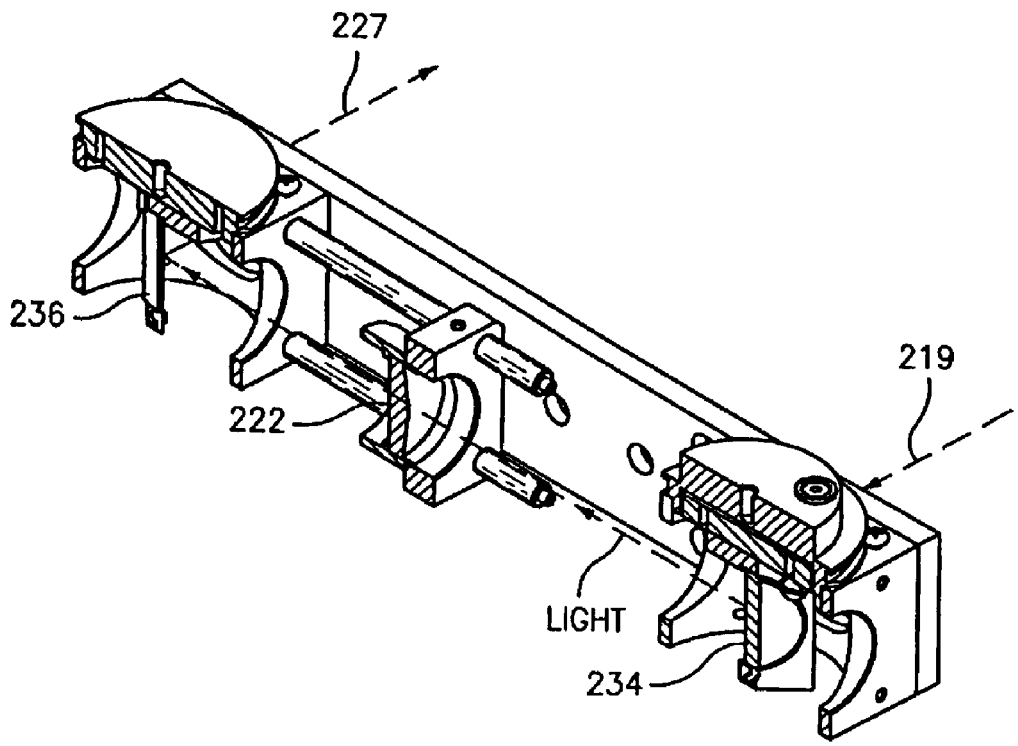
FIG. 15 is a side cross-sectional perspective view of the turning mirror assembly of FIG. 14, in accordance with the present invention.
Figure 16:
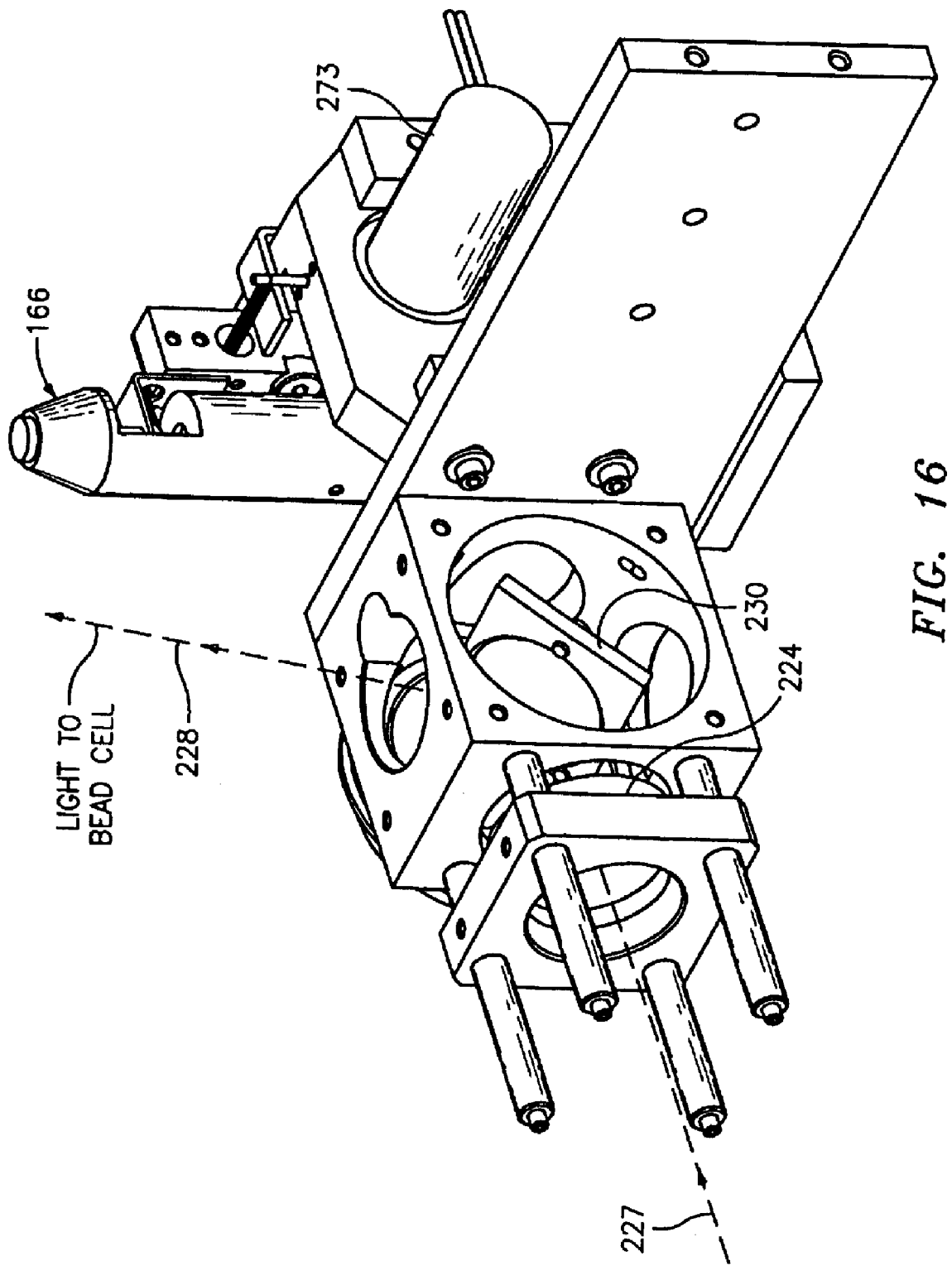
FIG. 16 is a perspective view of a fluorescent detection and light illumination assembly and additional optics of the optical reader of FIG. 8, in accordance with the present invention.
Figure 18:
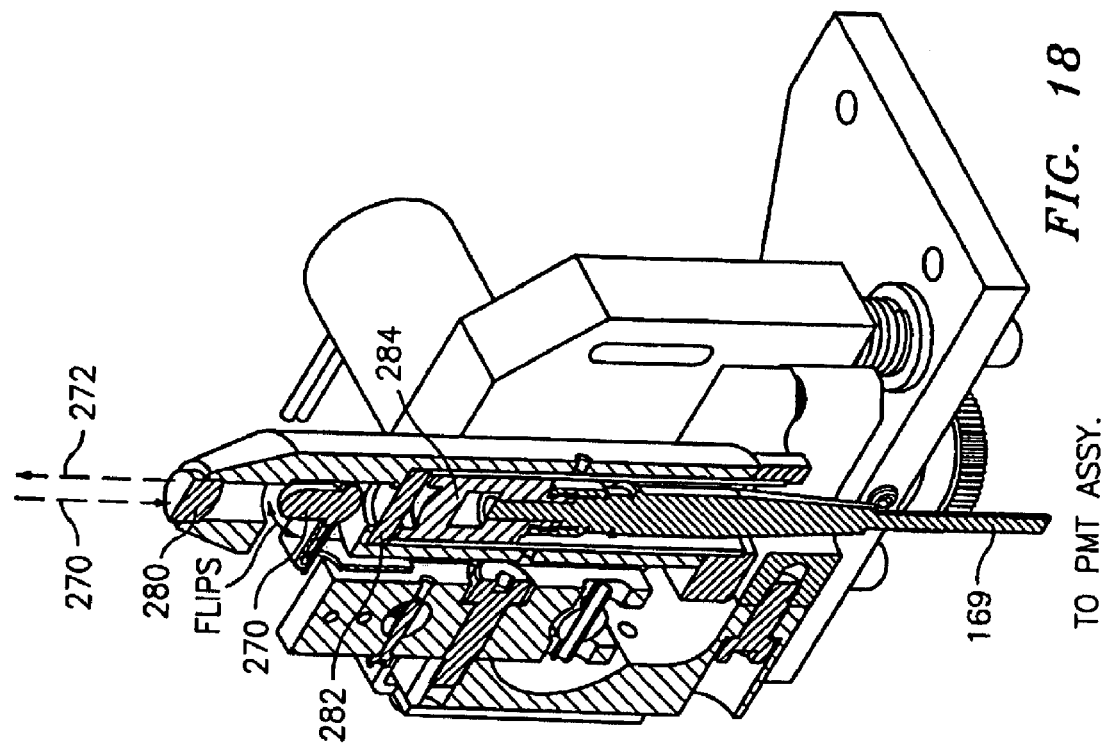
FIG. 18 is a cross-sectional perspective view of the fluorescent detection and light illumination assembly of FIG. 17, in accordance with the present invention.
Figure 17:
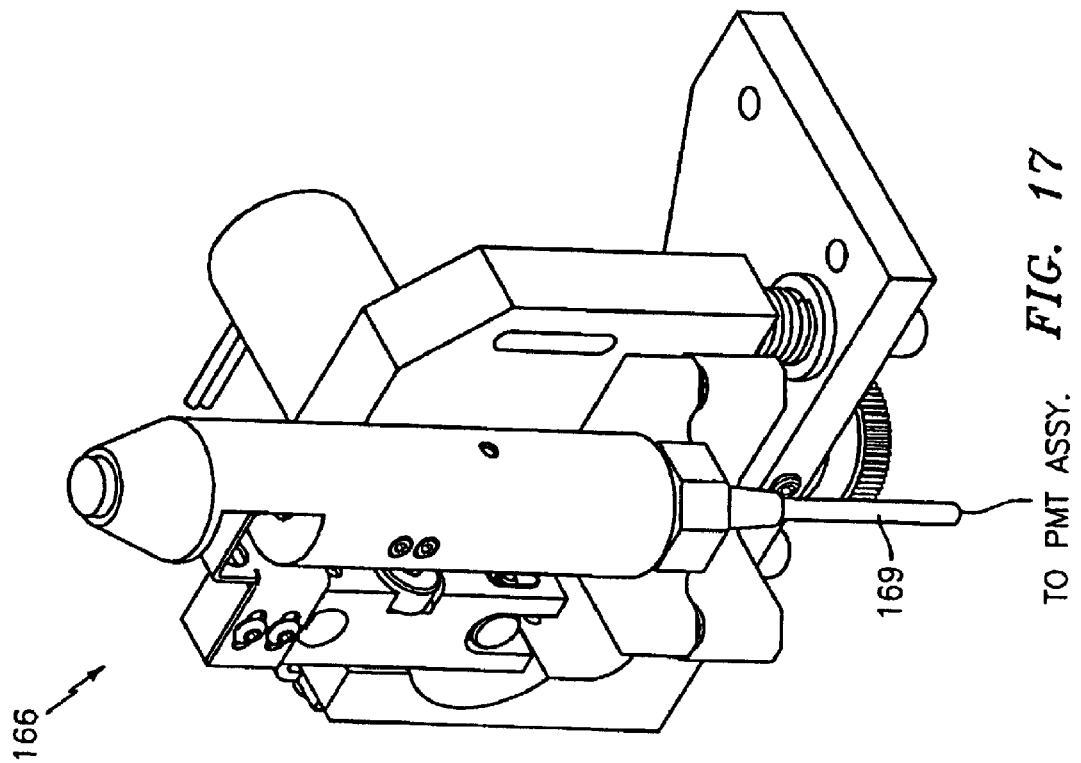
FIG. 17 is a rotated perspective view of a portion the fluorescent detection and light illumination assembly of FIG. 16, in accordance with the present invention.
Figure 19:
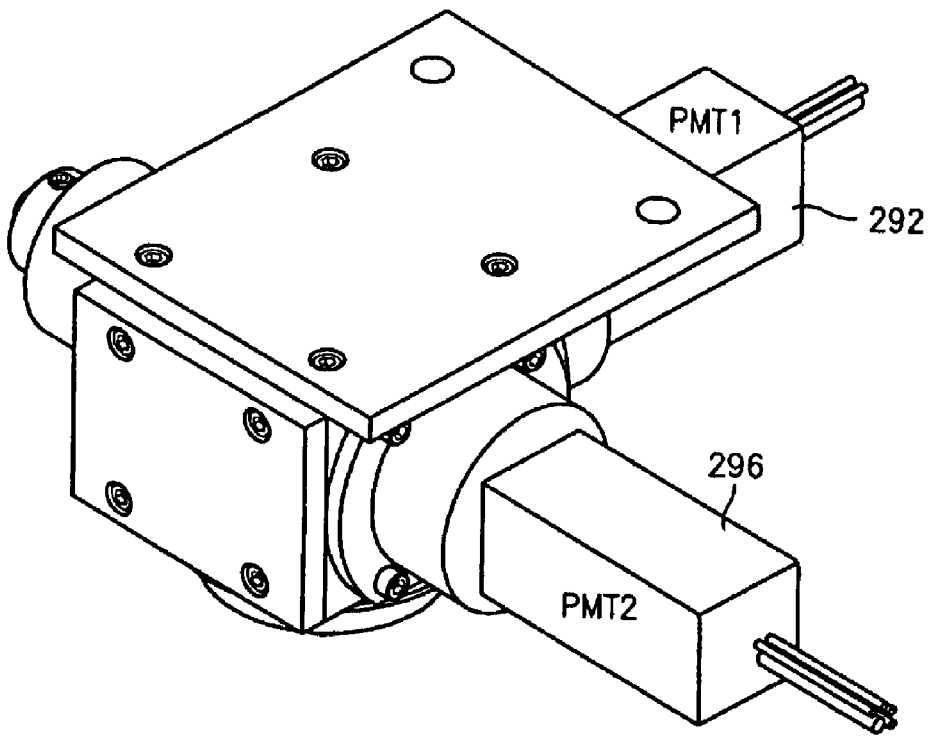
FIG. 19 is a perspective view of a photo-multiplier tube (PMT) assembly of the optical reader of FIG. 8, in accordance with the present invention.
Figure 20:
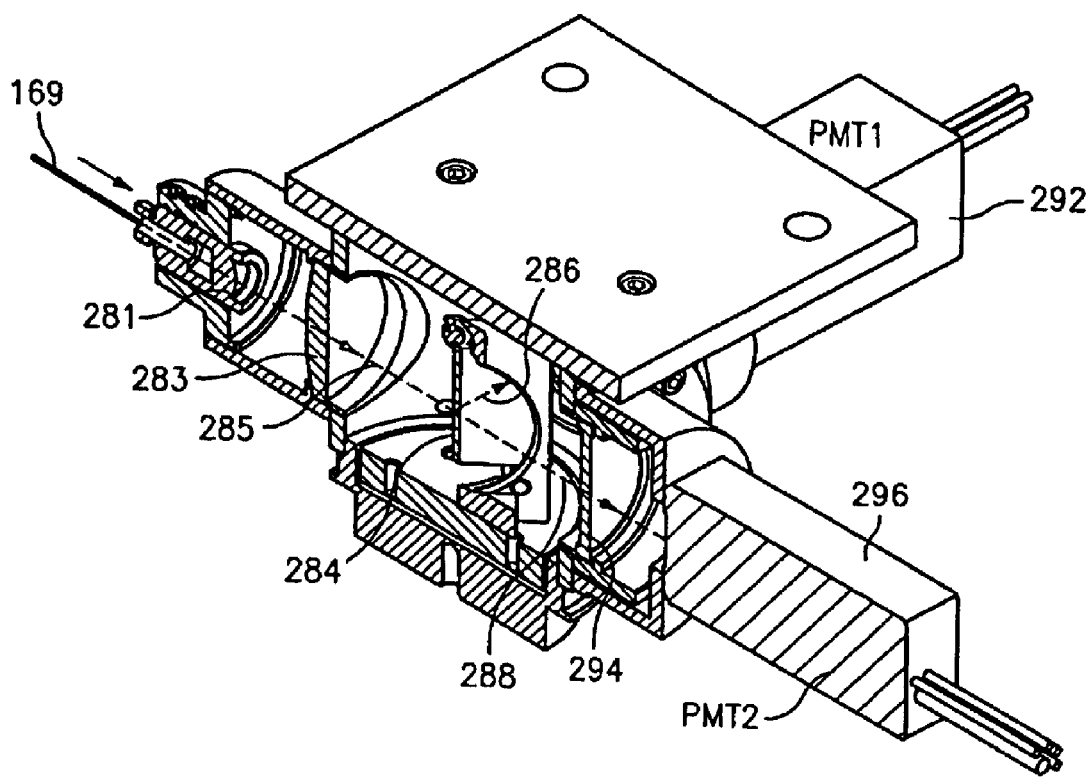
FIG. 20 is a side cross-sectional perspective view of the photo-multiplier tube (PMT) assembly of FIG. 19, in accordance with the present invention.
Figure 20A:
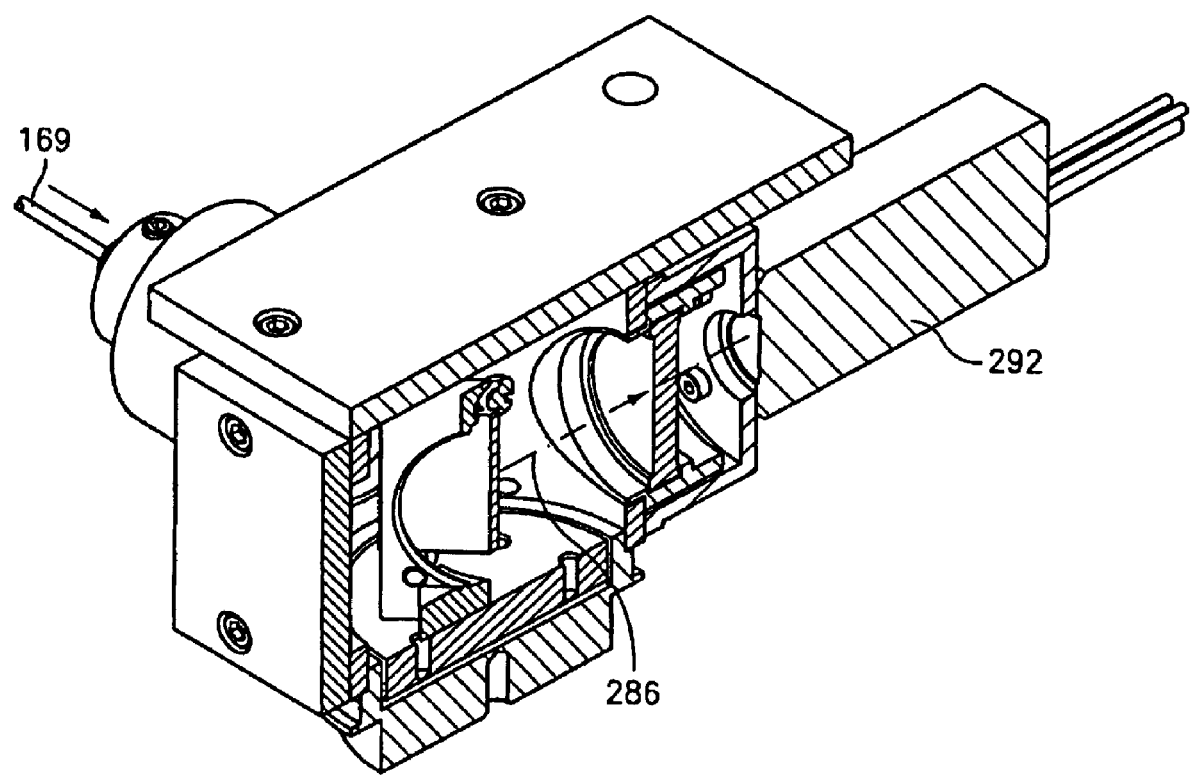
FIG. 20A is a front cross-sectional perspective view of the photo-multiplier tube (PMT) assembly of FIG. 19, in accordance with the present invention.
Figure 21:
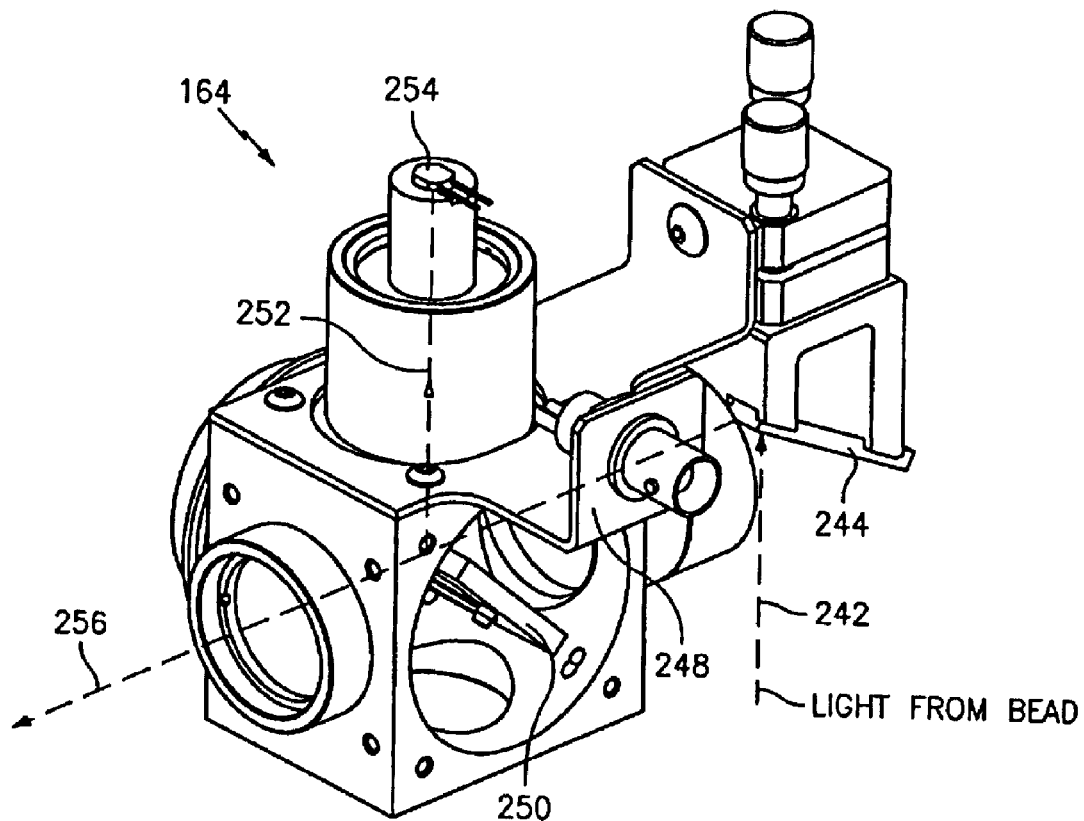
FIG. 21 is a perspective view of a beam splitter and edge detection assembly of the optical reader of FIG. 8, in accordance with the present invention.
Figure 22:
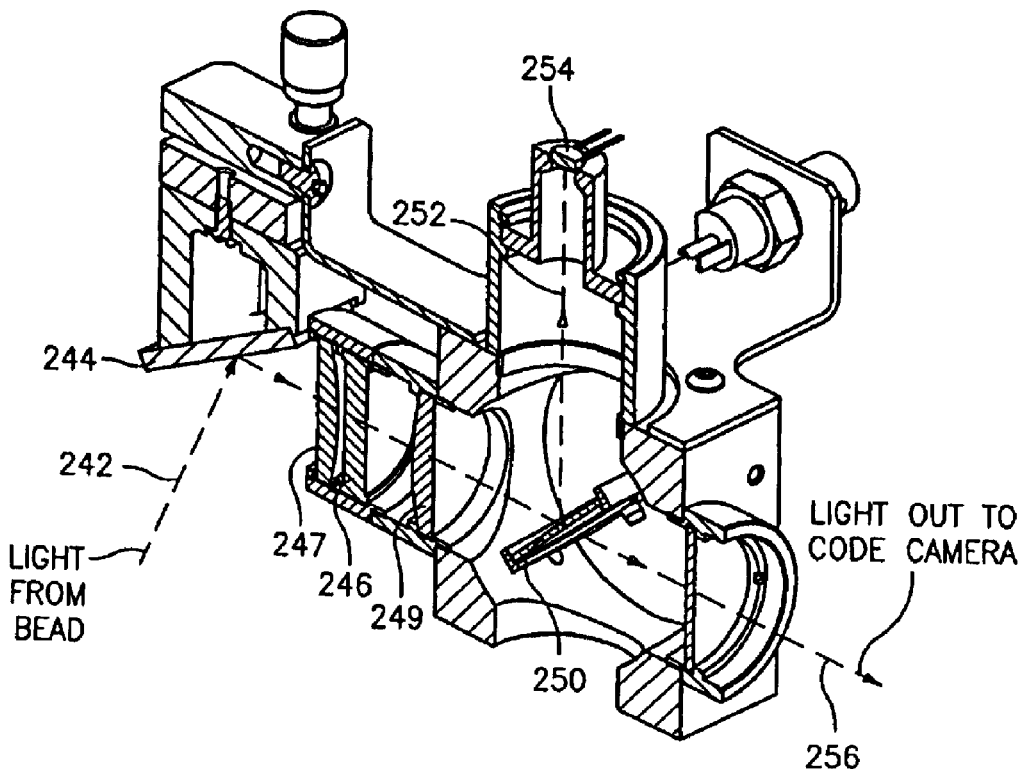
FIG. 22 is a rotated cross-sectional perspective view of the beam splitter and edge detection assembly of FIG. 22, in accordance with the present invention.

Referring to FIG. 11, the beads 8 located on the bead holder or cell 102 may be aligned on a microscope slide, e.g., a slide having low fluorescence glass, and having grooves that hold the beads in alignment, as discussed in the aforementioned patent application. In addition, an upper glass slide may be placed on top of the grooved slide to keep any fluid from evaporating from the plate, to minimize optical scatter during reading.

Figure 57:
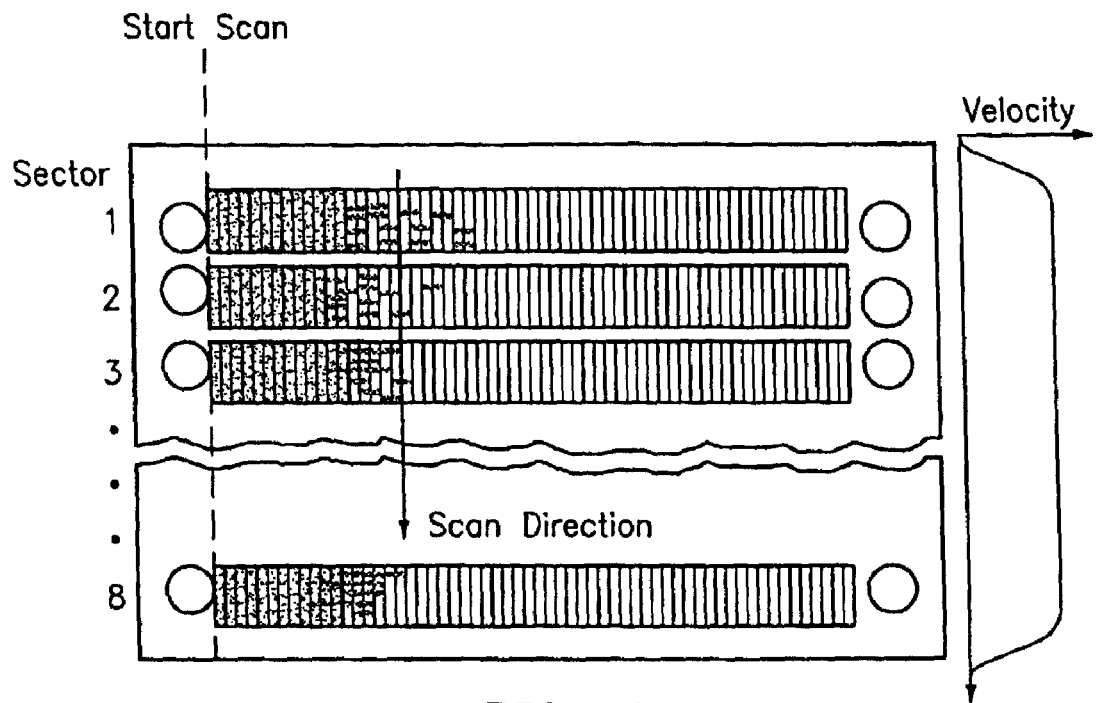
FIGS. 57 and 58 show alternatives for a bead cell, in accordance with the present invention.
Figure 58:
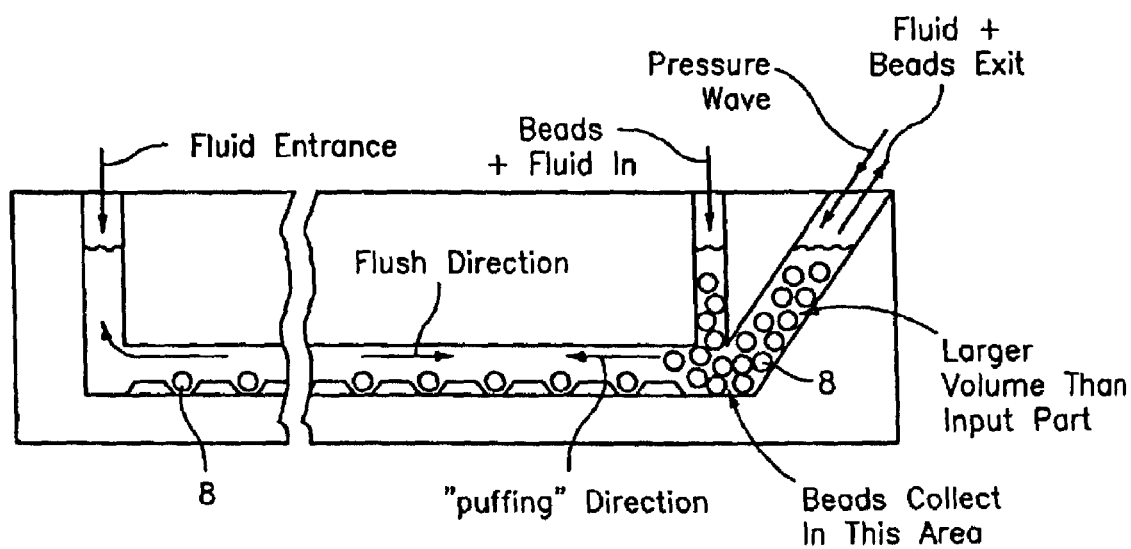

The cell (or chamber) 102 for holding the beads may be a single cell or a sectored cell, such as that described U.S. patent application Ser. Nos. 10/661,836 and 10/763,995 and Provisional Patent Application Nos. 60/609,583 and 60/610,910, which are all incorporated herein by reference in their entirety. For example, referring to FIG. 57, a top view of a sectored cell are shown having 8 sectors. Also, referring to FIG. 58, a side view of a bead cell is shown, where beads are loaded into the cell, moved into position by pressure waves (or "puffing"), and then flushed out of the cell by high velocity fluid moving over the beads, through use of ports to the device.

Alternatively, instead of using a grooved plate to align the beads 8 for reading the code, the beads may be aligned using other techniques provided the beads 8 are aligned property for reading. If the beads 8 have a magnetic or electric polarization as discussed herein and in the U.S. patent application Ser. No. 10/661,234 referenced herein, the beads 8 may be aligned using electric and/or magnetic fields. Also, a convention flow cytometer may also be used to align the beads for reading with the reader of the present invention. In that case, the beads would flow along a flow tube and the reader would read the code and fluorescence as the bead passes by the excitation lasers. In that case, the code laser and fluorescent laser may be spatially separated to allow code reading and fluorescent reading.

It should be understood that the reader need not measure both fluorescence and codes but may just read bead codes or measure fluorescence. In that case, the components discussed herein related to the unused function would not be needed.

Figure 59:
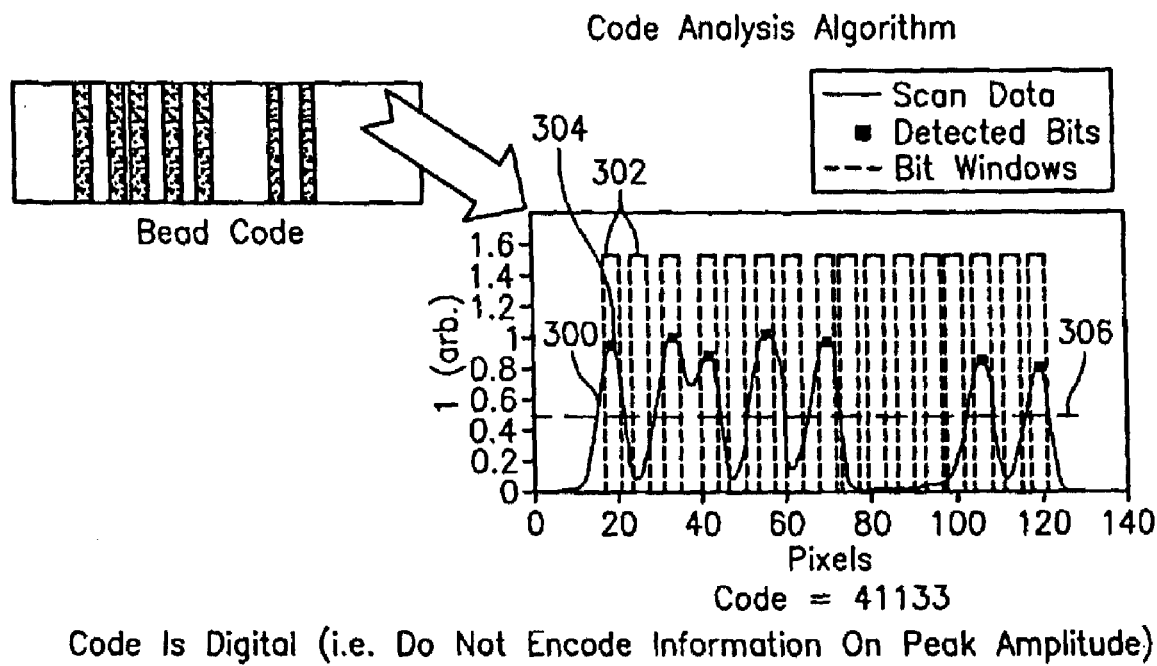
FIGS. 59-61 show optical images of a bead being scanned for a code, in accordance with the present invention.

Referring to FIG. 59, shows how the digital code is generated from the camera signal. The reader provides incident light that scans along the length of the beads and reads the codes using the code camera and optics discussed herein. The codes and fluorescence may be determined simultaneously or sequentially. In particular, the signal from the camera is shown as a continuous line 300 (scan data from camera). Then a series of bit windows 302 are generated based on a start bit 304, being the first bit which is always a digital one. Then the peak within each bit window 302 is determined. If the peak within a given window is above a predetermined threshold level 306, then that bit is deemed a digital one, if the peak is below this threshold, that bit is deemed a digital zero. For the example in FIG. 59, a code of 41133 is shown.

Figure 59A:
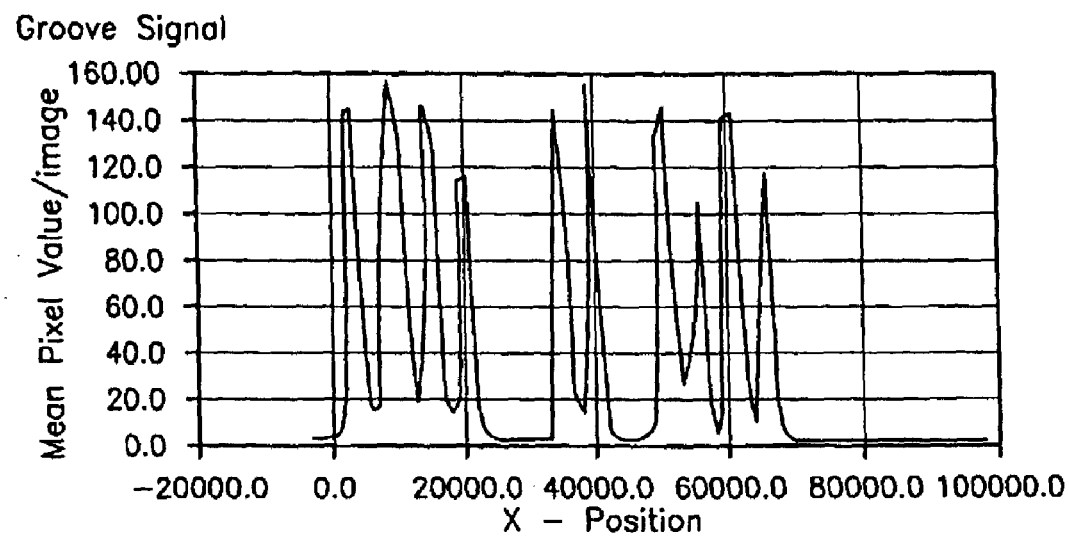
Figure 60:
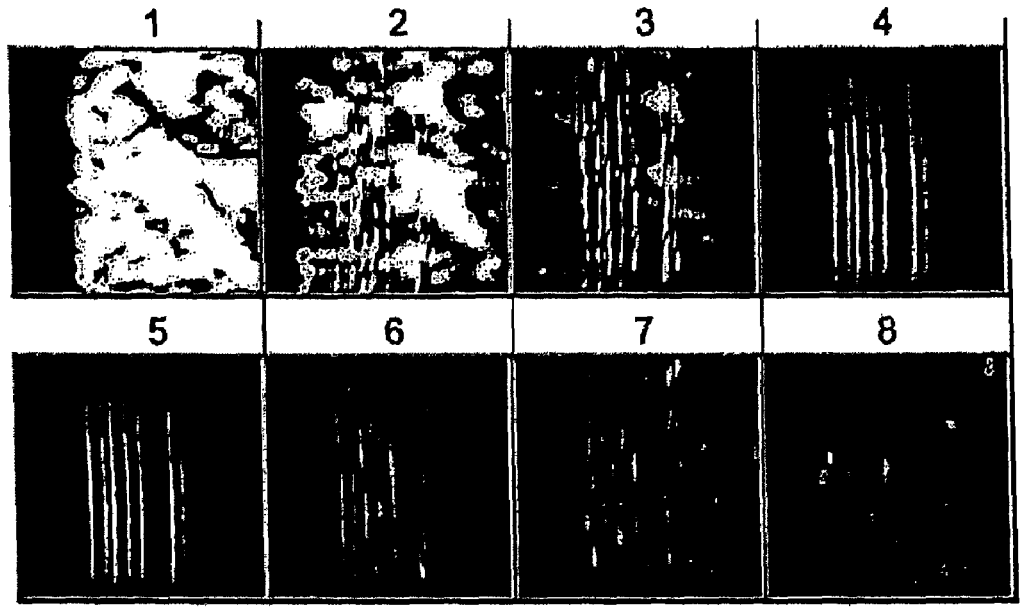
Figure 61:
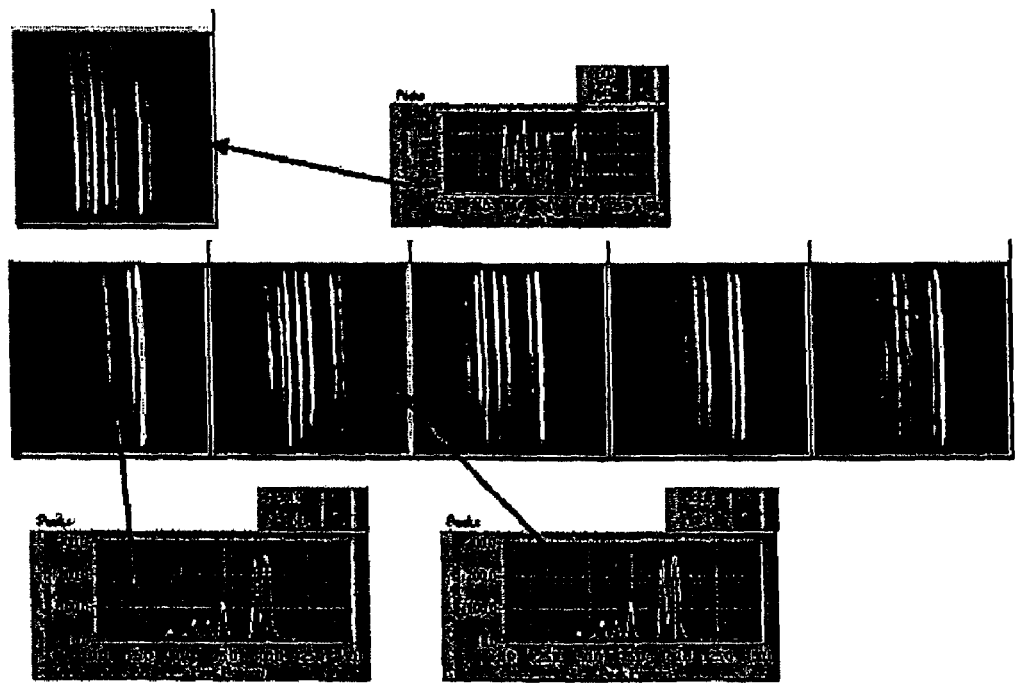
Figure 62:
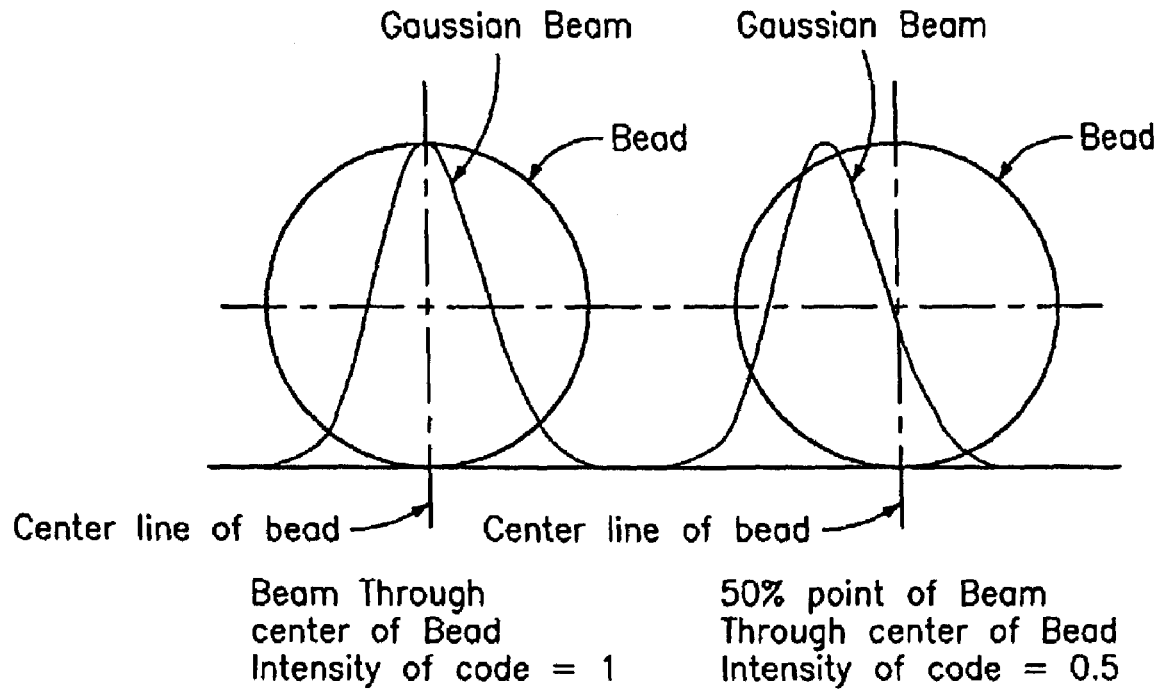
FIGS. 62-65 show graphs and drawings relating to bead code reading tolerances, in accordance with the present invention.

FIG. 59A shows the average signal on the code camera as the plate is scanned along a groove. FIG. 60 shows the typical sequence of images obtained as a single bead is scanned along a groove. The peaks in the average signal shown in FIG. 59A correspond to the code laser scattering off the edge of the beads. The leading and trailing edge of the bead both cause bright "flashes" on the code camera. These flashes are used to locate the bead. Generally a single groove is quickly scanned for location of the beads. Once each bead position is known the stage can return to the minimum signal position between beads and read the code. FIG. 61 shows a series of beads and their corresponding holographic codes.

Referring to FIG. 62-67, codes are read by passing a beam of light of the appropriate length, width and wavelength along the axis of the bead at the appropriate angle relative to the axis of the bead. This beam is diffracted by a plurality of gratings in the core of the bead (along the center of the cylinder), each grating diffracting the light at a different angle, forming a bit within the code. This array of beams is ultimately focused (imaged via Fourier transform) onto a CCD array, where the light incident on the detector array is interpreted into a code. The rate at which we can take an image of a code is a function of the following.

Scan velocity: The rate at which the beam moves past the bead.

Bead Length: The axial length of the bead, with the scan velocity, determine how long the beam will illuminate the code in the bead during a scan.

Beam Length: The length of the beam, generally along the axis of the bead and provided it is smaller than the length of the bead, determines what portion of the bead can be read without light scattering onto the code area from the ends of the bead. The beam length is further constrained by the physical size of the grating and the required code resolution (per patent application CV-0038A, referenced herein).

Bead Diameter: The diameter of the bead determines how much light will reflect off the ends of the bead, into the diffracted code space.

CCD Array: Detector array used to interpret codes from the diffracted beams.

Pixel Integration Time: The maximum pixel integration time is bounded by the scan velocity, bead length, beam length and how much "background" light the system can withstand without interfering with the diffracted bits. Maximum Pixel Frequency: The fastest rate at which you can clock data out of each pixel in the array determines the minimum integration time.

Pixel Size: The physical size of the active area on each pixel (assuming the diffracted code bits are larger than a single pixel) determines how much of the bit energy is captured by the array.

Pixel Conversion Efficiency: The efficiency for turning photons into electrons. Pixel resolution: The desired resolution of the CCD array, pixels per diffracted bit.

Array size: will determine how small the diffracted pattern can be focused. Code Intensity:

Laser Power: Determines how much power can be delivered to the diffraction gratings.

Beam Width: Determines the maximum intensity that can be delivered to the diffraction gratings.

Bit Grating Efficiency: The efficiency at which each bit can be diffracted from the grating.

Code Magnification: The magnification of the code when it comes into contact with the CCD array.

Beam to Bead Alignment: Determines the relative position of the beam to the bead, thus the intensity of each diffracted bit. Includes position and angle tolerances.

Optics Efficiency: The efficiency of the optical system between the output of the laser and the CCD array will bound the maximum amount of light available to read codes.

These parameters must be balanced in order to read codes from the beads.

Figure 63:
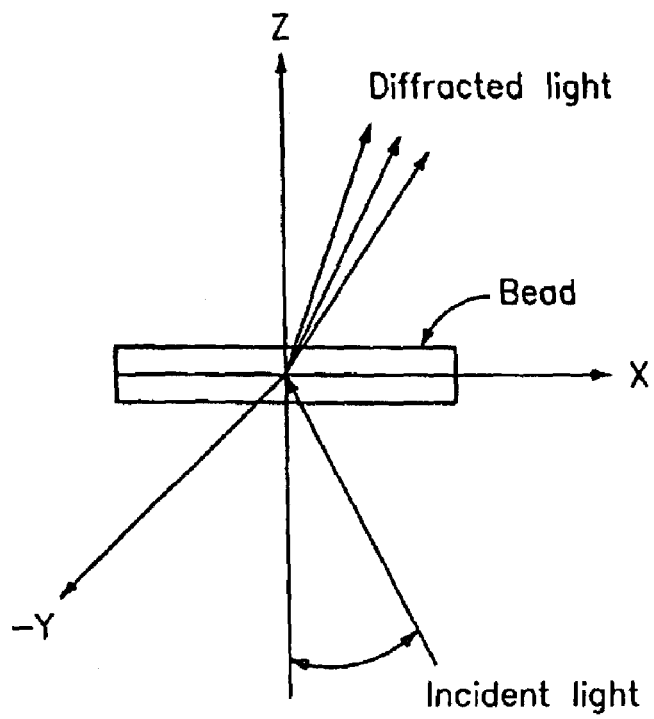
Figure 64:
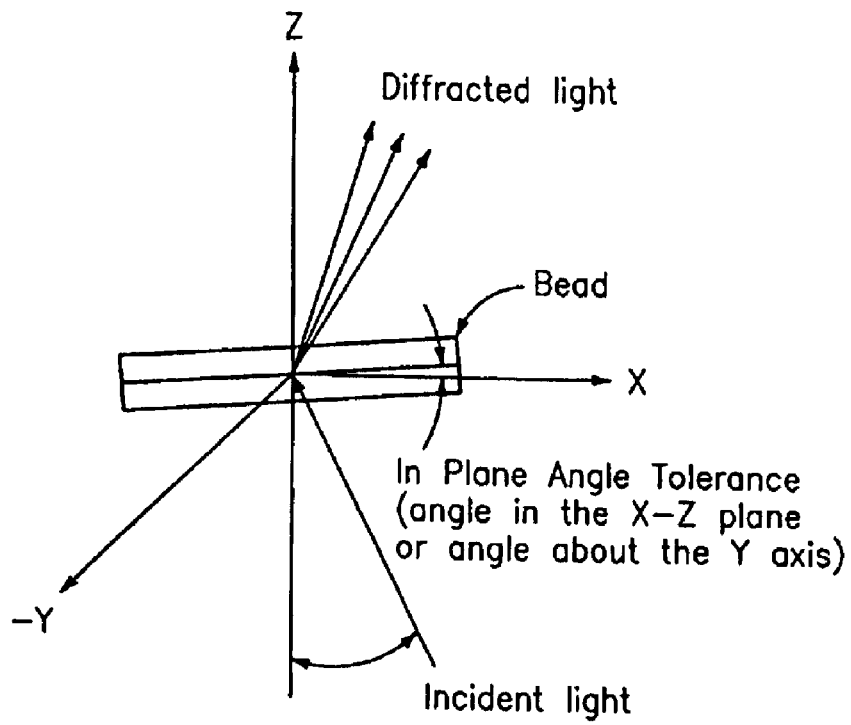
Figure 65:
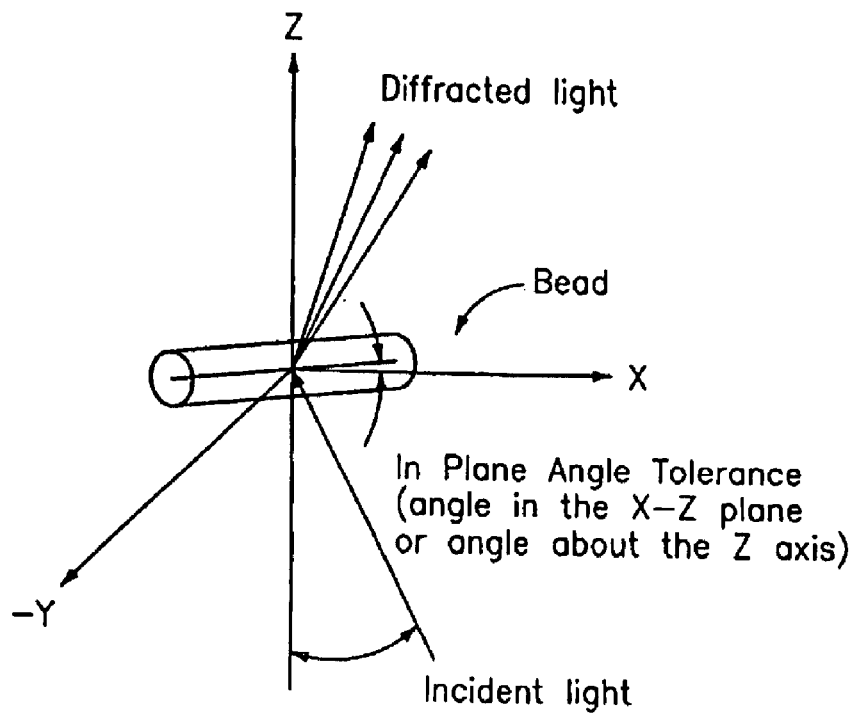

The overall reader performance specification will drive some of the above parameters, such as scan velocity, bead length and bead width. Some other parameters are driven by the physical limitations of our present bead processing technology, such as the grating efficiency and code resolution. If we use the same laser to read codes that is used to interrogate fluorescence, the laser power is determined by the fluorescence specification. This only leaves a few parameters left to determine the code detection performance. The single largest task is to figure out the beam to bead alignment tolerances in order to determine the minimum and maximum available code power at the CCD array. Based on these inputs, it is a matter of choosing the CCD array with the appropriate maximum pixel frequency, pixel size, array size (which, along with the pixel resolution, determines the code magnification) and conversion efficiency to meet the code intensity requirements. For reading the code, the beam to bead alignment has three main components; position errors generally orthogonal to the axis of the bead, in-plane angle errors (pitch) and out-of-plane angle errors (yaw). Position errors are reasonably straightforward in that a bead to beam offset will result in a code generally equivalent to the intensity of the Gaussian beam intensity at the offset position, see FIG. 62. Position errors generally along the axis of the bead are not considered since all locations along that line are scanned. The angle errors are reasonably straightforward, if you consider the plane of incidence to contain the incident beam and a line perpendicular to the axis of the bead. Errors about the X axis are generally non existent since the bead is circularly symmetric in that dimension and the system is setup to compensate for any initial angle error in that dimension. FIG. 63 shows a bead incident by a beam with no errors. FIG. 64 shows a bead with a beam having a relative in-plane (pitch) error and FIG. 65 shows a bead with a beam having a relative out-of-plane (yaw) error. The system parameters for two different embodiments of the reader can be found in Table 1.

TABLE 1

Parameters used for different readers

| Parameter | Embodiment 1 | Embodiment 2 |
|---|---|---|
| Scan Velocity (mm/s) | 30 | 150 |
| Bead Length (mm) | 0.45 | 0.225 |
| Bead Diameter (mm) | 0.65 | 0.28 |
| CCD: | 2D array, 80 × 272 pixels | 1D array, 1 × 256 pixels |
| Pixel Integration Time | 1 mS | 0.555 mS |
| Max Pixel Rate (pixels/sec) | 6528000 (readout limited) | 10000000 |
| Pixel Size (microns) | 7.8 × 7.8 | 13 × 17 |
| Conversion Efficiency | 256 bits/microjoule/cm$^2$ | 2 Volts/microjoule/cm$^2$ |
| Array size (mm) | 0.624 × 2.1216 | 0.017 × 3.328 |
| Code Intensity | | |
| Laser Power (mW) | 10 | 20 |
| Beam Width (microns) | 15 | 28 |
| Grating Efficiency | 5.00E−04 | 3.00E−05 |
| Beam to Bead Alignment: | | |
| Axial Position Tolerance (microns) | +/−6 | +/−9 |
| In Plane angle Tolerance (Deg) | 0.5 | 1.5 |
| Out of Plane angle tolerance (Deg) | 3 | 2.5 |
| Optics Efficiency | 0.5 | 0.8 |

Figure 66:
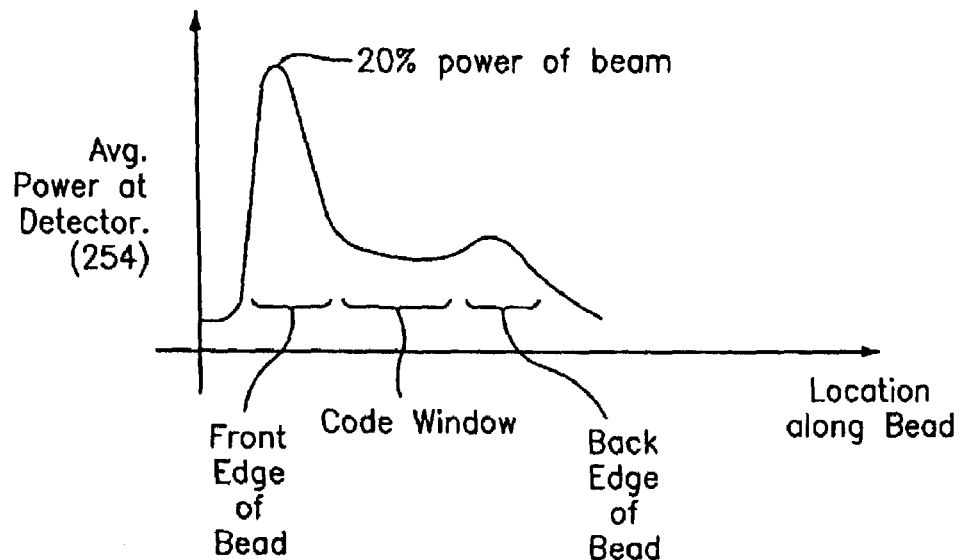
FIG. 66-67 shows two graphs of optical power at detectors used to locate the bead and code window, in accordance with the present invention.
Figure 67:
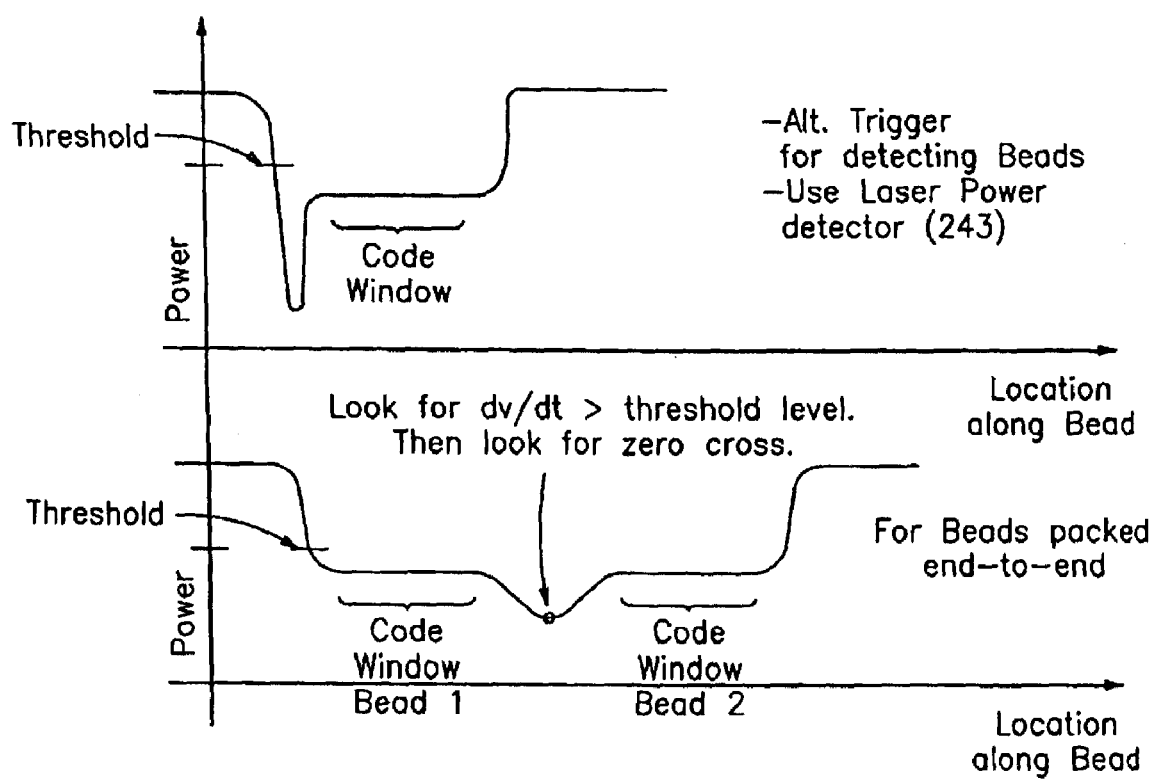

Referring to FIG. 66, if the trigger to find the bead edge uses the edge trigger diode 254 discussed herein, there is a large initial peak (about 20% of the laser beam), followed by the code window where the code can be read, followed by a smaller peak for the back edge of the bead. However if the edges are jagged or random surface angles, it may be difficult to identify the edges, especially if the beads are packed end to end. In that case, the laser power detector 243 may be used to detect the edges of the beads, as shown in FIG. 67. The upper graph shows a single bead and the lower graph shows 2 beads end to end. For the lower case, a predetermined rate of change of voltage dv/dt is checked for and then a zero crossing to identify the edge of the next adjacent bead. In both cases, an initial power drop below a predetermined threshold allows detection of the leading bead edge.

Figure 68:
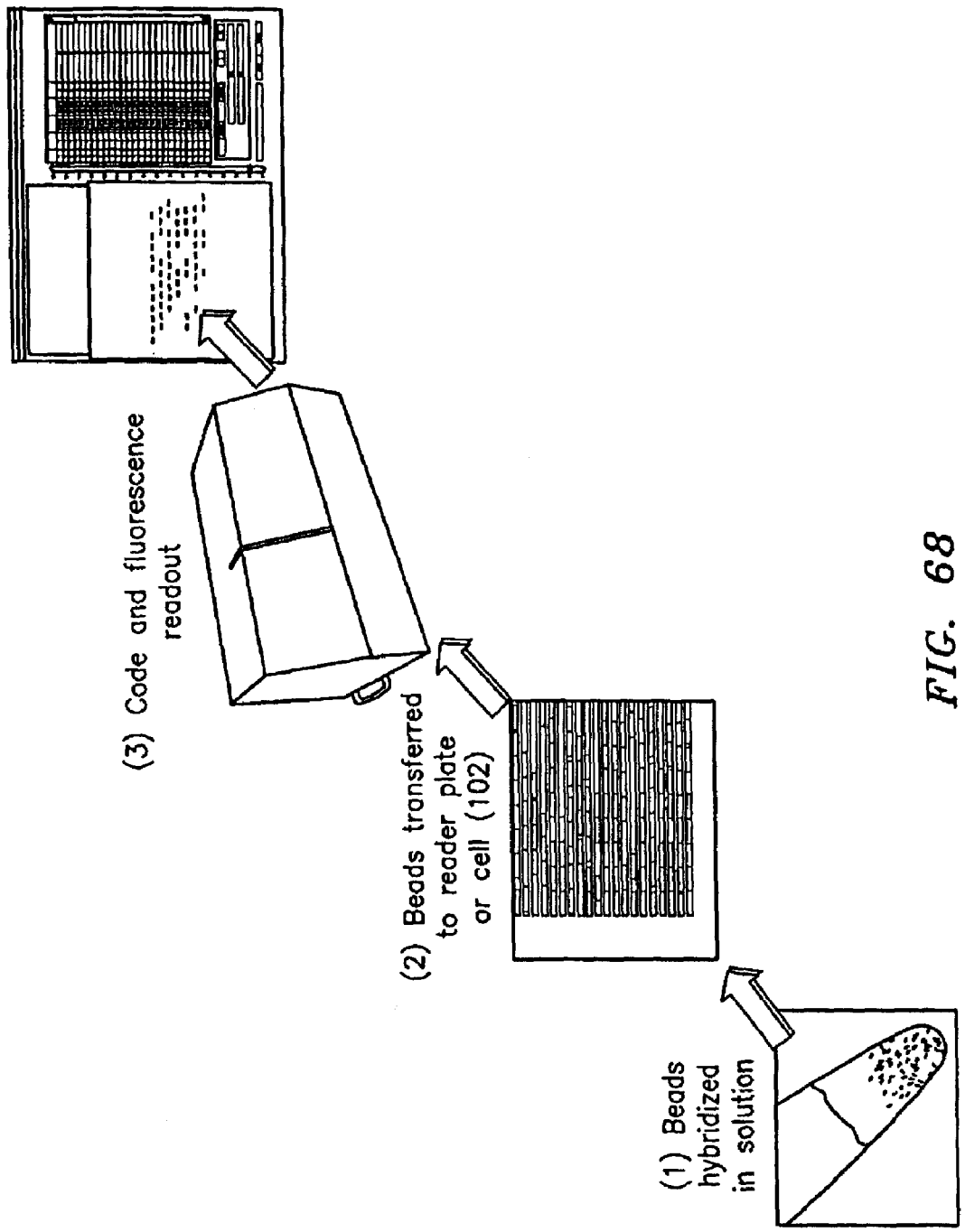
FIG. 68 shows a sample assay process chart which could use the reader, in accordance with the present invention.

Referring to FIG. 68 an example of how the present invention would be used in an assay. First, the beads would be hybridized in solution, e.g., in a tube. Then, the beads are transferred to a reader plate (or bead holder or cell 102), and aligned in grooves. The bead cell 102 is then placed in the reader scans along each groove, triggering when a bead goes through the beam and the reader reads the code on each bead and the fluorescence of each bead, and the results are stored on a database in the computer. The codes and fluorescence levels may be measured simultaneously or sequentially. Alternatively, the beads may be in a multi-well plate and removed into the cell as discussed in pending US patent applications discussed herein. The reader may support >1200 samples/hr, for <100 measurements/sample; <80 samples/hr for <1000 measurements/sample; and/or about a 10 minute scan for 5,000 measurements/sample.

Figure 69:
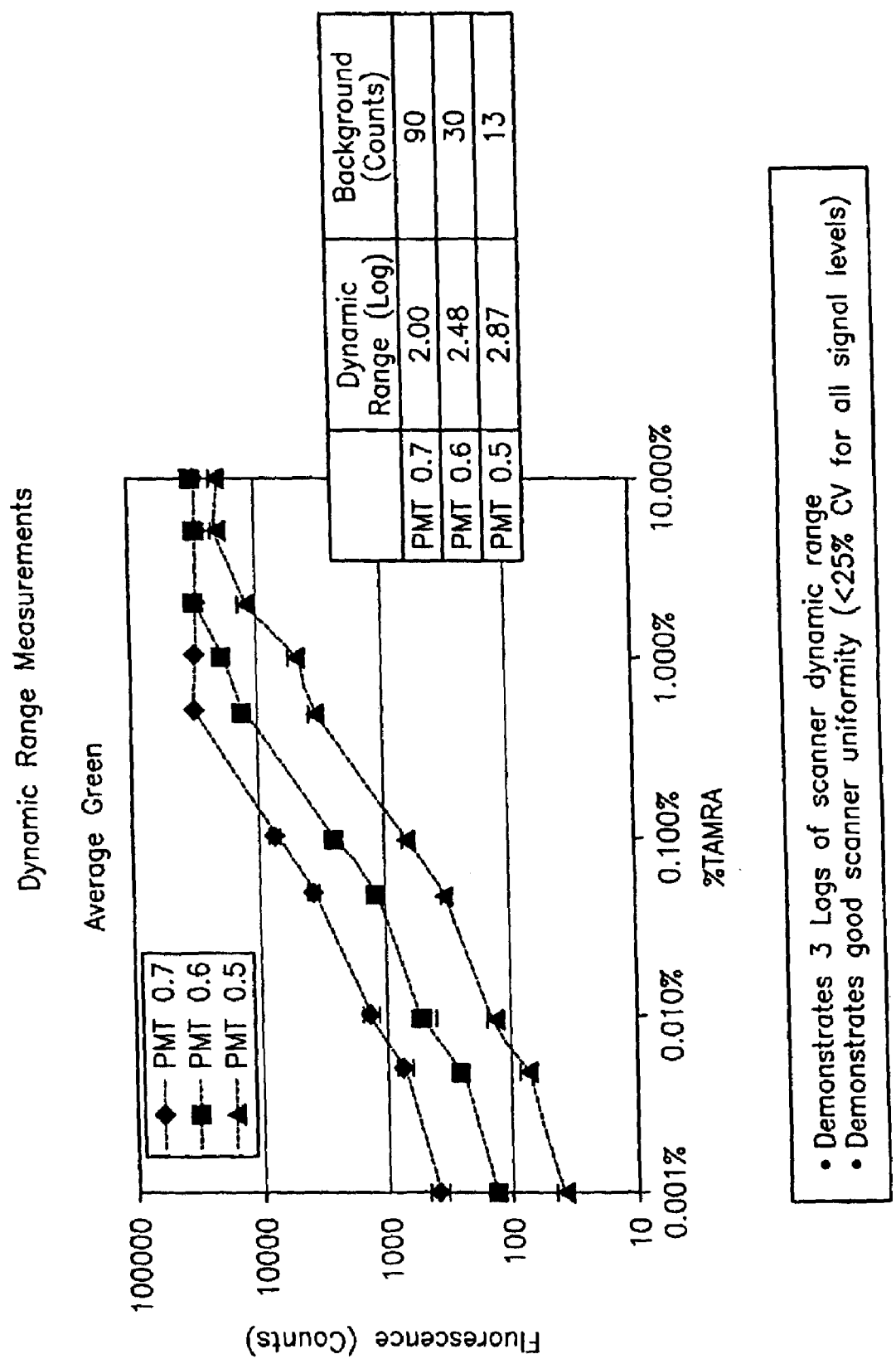
FIGS. 69-71 show dynamic sample dynamic range data and reader throughput, in accordance with the present invention.
Figure 70:
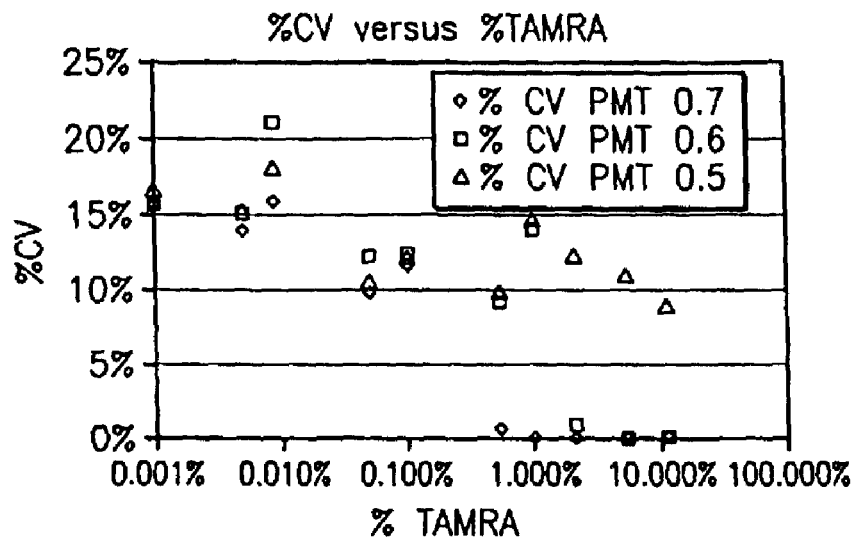
Figure 71:
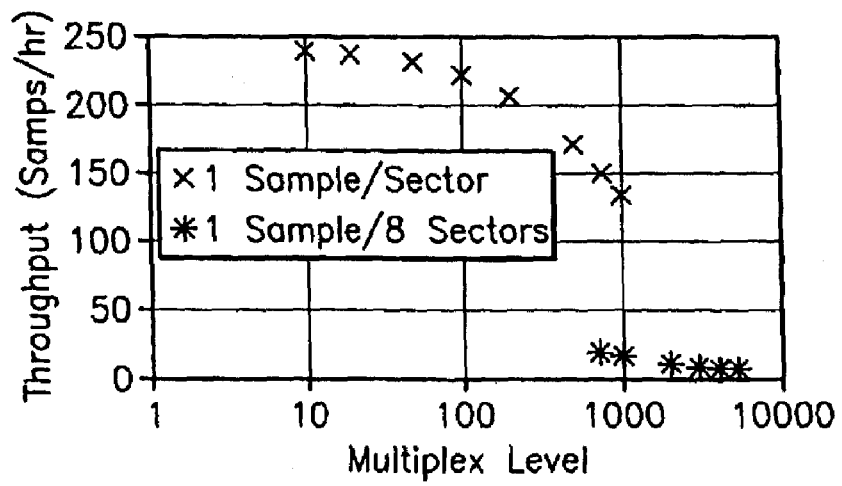

Referring to FIGS. 69-71, show dynamic sample dynamic range data and reader throughput for the present invention. Any other specifications may be used depending on the application.

Although the invention has been described above as being used with microbeads, it should be understood by those skilled in the art that the reader maybe used with any size or shape substrate that uses the diffraction grating-based encoding techniques as described in U.S. patent application Ser. No. 10/661,234, which is incorporated herein by reference in its entirety.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An optical reader system comprising:
   a source light assembly including a code-reading beam and a fluorescence-excitation beam that are configured to illuminate encoded substrates, the substrates having optically readable codes that provide output signals when the code-reading beam is incident thereon, the output signals being indicative of the codes;
   a fluorescence detector configured to detect fluorescent signals from the substrates;
   code pickup optics configured to project the output signals from the optically readable codes onto a Fourier plane; and
   a code detector positioned to detect the output signals in the Fourier plane.

2. The system in accordance with claim 1 wherein the fluorescent signals are indicative of analytes being selectively bound to probes on corresponding substrates.

3. The system in accordance with claim 1 further comprising a computing system, the computing system receiving data based on the optical signals and the fluorescent signals, the computing system determining the codes of the substrates and levels of fluorescence from the substrates.

4. The system in accordance with claim 1 wherein the substrates have an elongated body extending along a longitudinal axis, the code-reading beam being incident upon the substrates at a non-orthogonal or perpendicular angle with respect to the longitudinal axis.

5. The system in accordance with claim 1 further comprising a holder configured to align the substrates.

6. The system in accordance with claim 1 further comprising a holder configured to hold the substrates in stationary positions with respect to each other.

7. The system in accordance with claim 1 further comprising the substrates, wherein the codes of the substrates comprise diffraction gratings.

8. The system in accordance with claim 1 wherein the code detector comprises a camera.

9. The system in accordance with claim 1 wherein the fluorescence detector comprises a photomultiplier tube.

10. The system in accordance with claim 1, wherein the code detector detects images of Fourier transforms of resultant refractive index variations in the substrates.

11. A method comprising:
    illuminating encoded substrates with a code-reading beam and a fluorescence-excitation beam, the substrates having optically readable codes that provide output signals when the code-reading beam is incident thereon, the output signals being indicative of the codes, and the substrates further having fluorescent molecules that provide fluorescent signals when the fluorescence-excitation beam is incident thereon;
    projecting the output signals onto a Fourier plane;
    detecting the output signals in the Fourier plane; and
    detecting the fluorescent signals.

12. The method in accordance with claim 11 further comprising:
    determining the codes of the substrates; and
    determining levels of fluorescence of the substrates.

13. The method in accordance with claim 11 further comprising aligning the substrates before said illuminating.

14. The method in accordance with claim 11 wherein the substrates have an elongated body extending along a longitudinal axis, the code-reading beam being incident upon the substrates at a non-orthogonal or perpendicular angle with respect to the longitudinal axis.

15. The method in accordance with claim 11 wherein the code detector comprises a camera.

16. The method in accordance with claim 11 wherein the fluorescence detector comprises a photomultiplier tube.

17. The method in accordance with claim 11 wherein said illuminating includes illuminating the substrates with the code-reading beam and the fluorescent-excitation beam at different times.

18. The method in accordance with claim 11, wherein said detecting the optical signals includes detecting images of Fourier transforms of resultant refractive index variations in the substrates.

19. The method in accordance with claim 11 wherein the codes of the substrates comprise diffraction gratings.

20. The method in accordance with claim 11 wherein the code-reading and fluorescence-excitation beams illuminate the substrates at different times.

* * * * *